US008651684B2

(12) United States Patent
Mehrle

(10) Patent No.: US 8,651,684 B2
(45) Date of Patent: Feb. 18, 2014

(54) TWO AND THREE-DIMENSIONAL IMAGE WITH OPTICAL EMISSION FREQUENCY CONTROL

(75) Inventor: Michael Mehrle, Los Angeles, CA (US)

(73) Assignee: UniPixel Displays, Inc., The Woodlands, TX (US)

( * ) Notice: Subject to any disclaimer, the term of this patent is extended or adjusted under 35 U.S.C. 154(b) by 0 days.

(21) Appl. No.: 13/812,712

(22) PCT Filed: Jul. 28, 2011

(86) PCT No.: PCT/US2011/045804
§ 371 (c)(1),
(2), (4) Date: Mar. 27, 2013

(87) PCT Pub. No.: WO2012/016092
PCT Pub. Date: Feb. 2, 2012

(65) Prior Publication Data
US 2013/0201661 A1 Aug. 8, 2013

Related U.S. Application Data

(60) Provisional application No. 61/368,585, filed on Jul. 28, 2010.

(51) Int. Cl.
*G02B 27/22* (2006.01)
*G09F 13/08* (2006.01)
*G09F 13/04* (2006.01)

(52) U.S. Cl.
USPC .......... 362/97.1; 359/464; 359/475; 359/462; 359/463; 345/6

(58) Field of Classification Search
USPC .............. 362/97.1–97.4; 359/462–477; 345/6
See application file for complete search history.

(56) References Cited

U.S. PATENT DOCUMENTS

| | | | |
|---|---|---|---|
| 5,930,037 A * | 7/1999 | Imai | 359/463 |
| 6,970,290 B1 * | 11/2005 | Mashitani et al. | 359/462 |
| 7,190,518 B1 * | 3/2007 | Kleinberger et al. | 359/465 |
| 7,677,733 B2 | 3/2010 | Brott | |
| 7,750,982 B2 | 7/2010 | Nelson et al. | |
| 2004/0080938 A1 | 4/2004 | Holman et al. | |
| 2004/0150583 A1* | 8/2004 | Fukushima et al. | 345/6 |
| 2004/0257531 A1* | 12/2004 | Hattori et al. | 353/10 |
| 2007/0109463 A1 | 5/2007 | Hutchins | |
| 2007/0165305 A1 | 7/2007 | Mehrle | |
| 2008/0002255 A1 | 1/2008 | Tavor et al. | |
| 2012/0274867 A1* | 11/2012 | Shinkai et al. | 349/15 |

FOREIGN PATENT DOCUMENTS

| | | |
|---|---|---|
| KR | 10-2008-0039853 A | 5/2008 |
| WO | 2007070721 A2 | 6/2007 |

OTHER PUBLICATIONS

PCT/US2011/045804 International Search Report and Written Opinion dated Apr. 6, 2012 (9 pp.).

* cited by examiner

*Primary Examiner* — Mariceli Santiago
(74) *Attorney, Agent, or Firm* — Conley Rose

(57) ABSTRACT

A rear parallax emitter is disclosed for use, for example, in a display. The display includes a light modulator as well as the rear parallax emitter. The light modulator comprises a plurality of pixels viewable at a viewing position. The rear parallax emitter comprises a plurality of sets of light emitting regions (LERs) and has an area substantially coextensive with the light modulator and spaced a prescribed uniform distance from the display opposite from a viewing position. Each set of LERs is independently controllable to transmit a light color that differs from a light color transmitted by another set of LERs.

33 Claims, 25 Drawing Sheets

Configuration A State 1

Configuration A State 2

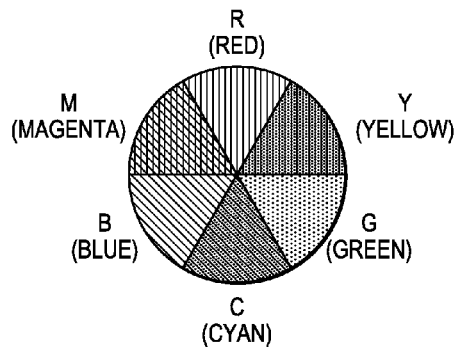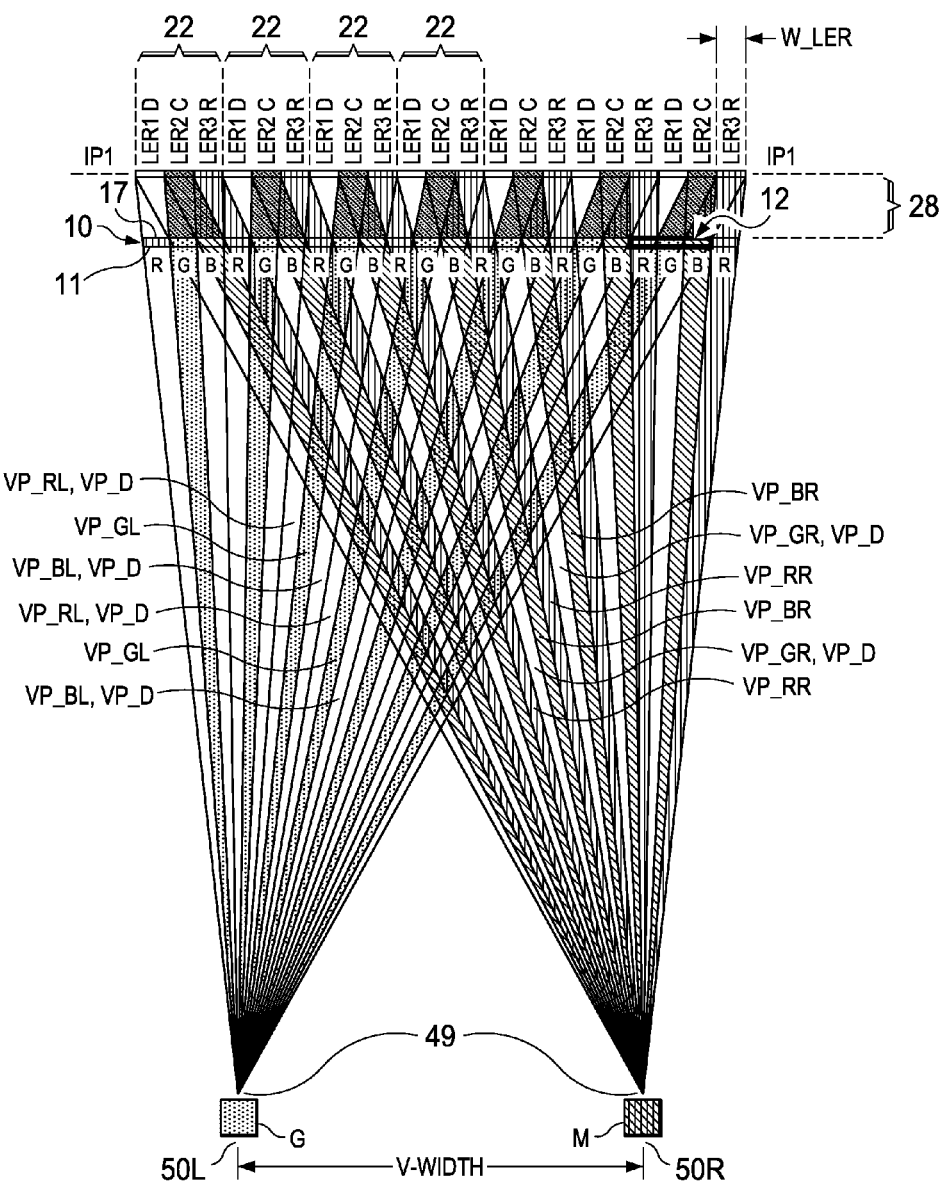
FIG. 8
Configuration B State 1

Configuration B State 2

Configuration B State 3

Configuration C State 1

Configuration C State 2

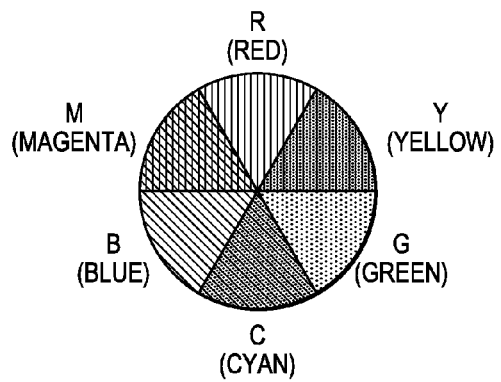
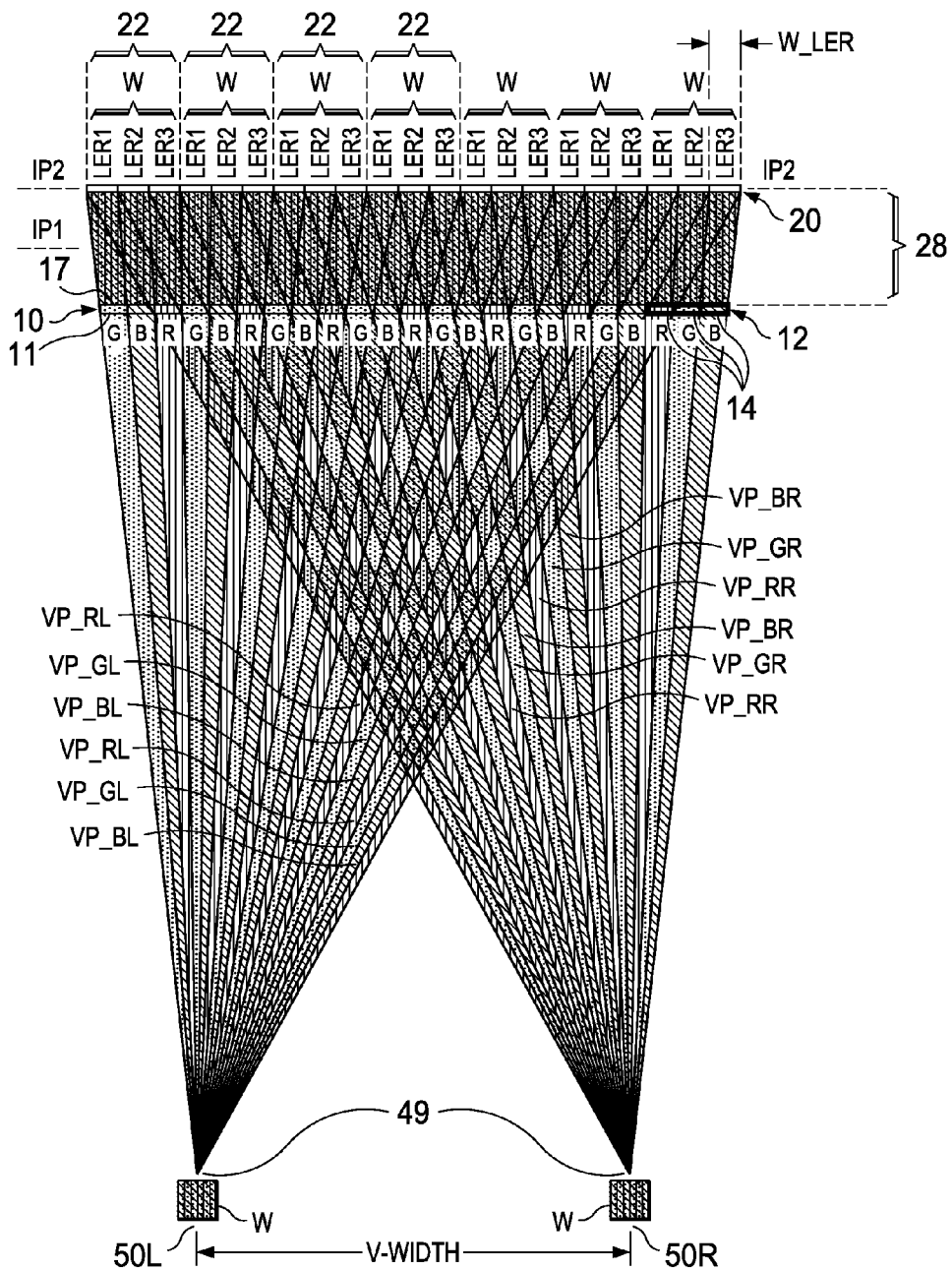
FIG. 13
Configuration C State 3

Configuration D State 1

Configuration D State 2

Configuration E State 1

Configuration E State 2

Configuration E State 3

Configuration F State 1

Configuration F State 2

Configuration F State 3

Configuration G State 1

Configuration G State 2

Configuration G State 3

TWO AND THREE-DIMENSIONAL IMAGE WITH OPTICAL EMISSION FREQUENCY CONTROL

BACKGROUND

The disclosure relates generally to stereoscopic 3D imaging methods and systems. More particularly, the disclosure relates to auto-stereoscopic systems for viewing 3D images without the use of spectacles. Still more particularly, the present disclosure relates to displays systems which produce 3D images to experience the perception of depth.

Existing stereoscopic display systems using binocular parallax information are mainly categorized into two groups. In the first group, stereoscopic vision is achieved using a pair of special spectacles, e.g., polarizing spectacles, LC shutter spectacles, or anaglyphic spectacles, whereas in the second group, stereoscopic vision is achieved using a specific optical member, e.g., a lenticular lens or parallax barrier, arranged in front of a display or inside a display. In the second group, an observer may observe stereoscopic still or motion pictures without the need for special spectacles.

Traditional parallax barriers include an array of thin opaque vertical stripes placed on a transparent substrate. This configuration ensures that light reaching the viewer's left viewpoint originates from a different set of pixels or sub-pixels of an RGB display from that reaching the viewer's right viewpoint.

One inherent disadvantage of parallax barriers is that a substantial amount of the light being emitted by the display's light source is prevented from reaching the viewer by barrier regions due to absorption, reflection, or a combination thereof. Although some of the reflected light may be recycled and rerouted towards the viewer in order to increase light output efficiency and to limit power consumption, invariably a considerable amount of light loss will be incurred.

BRIEF SUMMARY OF THE DISCLOSURE

The disclosed embodiments are directed to a rear parallax emitter for use in a display that may produce a 2D image and a 3D image. In various embodiments, a parallax barrier is not included as part of the display. Some embodiments are directed to a display comprising a light modulator and a rear parallax emitter. The light modulator comprises a plurality of pixels viewable from at least one viewing position. The rear parallax emitter comprises a plurality of sets of light emitting regions (LERs) and has an area substantially coextensive with the light modulator and spaced a prescribed uniform distance from the light modulator opposite from a viewing position. Each set of LERs is independently controllable to transmit a light color that may differ from a light color transmitted by another set of LERs.

Other embodiments are directed to a display also comprising a light modulator and a rear parallax emitter. The light modulator comprises a plurality of pixels viewable at a viewing position. The rear parallax emitter comprises a plurality of sets of light emitting regions (LERs) and has an area substantially coextensive with the light modulator and spaced a prescribed uniform distance from the light modulator opposite a viewing position. Light from the rear parallax emitter passes through the light modulator's pixels to create a parallax effect. Each set of LERs is independently controllable to transmit light.

In some embodiments, a backlight unit comprises a panel including a plurality of sets of light emitting regions (LERs) and configured to be provided on a side of a light modulator opposite a viewing position. Each set of LERs is controllable to transmit a light color that differs from a light color transmitted by another set of LERs.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the disclosed embodiment(s) of the invention, reference will now be made to the accompanying drawings in which:

FIG. 8 is a schematic diagram depicting a top view of stereoscopic viewing system configuration B incorporating a dynamically switchable three-segment sub-pixel rear parallax emitter at the first rear intersection plane (IP1 relative to the overlying sub-pixels of the modulating display panel), set to its first dynamic state.

FIG. 13 is a schematic diagram depicting a top view of stereoscopic viewing system configuration C incorporating a dynamically switchable three-segment sub-pixel rear parallax emitter at the second rear intersection plane (IP2 relative to the overlaying overlying sub-pixels of the modulating display panel), set to its third dynamic state.

DETAILED DESCRIPTION OF THE DISCLOSED EMBODIMENTS

Figure 1:
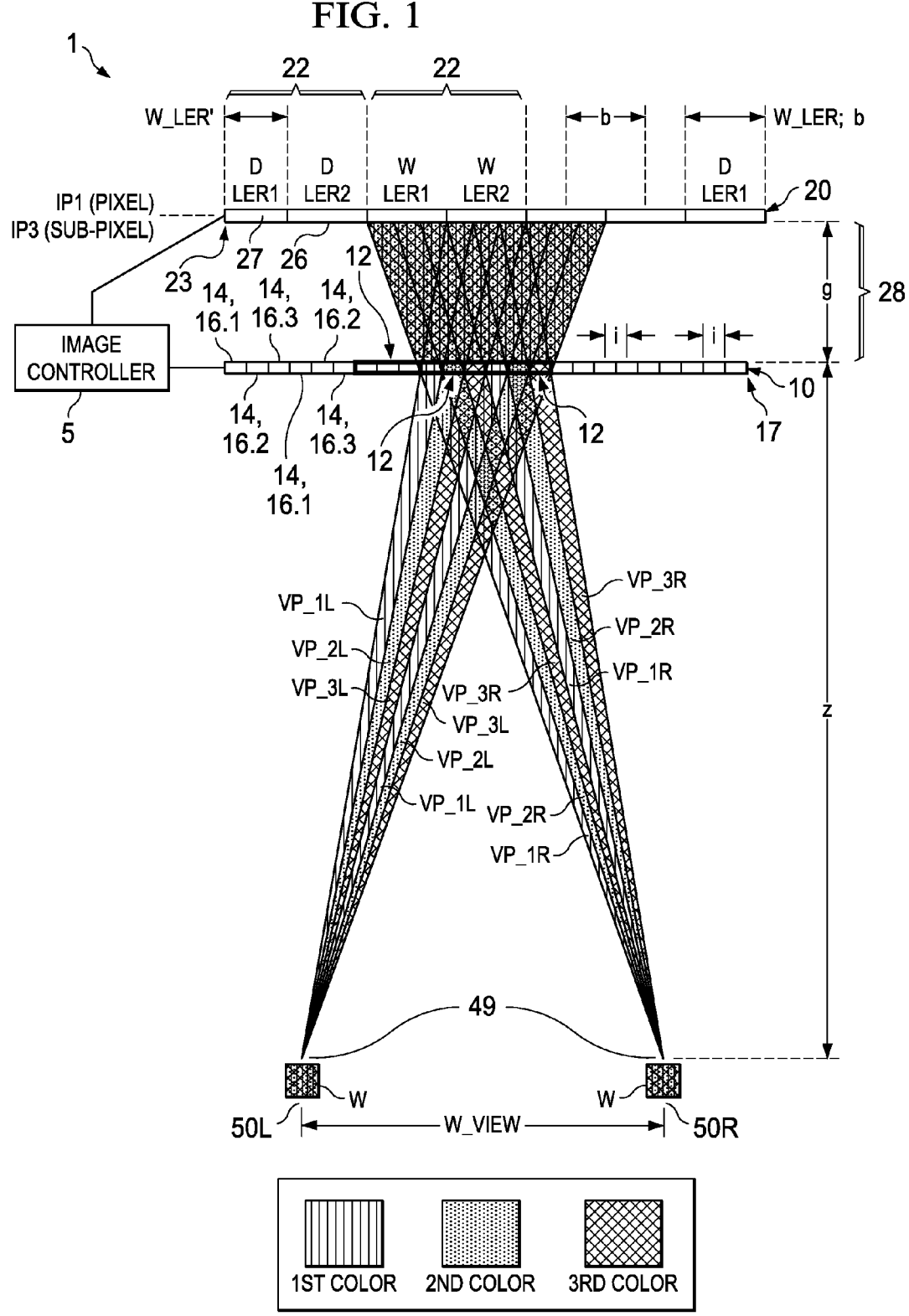
FIG. 1 schematic diagram depicting a top view of the basic geometry of a stereoscopic viewing system incorporating a rear parallax emitter in accordance with at least one embodiment of the disclosure. The intersection of left and right viewing paths between a light modulator and the rear parallax emitter is depicted for several viewing paths.

The following discussion is directed to various embodiments of the invention. The embodiments disclosed should not be interpreted or otherwise used as limiting the scope of the disclosure, including the claims. In addition, one skilled in the art will understand that the following description has broad application, and the discussion of any embodiment is meant only to be exemplary of that embodiment, and not intended to suggest that the scope of the disclosure, including the claims, is limited to that embodiment.

Certain terms are used in the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form, and some details of conventional elements may not be shown in interest of clarity and conciseness. In addition, like or identical reference numerals may be used to identify common or similar elements.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples or is coupled to a second device, that connection may be through a direct connection, or through an indirect connection via other devices, components, and connections. If the connection transfers electrical power or signals, the coupling may be through wires, through wireless electromagnetic transmission, for example optical transmission, or through another means.

General Definitions, Abbreviations, and Comments

The following general definitions are given to clarify the meaning of terms used in the document. Some terms defined below are indicated on FIG. 1, which is discussed in the respective definitions. In some definitions, an assisting term may be used for clarification before the assisting term is itself defined or explained. The assisting term may be located at a later point in the disclosure.

"Auto-stereoscopic" refers to the faculty of presenting virtual 3D images without the need for the viewer to wear spectacles or headgear of any kind A "display," also called a stereoscopic viewing system, in the context of this disclosure refers to an apparatus that may produce a still or moving image for viewing. FIG. 1 schematically shows a sectional view of display 1. A display may comprise a "modulating display panel," for example light modulator 10, a backlight unit that includes a parallax emitter 20, and an image controller 5. In the context of certain embodiments of this invention, a display does not include a backlight (which in the disclosed embodiments has been replaced by a parallax emitter) unless specifically stated otherwise. Example displays include televisions, computer monitors, displays for mobile telephones, displays for personal data assistant (PDA) devices, displays for electronic book devices, etc. In some embodiments, the display comprises a flat panel display.

"Backlight" refers to a light source used in liquid crystal flat panel (LCD) displays to illuminate the image formed by the LCD screen. A backlight is located behind the LCD panel and produces light that shines through the LCD screen toward the viewer.

A "rear parallax emitter" or simply "parallax emitter" is a novel type of light source used in the present disclosure. More specifically, parallax emitter refers to a plurality of light emitting regions (LERs) positioned substantially at and parallel to one specific intersection plane as defined herein. The term rear parallax emitter is used to indicate that the light source is located behind the light modulator with respect to the viewer.

"Light-emitting region" (LER) or "region" refers to a single independently controllable region of the parallax emitter. An LER is controllable to transmit light substantially comprised of a prescribed spectral range. The preferred plural form of LER will be written a "LERs."

"Sub-pixel" refers to the smallest addressable unit on a modulating display panel within a display. Light from the light source shines through the sub-pixels and toward the viewer and each sub-pixel is configured to transmit light of a particular spectral range to the viewer upon receiving a signal from a display controller. For a color display, the sub-pixel blocks one or more other spectral ranges of light. Sub-pixels may be of a variety of shapes. Sub-pixels are rectangular in some embodiments but are other than rectangular in other embodiments. Further, the orientation, arrangement, transmission color, groupings, and quantity of sub-pixels may be varied. A sub-pixel may be referred to by a particular color (e.g., a "red" sub-pixel). The reference to a color means that the sub-pixel is configured to transmit light of that particular color.

"Pixel" refers to a grouping of one or more sub-pixels. In some embodiments, each pixel comprises an array of three adjacent sub-pixels, each transmitting light of a different spectral range, e.g., red, green, and blue for an RGB pixel. When combined in varying intensities these three colors may produce other colors of light, including white light. The present disclosure will refer primarily to RGB pixels. However, while following the principles disclosed herein, other embodiments, may include pixels comprising more than three sub-pixels, e.g., red, green, blue, and yellow for an RGBY pixel. Still other embodiments may include RGBW pixels with red, green, blue, and white sub-pixels. Pixels may be of a variety of shapes. Pixels may be rectangular in some embodiments but may be other than rectangular in other embodiments. Further, the orientation, arrangement, transmission color, groupings, and quantity of pixels and sub-pixels may be varied.

"Modulating display panel" or "light modulator" refers to a portion of a display that comprises one or more pixels and is configured to form an image for the viewer. The light modulator may also be referred to as a display screen.

"Color" refers to one or more spectral ranges of light. When a color, such as green or magenta, is discussed, the color should be considered to represent a broad spectral range of light frequencies (or equivalently wavelengths) that are generally perceived as being similar to the color name given. The term "green," "magenta," or any other color name should not be interpreted as referring exclusively to a single wavelength or a narrow band of wavelengths of light, unless an exclusive interpretation is stated. Furthermore, an expression such as "a yellow spectral range," for example, may refer to one spectral range or a set of multiple spectral ranges, all of which separately or in combination, may be perceived similar to the stated color, i.e. yellow. The same broad interpretation is intended when a spectral range of light is reference by a number, such as "a first color" or "a second color." When such a numbered color is stated, it refers to an, unspecified color. The number color should not be interpreted as referring exclusively to a particular color for all situations. Rather, the same term may refer to one of many different spectral ranges of light when the same term is used in different contexts or for different embodiments.

The spectral ranges of color emitted by each LER may be varied for various optical states of the various configurations described herein. References to LER emission colors and sub-pixel transmission colors are made for clarity only and should not be interpreted as a limiting embodiment. The order of the color assignments of LERs and sub-pixels may be changed from that described herein so long as the new arrangement maintains a similar relationship between the emission colors of the LERs and the color transmissions of the receiving sub-pixels on the light modulator 10. For example, the color patterns for the LERs and the sub-pixels of any given embodiment could be shifted left or right (for example, first becomes second, second becomes third, and so on) by the same spacing and still result in a valid embodiment.

"All light," or equivalently "all sets of spectral ranges" is a broad term that describes an emission of a broad range or ranges of wavelengths from an LER sufficient to illuminate any and all pixels or sub-pixels aligned with and intersecting the region's viewing paths. All light includes a broad spectral range such that the color of all aligned pixel(s) or sub-pixel(s) in a given embodiment of display 1 may be perceived by a viewer. "All light" will sometimes be indicated by the designator "W." In some examples, "all light" will refer to white light.

The table below describes one non-limiting example of color designations as reference in the text and Figures.

| | Color Designator | |
|---|---|---|
| Cyan | C | |
| Red | R | |
| Yellow | Y | |
| Blue | B | |
| Magenta | M | |
| Green | G | |
| "all light" | W | In some situations, "W" will refer to white light. |
| Dark | D | Absence of color; substantially no light |

Note that white light may be formed by combining the members within any of the following groupings: R+G+B, C+Y+M, C+R, Y+B, M+G. In the color groupings listed, the addition of Y from an RGBY pixel or the addition of W from an RGBW pixel will also result in white light.

"Compatible" and "Incompatible" will be used in reference to the ability or inability, respectively, of light emitted from a light emitting region (LER) to pass through a given sub-pixel on the modulating display panel and be visible to one or more viewers. Specifically, "compatible" means that at least a portion of the spectral range of light emitted by the LER is able to pass through the sub-pixel. Conversely, "incompatible" means that little or no portion of the spectral range of light emitted by the LER is able to pass through the sub-pixel. By definition, at least a portion of the spectral range of "all light" is capable of passing through all sub-pixels of any color within a particular embodiment of display 1 and is therefore compatible with those sub-pixels.

"Viewpoint" refers to one point in space from which light may be observed or recorded. In the context of this disclosure all viewpoints are aimed toward the modulating display panel.

"Viewer" refers to two viewpoints that are generally equidistant from the modulating display panel, such that stereoscopic viewing of the display panel is possible. Therefore, a viewer may be defined as having a left viewpoint (50L in the embodiments below) and a right viewpoint (50R in the embodiments below). The two viewpoints of a viewer may, for example, represent the locations of a person's first and second eyes while the person views the image(s) generated by the display panel (e.g., light modulator 10 in the embodiments below). As further examples, animals, robots, and cameras may also participate as viewers of the display panel. Throughout the text, when the left viewpoint and a right viewpoint are referenced, the reference should be interpreted to be inclusive of the more general combination of any two valid viewpoints.

"Viewing paths," which could also be called viewer-oriented "light paths," are regions defined by one or more lines connecting a viewpoint to a light emitting region (LER) on a parallax emitter (e.g., emitter 20 in the embodiments below) and passing through a pixel or sub-pixel on light modulator 10. Light from an LER may travel along a viewing path and reach a viewpoint. One or more light paths (LP) may be seen in FIG. 1 and FIG. 2 and in various other figures. As an example, if a viewpoint 50L, 50R is considered to be a single point, then in three dimensions, a viewing path may be a conical or rectangular prism. The same view path when represented on a two-dimensional diagram may appear as an elongate triangle. Light may travel either direction along a viewing path, but in the disclosed embodiments, light travels from LER, through one or more sub-pixels to viewpoint(s). Most notably, to be visible to a viewer 49, light transmitted by an LER travels along a viewing path, through a compatible sub-pixel, arriving at a viewpoint 50L, 50R. Viewing paths, as defined, are given descriptors that indicate the intersecting viewpoint 50L, 50R and the color of sub-pixel through which the viewing path passes. For example, a viewing path VP_RL extends from left viewpoint 50L, through a red sub-pixel, and continues by extending to an LER on the parallax emitter 20. The light from the LER travels in the opposite direction. The emission color of the LER is not used to designate the name of a viewing path. Thus "VP_RL" stands for "viewing path, red, left." In a similar fashion "VP_3R" describes a viewing path that may transmit an unspecified "third" color to right viewpoint 50R. Similar descriptors are used for other colors of light. Because, for example, sub-pixel viewing path VP_RL intersects a red sub-pixel, viewing path VP_RL may transmit to the designated viewpoint 50L only red light. However, in the region between the emitter 20 and light modulator 10, viewing paths may transmit any or all colors of light. One or more viewing paths extend to each viewpoint 50L, 50R.

An "interrupted viewing path" refers to a viewing path intersecting an LER that generates a color incompatible with the transmission color of the sub-pixel on the same viewing path. In such a situation, light travels from the LER and is substantially absorbed by the sub-pixel with little or no transmission to the aligned viewpoint 50L or 50R. Consequently, the pixel appears dark from the perspective of the viewpoint. In some embodiments or optical states of embodiments, an interrupted viewing path may result from an LER that is substantially not emitting light of any visible wavelength. On the various diagrams interrupted viewing paths may be designated by "VP_D," an abbreviation for "viewing path, dark." This lack of light transmission light to a viewpoint 50L or 50R may be intermittent.

"Intersection plane" (IP) refers to a parallel plane located a predetermined distance from the back surface of a light modulator. Two types of IPs will be considered: sub-pixel based intersection planes and pixel based intersection planes. At a sub-pixel based IP, a single light-emitting region (LER) intersects with a viewing path of the left viewpoint through an intervening sub-pixel situated generally to the left of the light-emitting region while concurrently intersecting a viewing path of the right viewpoint through a second intervening sub-pixel situated generally to the right side of the light-emitting region. Similarly, at a pixel based IP, the light from all sub-pixels of a single light-emitting region intersects with the all viewing paths of the left viewpoint that extend through an single intervening pixel situated generally to the left of the light-emitting region while concurrently intersecting all viewing paths of the right viewpoint that extend through an second intervening pixel situated generally to the right side of the light-emitting region. As an example, an RGB pixel is comprised of three sub-pixels. So, approaching the issue from another mental vantage point, at a RGB pixel based intersection plane, first eye viewing paths that extend through each of the three sub-pixels of a first pixel intersect uniquely with one of the three viewing paths of the second eye that extend through the three sub-pixels of a second, adjacent pixel. Light paths for a full pixel intersect with light paths from another full pixel at a pixel based intersection plane. Many theoretical pixel and sub-pixel intersection planes exist behind back surface of a display, i.e. on the side opposite the viewer. The intersections of light paths that define the intersection planes may be described from more than one mental viewpoint. Other descriptions may be used in the text when referring to an IP. In terms of geometry, the third sub-pixel based intersection plane is equal to the first pixel based intersection plane for a pixel comprised of three sub-pixels, such as RGB.

Implementation of Disclosed Embodiments and Methods

The following are example embodiments. It is contemplated that in other embodiments, certain features of any of the described configurations may be combined, or that certain features of the example configurations may be excluded. Numerous examples are provided herein that include references to specific colors. Such specific color references are merely examples and are provided merely to aid the reader's understanding of the various embodiments, and are not intended in any way to narrow the scope of this disclosure.

In keeping with at least one embodiment, FIG. 1, A presents the basic geometry of a stereoscopic display 1 incorporating a rear parallax emitter 20. Display 1 comprises a generally planar light modulator 10, an image controller 5, and a generally planar rear parallax emitter 20 having an area substantially coextensive with the light modulator 10 and spaced a prescribed uniform distance "g" from light modulator 10. Although light modulator 10 and rear parallax emitter 20 are two-dimensional and generally vertical in orientation, FIG. 1 shows only a one-dimensional, generally horizontal portion of emitter 20 and modulator 10. Essentially, FIG. 1 represents a planar section passing or cutting through both viewpoints 50L and 50R and intersecting with emitter 20 and light modulator 10. A viewer may be spaced at a distance of "z" from light modulator 10.

Continuing with FIG. 1, light modulator 10 comprises a two-dimensional array of uniformly spaced pixels 12, a front viewing surface 11, and a rear side 17. Panel 10 extends vertically and horizontally as does the incorporated array of pixels 12. Because FIG. 1 is a top view, only the horizontal dimension of the array of pixels 12 is visible. Each pixel 12 comprises a group of three sub-pixels 16 (although a different number of sub-pixels in other embodiments), each able to transmit light of a particular spectral range of color. In some embodiments, each pixel 12 comprises four sub-pixels, each able to transmit light of a particular spectral range of color. With the context of panel 10, all sub-pixels 16 of a given color may be considered to form a set or a group of sub-pixels. Numbering from the left side of FIG. 1 for convenience, the pixels 12 of light modulator 10 includes a first set of sub-pixels 16.1 controllable to project light in a first spectral color, a second set of sub-pixels 16.2 controllable to project light in a second spectral color, and a third set of sub-pixels 16.3 controllable to project light in a third spectral color. Not every member of each set of sub-pixels is indicated on FIG. 1. Alternatively the display may also include one or more additional sets of sub-pixels (not shown) controllable to project light in one or more other spectral colors.

In FIG. 1 a representative sample of the members the first 16.1, second 16.2, and third 16.3 sets of sub-pixels are indicated with descriptors. In at least one embodiment, the display's first 16.1, second 16.2, and third 16.3 sets of sub-pixels all are controllable by image controller 5 to transmit light received from the rear side 17 of the light modulator 10 opposite the viewer 49. The viewer 49 may receive light from display 1 at two viewpoints 50L, 50R, which in some situations represents the location of the viewer's left and right eyes. In general display 1 has one or more sets of viewpoints 50L, 50R representing the possible locations for one or more viewers 49. While using display 49, viewpoints may 50L, 50R shift to represent the possible movement of viewer 49. The bold lines delineating some of the pixels 12 in FIG. 1 are added for clarity only and do not necessarily represent an actual feature associated with a pixel.

Rear parallax emitter 20, defined previously, comprises a plurality of elongate light emitting regions (LERs), each controllable to transmit light substantially comprised of a prescribed spectral range. Emitter 20 may be configured with one or more sets of LERs. Each set may have one or more LER. FIG. 1 shows an example with two sets LER1, LER2. The LERs may be created in any of a variety of manners. For example, U.S. patent application Ser. No. 13/072,159 (incorporated herein by reference) describes a wave guide impregnated with microstructures. Light devices such as light emitting diodes (LEDs) arranged along one or more sides of the wave guide emit light of prescribed colors into the wave guide. As light contacts a microstructure, the light is extracted through the microstructure and out the wave guide toward the pixels on the light modulator 10. In other embodiments, color filters in front of, for example, white light may be used to create the various colors of the LERs. Further still, a patterned light emitting material, such as OLED, EL, Quantum Dots, Phosphor, plasma, etc. may also be used to generate the appropriate light for the LERs. In yet other embodiments, grating, Fabray Perot filters, prisms, or other optical devices may be included to filter or alter the angular distribution of the visible wavelength spectrum to produce the appropriate colors of light.

In some embodiments, each LER has an elongate shape, but may have different shapes in other embodiments. The LERs comprise a rectangular front emitting surface 26 that faces the rear side 17 of light modulator 10. The height (not shown) of an LER is generally longer that the width, W_LER. LERs of differing widths, W_LER, may be incorporated into a single parallax emitter 20. For example the light emitting region 27 near the left front vertical edge 23 of parallax emitter 20, has a width of, W_LER', which is different than the width, W_LER, of the other LERs. (Left front edge 23 is a vertical line and therefore, appears only as the point of a corner In FIG. 1.) In FIG. 1, width, W_LER', is shown to be smaller than width, W_LER, but, in general, W_LER' for one or more LERs could be smaller or larger than W_LER for other LERs. In some embodiments W_LER' will be a fraction, e.g. one third, one quarter, two thirds, etc., the magnitude of W_LER. The differing widths of LERs may be achieved by the presence of an opaque object covering a portion of an LER that is similar in size to the other LERs, or a differing width may be achieved by the presence of one or more LERs with a different physical dimension. The pitch spacing between adjacent LERs is designated as "b." For adjacent LERs of the same width, the spacing, b, is essentially equal to the width, W_LER.

Generally, a light emitting region (LER) will be configured to emit light over a range of the light spectrum. Further, in certain embodiments, each LER may be configured to operate in more than one dynamic optical state. Each dynamic optical state may be characterized by the emission a specific sub-spectrum range, i.e. a portion of the full emission spectrum of the LER. Dynamic operation of the LER may consist of the sequential time-multiplexed transmission of two or more optical states, each producing a unique sub-spectrum range of light. When utilizing all optical states of the LER, one complete time-multiplexed cycle may then produce the entire set of spectral ranges emitted by the LER. Within each set of LERs, LER1, LER2 for example, all LERs of the set are configured to emit, or equivalently to transmit, simultaneously the same spectral range or sub-spectrum range of light. Image controller 5 of display 1 may be configured to include control logic to facilitate this optical-state-switching capability. In some embodiments, the image controller 5 may be part of the rear parallax emitter 20, while in other embodiments, the image controller 5 is separate from the parallax emitter.

For example, an LER configured to emit a light spectrum ranging in wavelength from 500 nm to 700 nm may be configured in a first dynamic optical state to transmit a subset of spectral ranges spanning 500 nm to 580 nm. The same LER may be configured in a second dynamic optical state to transmit a subset of spectral ranges spanning 581 nm to 650 nm and configured in a third dynamic optical state to transmit a subset of spectral ranges spanning 651 nm to 700 nm. The rapid cycling between all three of these optical states will visually yield an entire optical emission range of 500 nm to 700 nm. In some embodiments, another optical state for the same LER may emit the full range of 500 nm to 700 nm without cycling. In some embodiments, the spectral ranges of two or more optical states may overlap.

In the description of the various embodiments below, reference will be made to specific colors of light. As explained earlier, any reference to a color is meant to describe a spectral range of color. The colors (i.e. spectral ranges of colors) are examples of possible color selections. A second discussion will describe the embodiment in general terms, using numbers to reference each spectral range. That second discussion pertains to each embodiment. Examples may include "a first color" and "a second color." No particular spectral range (e.g. yellow, blue, red, etc.) is inferred by the color numbers.

In the following discussion, the term "configuration" will refer one or more embodiments having one or more characteristics in common. Each configuration will include one or more optical "state(s)." The optical states may have one or more characteristics in common with each other and will have one or more unique features that will be described. A configuration will be explained, at least in part, by the distance between the parallax emitter 20 and the light modulator 10. In particular, the parallax emitter 20 will be located substantially at a specific intersection plane. A configuration and its associated optical states will be explained, at least in part, by the size and relative placement of a repeating pattern 22 of vertically oriented regions (LERs) of the parallax emitter 20 with respect to the arrangement of the sub-pixels 14 of the light modulator 10. In additional to the embodiments disclosed, other embodiments may comprise a combination of features from one or more disclosed embodiments or one or more disclosed configurations.

Discussion of Viewing Paths

Figure 2:
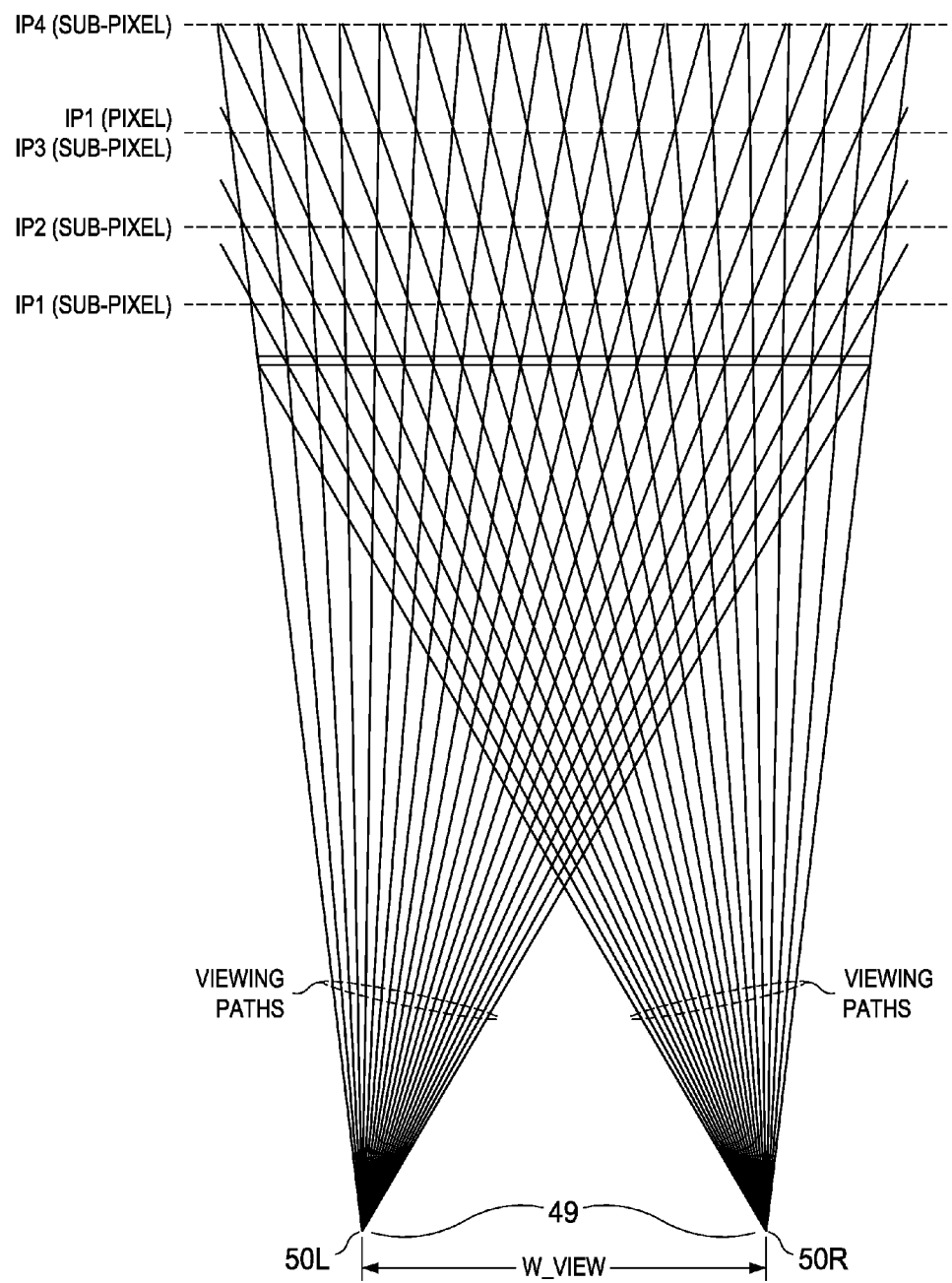
FIG. 2 is a schematic diagram depicting a top view of the intersections of left and right viewing paths that define the first four sub-pixel based rear intersection planes and one pixel based rear intersection planes, or layers, behind a light modulator of a stereoscopic viewing system incorporating a rear parallax emitter in accordance with at least one embodiment of the disclosure.
Figure 5:
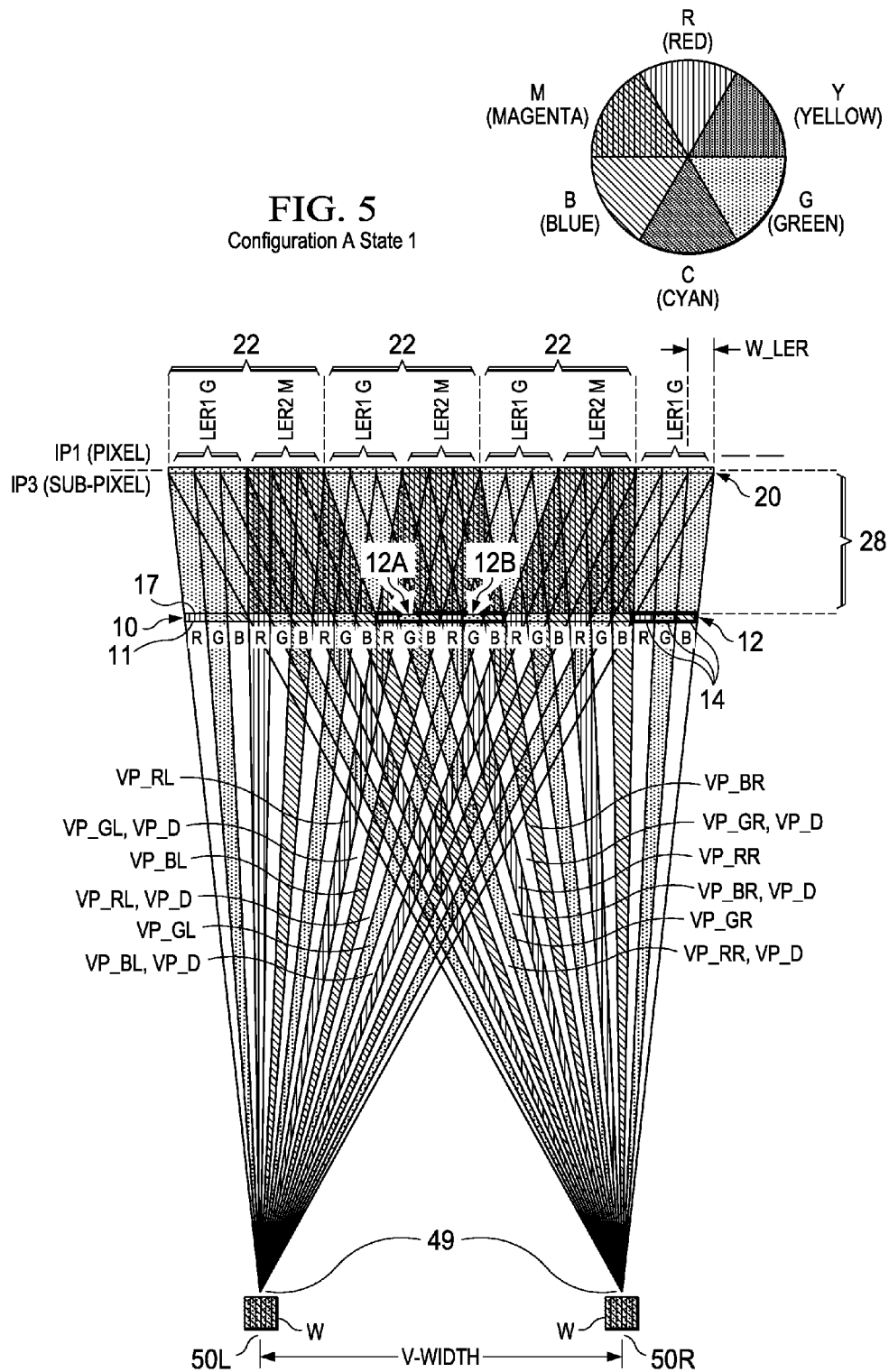
FIG. 5 is a schematic diagram depicting a top view of stereoscopic viewing system configuration A incorporating a dynamically switchable two-segment full pixel rear parallax emitter at the first rear intersection plane (IP1 relative to the overlaying light modulator 10 pixels, or IP3 relative to the overlying sub-pixels of the modulating display panel), set to its first dynamic state.

Reference will now be given to FIGS. 2 and 5, which shows a plurality of intersecting viewing paths in accordance with at least one embodiment. FIG. 2 shows a series of viewing paths without defining the arrangement of sub-pixel colors. This is the general case applicable to more than one embodiment. To aid in the discussion, reference is given to FIG. 5 because it shows one of many arrangements of pixel colors. In general, one of the other FIGS. 6 to 26 might also be used to interpret this discussion. The discussion may apply equally to these and to other such embodiments.

Over the next several paragraphs, viewing paths and the intersections of viewing paths will be explained as part of the explanation of the disclosed embodiments. The term "viewing path" has been previously defined in reference to the viewpoint 50L, 50R and the sub-pixel through which the viewing path passes. The transmission color of the sub-pixel helps to define a particular viewing path. In FIG. 5, as an example, the first pixel on the left hand side of the embodiment of light modulator 10 is shown to be a red (R) pixel 14. Green (G) and blue (B) pixels 14 follow. However, in at least one other embodiment, the first pixel on the left hand side of a light modulator is a color other than red. Other rearrangements of the sub-pixels may be possible. The present discussion of viewing paths and the intersections of viewing paths is intended to describe all such embodiments.

Light may travel either direction along a viewing path, e.g. viewing path VP_GL. Notably, light generated by LERs on parallax emitter 20 may travel through sub-pixels 14 of light modulator 10 to viewpoints 50L, 50R.

In at least one embodiment, at least one viewing path VP_RL, VP_GL, VP_BL extends between left viewpoint 50L and a light emitting region (LER) on parallax emitter 20. In FIG. 5, a viewing path VP_GL extends between left viewpoint 50L and one of the green (G) sub-pixels 14 and continues to an LER on the parallax emitter 20. A similar viewing path VP_GL is defined between left viewpoint 50L and each of the green (G) sub-pixels 14.

Continuing to reference FIG. 5, in the same way, a viewing path VP_RL extends between left viewpoint 50L and each red sub-pixel 14(R) of light modulator 10 and continues by extending between the particular red (R) sub-pixel 14 and an LER on the parallax emitter 20. A viewing paths VP_BL extends between left viewpoint 50L and each blue sub-pixel 14 (B) and continues by extending between the particular blue (B) sub-pixel 14 and an LER on the parallax emitter 20.

For particular viewing path VP_RL, VP_GL, VP_BL, if the color emitted by the aligned LER is compatible with the transmission color of the sub-pixel 14 on then light may be transmitted from the LER, through the sub-pixel 14, and to left viewpoint 50L. As an example, LER emission colors compatible with green sub-pixels 14 (G) are green, cyan, and yellow, assuming the cyan and yellow each define a spectrum of light containing green rather than a narrow spectrum or a single wavelength as might be generated by a laser. If the emission color of the LER is incompatible with the transmission color of the sub-pixel 14 along a given viewing path VP_RL, VP_GL, VP_BL little or no light will be transmitted from the LER, through the sub-pixel 14, and to left viewpoint 50L. As an example, colors incompatible with green sub-pixels are blue, red, and magenta because those colors substantially contain no green.

Viewing paths VP_RL, VP_GL, VP_BL that are not configured to transmit light to a viewpoint 50L, 50R in a particular embodiment appear dark (but represented as white in the figures) to the corresponding viewpoint 50L or 50R and are considered interrupted viewing paths VP_D. In at least on embodiment, one or more interrupted viewing paths VP_D result from an intentional incompatibility between the emission color of an LER and the transmission color of a sub-pixel 14 aligned along a given viewing path. In at least on embodiment, one or more interrupted viewing paths VP_D result from an LER that is configured to emit substantially no light of any visible wavelength. Examples of interrupted viewing paths VP_D may be seen in FIG. 5, for example, and in one than one other subsequent figure.

Referring again to FIG. 5, in at least one embodiment, at least one viewing path VP_RR, VP_GR, VP_BR extends between right viewpoint 50R and a light emitting region (LER) on parallax emitter 20. In the example shown, a viewing path VP_GR extends between right viewpoint 50R and each green (G) sub-pixel 14 and continues by extending between the particular green (14) sub-pixel 14 and an LER on the parallax emitter 20. A viewing path VP_RR extends between right viewpoint 50R and each red (R) sub-pixel 14 of light modulator 10 and continues by extending between the particular red (R) sub-pixel 14 and an LER on the parallax emitter 20. A viewing path VP_BR extends between right viewpoint 50R and each blue (B) sub-pixel 14 of light modulator 10 and continues by extending between the particular blue (B) sub-pixel 14 and an LER on the parallax emitter 20. Viewing paths VP_RR, VP_GR, VP_BR that are not configured to transmit light from an LER to a viewpoint 50L, 50R in a particular embodiment appear dark to the corresponding viewpoint 50L or 50R and are considered interrupted viewing paths VP_D.

Intersection Planes Formed by Viewing Paths

Continuing with FIG. 5, the intersections of various viewing paths the placement of the parallax emitter 20 will now be described. The intersection of viewing paths VP_RL, VP_GL, VP_BL from left viewpoint 50L with at least some of the viewing paths VP_RR, VP_GR, VP_BR from right viewpoint 50R BR will be evaluated in a region 28 located near and beyond the rear side 17 of light modulator 10. Rear side 17 is located opposite viewpoints 50L, 50R of viewer 49. Therefore, region 28 is considered to be "behind" light modulator 10, which is also called a light modulator. In one or more embodiments, one or more of the referenced viewing paths are interrupted viewing paths VP_D. Interrupted viewing paths contribute little or nothing to the light observed at the corresponding viewpoint. Even so, the interrupted viewing paths VP_D are included in this discussion of intersecting viewing paths and should not be overlooked.

In general, the rear parallax emitter 20 is located at one of multiple intersection planes behind the light modulator. Such multiple successive intersection planes are located where light paths extending through a first set of pixels (or sub-pixels) from a first eye position cross light paths extending through a second set of pixels (or sub-pixels) from a second eye position. Each successive intersection plane is located a predetermined, substantially uniform distance from the light modulator.

In region 28, one or more viewing paths VP_GL defined from left viewpoint 50L and extending rightward through a green sub-pixel 14 (G) cross, i.e. intersect, the viewing paths VP_BR, VP_RR, VP_GR defined from right viewpoint 50R and extending through a blue sub-pixel 14 (B), red sub-pixel 14 (R), and green sub-pixel 14 (G) respectively, located on the right side of the green sub-pixel 14 (G). As viewing path VP_GL extends rightward, reaching farther behind rear side 17, viewing path VP_GL intersects more viewing paths VP_RR, VP_GR, VP_BR extending from the opposing, right viewpoint 50R and continuing through sub-pixels located to the right side of the sub-pixel through which the particular viewing path VP_GL extends.

Referring to FIG. 5, in the same manner, one or more viewing paths VP_GR defined from right viewpoint 50R and extending leftward through a green sub-pixel 14 (G) intersects the viewing paths VP_RL, VP_BL, VP_GL defined from left viewpoint 50L and extending through one or more red (R) sub-pixels 14, blue (B) sub-pixels 14, and green sub-pixels 14 (G), respectively, located on the left side of the green (G) sub-pixel 14 shared by the particular viewing path VP_GR. As viewing path VP_GR extends leftward, reaching farther behind rear side 17, viewing path VP_GR intersects more viewing paths VP_RL, VP_BL, VP_GL extending from the opposing, left viewpoint 50L and continuing through sub-pixels located to the right side of the sub-pixel through which the particular viewing path VP_GL extends. Similar statements could be made if the discussion were introduced by starting with a viewing path VP_RL, VP_RR passing through a red (R) sub-pixel 14 or if the discussion were introduced by starting with a viewing path VP_BL, VP_BR passing through a blue (B) sub-pixel 14.

The viewing path intersections that have been described define a succession of sub-pixel based and pixel based rear intersection planes spaced from the light modulator 10 as presented in the example of FIG. 5. The general case is presented in FIG. 2 without reference to the arrangement of pixel color. Each successive intersection plane (IP) is located at a predetermined, substantially uniform distance from the rear side 17 of light modulator 10 and opposite viewer 49. That is to say, the described rear intersection planes are located in region 28. The intersection plane nearest the back side 17 of light modulator 10 is the first sub-pixel based intersection plane, IP1. The next closest plane is the second sub-pixel based intersection plane, IP2. As the viewing paths extend farther and each achieves a total of three intersections with neighboring viewing paths, the viewing paths reach a third intersection plane spaced away from display panel 20 in region 28. The third intersection plane equates to the third sub-pixel based intersection plane "IP3" and equally to the first pixel based intersection plane "IP1(pixel)." That is to say, at this specific distance, three viewing paths extending from the left viewpoint 50L and all passing through a first pixel intersect three other viewing paths extending from the right viewpoint 50R and all passing through the rightward-adjacent second pixel. An RGB pixel has three sub-pixels, so at IP1(pixel) each of the three sub-pixel viewing paths passing through a first pixel and viewpoint 50L of viewer 49 intersects uniquely with one of the three sub-pixel viewing paths shared by a rightward-adjacent second pixel and viewpoint 50R. FIG. 5 may clarify this geometry. Other intersection planes exist farther behind light modulator 10.

As shown in the combined disclosure of FIGS. 1 and 2, in at least one embodiment, a repeating pattern 22 of light emitting regions (LERs) of parallax emitter 20 is located at just one of the successive intersection planes (IP), situated on the side of the light modulator 10 opposite viewer 49. The repeating pattern 22 comprises one or more vertically oriented light-emitting regions (LER). Because the reference figures represent non-vertical, planar section of display 1, the vertical dimension of the LERs is not apparent in the figures. Each LER has a width (e.g. W_LER, W_LER') that is substantially equal to width (W_I) of the viewing path intersections on the selected intersection plane. The width of each LER is selected to illuminate one or more sub-pixels from the vantage of a viewpoint 50L, 50R. The spectral ranges of color emitted by each LER may be varied for various embodiments and will therefore be specified later when the various embodiments are individually explained.

More generally, referring again to FIGS. 1 and 2, the intersections of viewing paths may be defined without specific reference to the spectral color ranges (R), (G), (B) of the three groups of sub-pixels 14. Instead, the three sub-pixel groups may be designated as first, second, and third without specifying which color range is the first, second, or third color as exemplified in FIG. 1. In these embodiments, members of the first 16.1, second 16.2, and third 16.3 sets of sub-pixels are controllable to transmit light received from the side of the light modulator 10 opposite the viewer 49. Display 1 will now be described in this more general manner.

In the region 28 between the parallax emitter 20 and the light modulator 10, one or more viewing paths VP_1L, which is defined from left viewpoint 50L and extends through a member of first set of sub-pixels 16.1, crosses, i.e. intersects, other viewing paths that extend from an LER to right viewpoint 50R. At one of these intersections, the viewing path VP_1L crosses a viewing path VP_2R extending through nearby, rightward member of a second set of sub-pixels 16.2. Farther from rear surface 17, the same viewing path VP_1L intersects, a viewing path VP_3R extending through a nearby, rightward member of a third set of sub-pixels 16.3. Still farther from rear surface 17, the same viewing path VP_1L intersects a viewing path VP_1R extending through a different, rightward member of the first set of sub-pixels 16.1. Although a limited number of intersections for a viewing path VP_1L are shown in FIG. 1, due in part to the inclusion of a series of LERs of a parallax emitter 20, theoretically, a greater number of intersections of VP_1L may exist. The total number of intersections will depend on total number of viewing paths associated with of viewpoints 50L, 50R, which in term depend on the width of the display 1 and components 10, 20 and, in a practical sense, depend on the angular acuity of viewer 49. Similar statements could be made if the discussion were introduced with a viewing path VP_1R from viewpoint 50R intersecting one or more viewing paths VL_1L, VL_2L, VP_3L from viewpoint 50L. Similar statements could also be made if the discussion were introduced with a viewing path VP_2L, VP_2R passing through a member of second set of sub-pixels 16.2 or if the discussion were introduced with a viewing path VP_3L, VP_3R passing through member of third set of sub-pixels 16.3.

In general, some of the viewing paths VP_1L, VP_2L, VP_3L, VP_1R, VP_2R, VP_3R may be interrupted viewing paths VP_D, as discussed in the previous definition of intersecting viewing paths. Interrupted viewing paths VP_D are not shown in FIG. 1 but will be shown in later figures that describe the disclosed embodiments in greater detail. .

The viewing path intersections that have been described define a succession of sub-pixel based intersection planes spaced from the light modulator 10, each successive intersection plane (IP) being located a predetermined, substantially uniform distance from the rear side 17 of light modulator 10 and opposite viewer 49. That is to say, the described intersection planes are located in region 28. One of these planes is the first sub-pixel based intersection plane, IP1. Another is the second sub-pixel based intersection plane, IP2. A third intersection plane equates to the third sub-pixel based intersection plane IP3 and equally to the first pixel based intersection plane IP1 (pixel). Other intersection planes exist farther behind light modulator 10. In one or more embodiments, a parallax emitter 20 is located at exactly one intersections plane (IP).

Geometry of a Rear Parallax Barrier

The concept of viewing path intersection planes was defined previously. Next, the mathematical basis will be explained regarding the location of viewing path intersection planes between a rear parallax emitter and a modulating display panel, for example display panel 20 of display 1. The discussion will refer to FIGS. 3 and 4. The discussion will also explain how the distance, z, between a viewer and the display panel 20 may be altered by changing the distance, g, between the rear parallax emitter and the back surface of the modulating display panel.

The symbols use in this discussion or in the reference figures may be defined as follows.

"b" refers to the LER pitch, i.e. the distance between adjacent light emitting region (LERs) on parallax emitter 20

"e" refers to the width of a viewing window centered between viewpoints 50L, 50R, for a viewer at a distance z from the display panel 20. The viewing window describes the lateral region in which viewer 49 may move left-to-right or visa versa and receive illumination from a single, point-like region on an LER when the light passes through any one aligned pixel. In some situations width, e, will be equal to the width, W_view, between viewpoint 50L and 50R.

"g" refers to the distance or gap between the parallax emitter 10 and the modulating display panel 20

"i" refers to the spacing between pixels, which is essentially equivalent to the width of a pixel.

"W_LER" refers to the width of an LER.

"W_view" refers to the spacing between viewpoint 50L and 50R.

"z" refers to the distance between a viewer 49 and the light modulator 10

Figure 3:
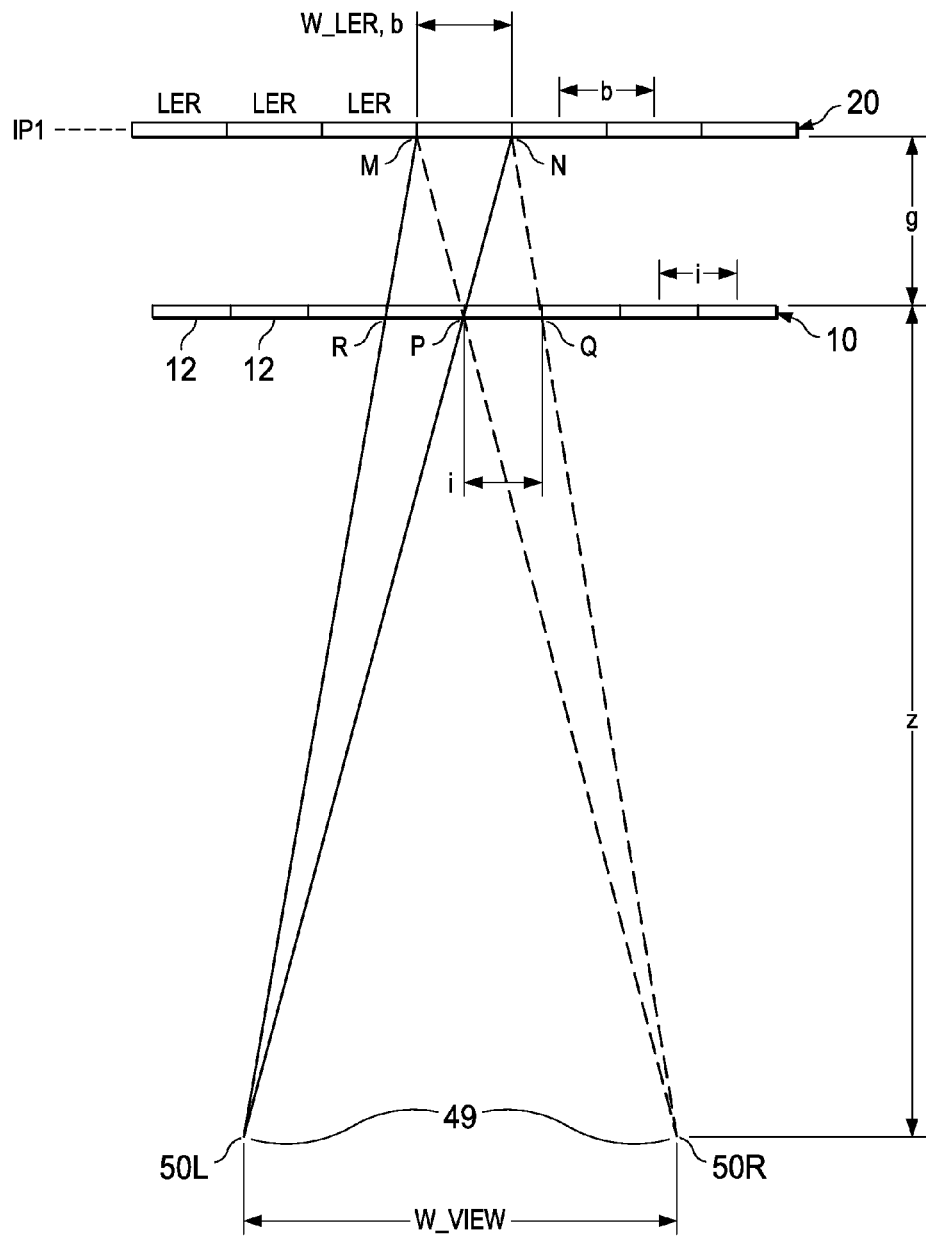
FIG. 3 is a schematic diagram depicting a top view of the basic geometry of a stereoscopic viewing system incorporating a rear parallax emitter in accordance with at least one embodiment of the disclosure. The geometry in the FIG. 3 describes the portion of a light emitting region (LER) of a rear parallax emitter that may be viewed from a single viewpoint when light from the LER passes through a pixel in the display panel of the viewing system. Geometry for one or more viewpoints is presented.

The principle of the two-view rear parallax emitter is illustrated in FIG. 3. Parallax emitter 20 is divided in to one or more individually controllable, light emitting regions (LERs). When adjacent LERs have the same width, the width, W_LER, is essentially equal to the pitch, b, between the adjacent LERs. The pitch, b, of the LERs in a rear parallax emitter as described in this invention may be calculated using the method of similar triangles. For example, the two triangles 50R-M-N and 50R-P-Q in FIG. 3 may be used. In this situation, triangles 50R-M-N and 50R-P-Q share a common vertex at viewpoint 50R. Side M-N of triangle 50R-M-N describes the portion, b (i.e. W_LER), of an LER that may be viewed from a single viewpoint 50R when the LER light passes through one pixel with width, i, in the modulating display panel of the viewing system such as display 1. Width, i, is represented by side P-Q in triangle 50R-P-Q. The pitch, b (also represented as M-N), may be evaluated as follows:

$$\frac{b}{z+g} = \frac{i}{z} \quad [1]$$

Alternately, a similar pair of triangles involving viewpoint 50L may also be used. The equation [1] may be rearranged to yield:

$$b = i\left(\frac{z+g}{z}\right) \quad [2]$$

In this case, the result [2] shows that the LER pitch for achieving a viewpoint correction is slightly larger than the pixel pitch on the display. This small difference between the pixel and the LER pitch accounts for the variation in viewing angle between the viewpoints and the pixels across the display and is often referred to as viewpoint correction.

Figure 4:
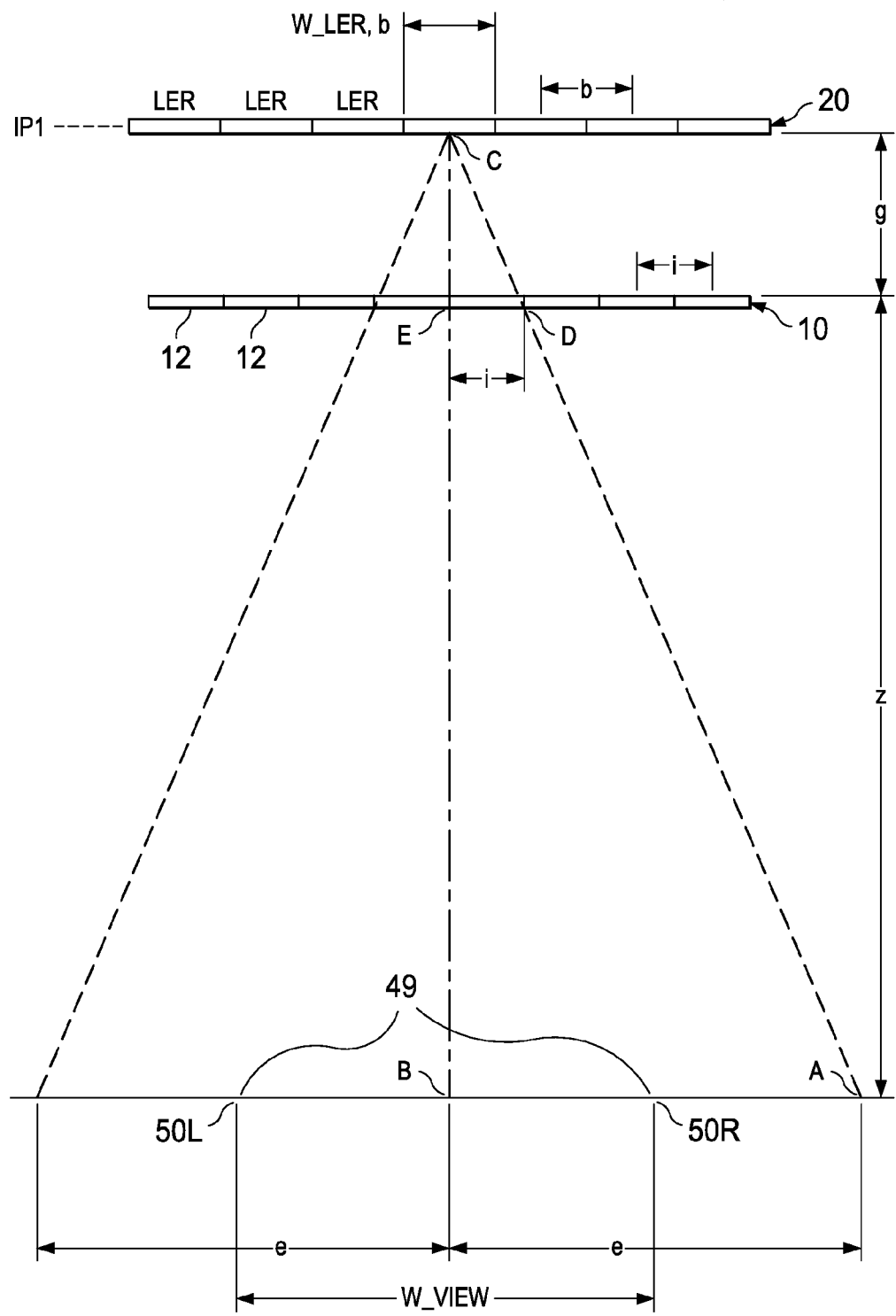
FIG. 4 is another schematic diagram depicting a top view of the basic geometry of a stereoscopic viewing system. Geometry in the FIG. 4 describes possible paths that may be travelled by a single point source of light on a rear parallax emitter when the light passes through a pixel in the display panel of the viewing system. Geometry for one or more point sources of light is presented.

Referring to FIG. 4, viewing distance, z, may be determined from the gap, g, as described in [3]. Distance z is likely to be constrained by substrate glass thickness when using an LCD or other type of display. The evaluation of viewing distance z, from knowledge of the gap, g, is based on the method of similar triangles as applied to triangles A-B-C and D-E-C, for example. In FIG. 4, triangles A-B-C describes possible paths that may be travelled by a single point-like source of light at location C on and LER of rear parallax emitter 20. In particular, the paths include only those paths of light that pass through one pixel in the display panel and may be received by a viewer 49 located at a distance z from the display panel. The viewpoint 50L or 50 R must remain in a region of width e in order to see the particular point-like source of light through the particular pixel.

$$\frac{i}{g} = \frac{e}{z+g} \quad [3]$$

Again, equation [3] may be rearranged to yield the viewing distance, z:

$$z = g\left(\frac{e-i}{i}\right) \quad [4]$$

Although equations [1] through [4] assume a traditional, monochromatic, two-view, rear parallax barrier configuration, it is important to note that the basic geometry related to all rear parallax emitter embodiments of the present invention, and thus the algebraic equations to determine the LER pitch of all rear parallax emitter embodiments, b as in [2], as well as the preferred viewing distance, z as in [4], are similar.

The gap distance, g, as defined and employed in equation [4], describes the location of the first pixel based intersection plane for the viewing paths of a viewer 49 comprising viewpoints 50L, 50R. Although several embodiments of the current disclosure use the first intersection plane, the disclosure is not limited to only that plane. The method for evaluating the gap, g, for other intersection planes will be explained subsequently.

The distance, z, between a viewer and the display panel 20 may be altered for a given embodiment by changing the distance between the parallax emitter and the modulating display panel, i.e. gap, g. The gap g also represents the first intersection plane of the viewing paths of light. To properly determine the location of the first intersection plane (i.e. the value of g), it is necessary to select a preferred average distance between the display and the viewer, the distance z. Using the geometry of triangle A-B-C depicted in FIG. 4, equation [4] may be rearranged to determine the spacing to the first rear intersection plane, g, based on (a) a known or knowable distance, z, measured from the display's actual sub-pixel to the viewer, (b) the pixel pitch, i, and (c) the average viewpoint separation, e.

$$g = i\left(\frac{z+i}{e}\right) \quad [5]$$

If, for example, the desired viewing distance, z, is 375 mm, the pixel pitch, i, is 0.1 mm, and the average viewpoint separation, e, is 64 mm, then according to equation [5], the theoretical distance between a traditional parallax emitter and the pixels of the display, or in other words, the first intersection plane, g, would be a distance of 0.59 mm.

It will be appreciated by those of ordinarily skill in the art that traditional rear-parallax emitters used in conjunction with commonly known liquid crystal displays (LCDs) generally assume the substrate thickness plus the thickness of the polarizer sheet to be the first intersection plane. It should be noted that the present invention establishes the concept of a theoretical first rear intersection plane that then provides the basis of determining the locations of a plurality of additional rear intersection planes, at which several embodiments of the present invention are either solely or partially situated.

Although recent glass substrates such as Corning's EAGLE 2000 are available to display manufacturers in thicknesses of 0.3 mm, 0.5 mm, and 0.63 mm, a large number of displays currently available still feature glass substrates having thicknesses of 0.70 mm or more. In the context of a stereoscopic imaging system incorporating a rear parallax emitter in accordance with this invention, it should be noted that it is also necessary to consider the rear substrate and rear polarizer sheet, which in combination with the front substrate substantially increase the minimum distance from the sub-pixels 100, 101, and 102 of the display. Referring to FIG. 3 and assuming a desired optimal viewing distance, z=375 mm, a sub-pixel pitch, i=0.10 mm, and an average viewpoint separation, e=64 mm, according to equation [5] above, the thickness of the front substrate 0.63 nun or 0.70 mm in thickness, plus a similar thickness for the rear substrate, plus the optional rear polarizer sheet would exceed, g, the necessary first intersection plane situated at a distance of 0.59 mm from the pixels of the display.

As a solution to this problem and with reference to FIG. 4, the concept of multiple rear intersection planes behind the pixels of a display is discussed. For a particular distance between the viewpoints 50L, 50R of a viewer 49 and a display 10, light traveling through sub-pixels 100, sub-pixels 101, and sub-pixels 102 converge both at the viewer's left viewpoint 50 and right viewpoint 51. Both viewpoints 50L, 50R are separated from each other, center-to-center, by a distance W_view, generally known as the interpupillary distance or interocculary distance.

Intersection planes IP 1 through IP 4 mark only the first four examples of a plurality of possible rear convergence planes behind the pixels of a display. It should also be clear to anyone skilled in the art that in terms of viewing geometry intersection plane IP 3 in the context of the sub-pixels of a commonly known RGB display is equal to intersection plane IP 1 in the context of a display's full pixel.

With reference again to FIG. 4 and assuming that according to the algebraic formula [5] above, the first intersection plane, g (depicted in FIG. 4 as IP 1), situated at a distance of 0.59 mm from the display 10, will allow an optimal viewing distance, z=375 mm. It will also be assumed that the combined thickness of the display's front substrate, rear substrate, and rear polarizer sheet is greater than 0.59 mm. With such assumptions, a parallax barrier enabling the desired optimal viewing distance, z=375 mm, may still be achieved by situating the parallax emitter on the second intersection plane IP 2, or if necessary on the fourth intersection plane IP 4.

To accurately calculate the distance, g, between the display 10 and the second intersection plane, g (depicted in FIG. 2 as IP 2), the equation [5] needs to be modified to properly account for the concept of multiple intersection planes.

$$k = if \quad [6]$$

With reference to equation [6], the sub-pixel pitch, i, must first be multiplied by the positional factor of the layer, f, to yield a pitch factor, k. The positional factor, f, is equal to the sequence number of the intersection plane, with the intersection plane nearest to the display counted as number 1. For example, given a sub-pixel pitch, i=0.1 mm, and a positional factor, f=2 (for the second intersection plane), the pitch factor k=0.2 mm. As another example, given a sub-pixel pitch, i=0.1 mm, and a positional factor, f=4 (for the fourth intersection plane), the pitch factor k=0.4 mm.

$$g = i\left(\frac{z+k}{e}\right) \quad [7]$$

The resulting pitch factor k of equation [6] now substitutes the sub-pixel pitch, i, in equation [5], to arrive at equation [7], which calculates the distance between the display 10 and the second intersection plane IP 2. Again, given the previous example of assuming a desired optimal viewing distance, z=375 mm, a sub-pixel pitch, i=0.1 mm, and an average viewpoint separation, e=64 mm, according to equation [7], the second intersection plane (or IP 2 in FIG. 2), g=1.17 mm.

Configuration A

Figure 6:
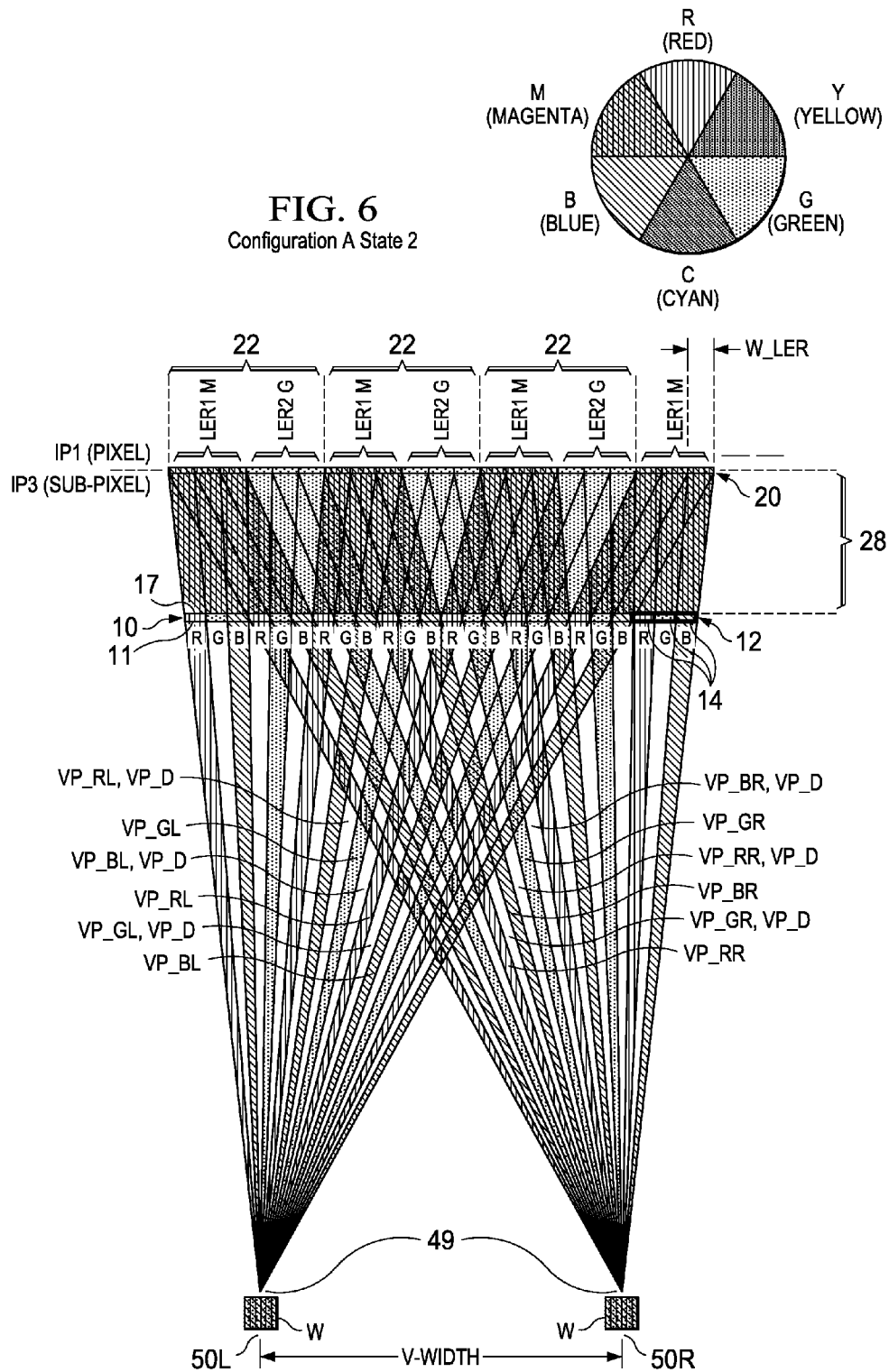
FIG. 6 is a schematic diagram depicting a top view of stereoscopic viewing system configuration A incorporating a dynamically switchable two-segment full pixel rear parallax emitter at the first rear intersection plane (IP1 relative to the overlaying pixels of the modulating display panel, or IP3 relative to the overlying sub-pixels of the modulating display panel), set to its second dynamic state.
Figure 7:
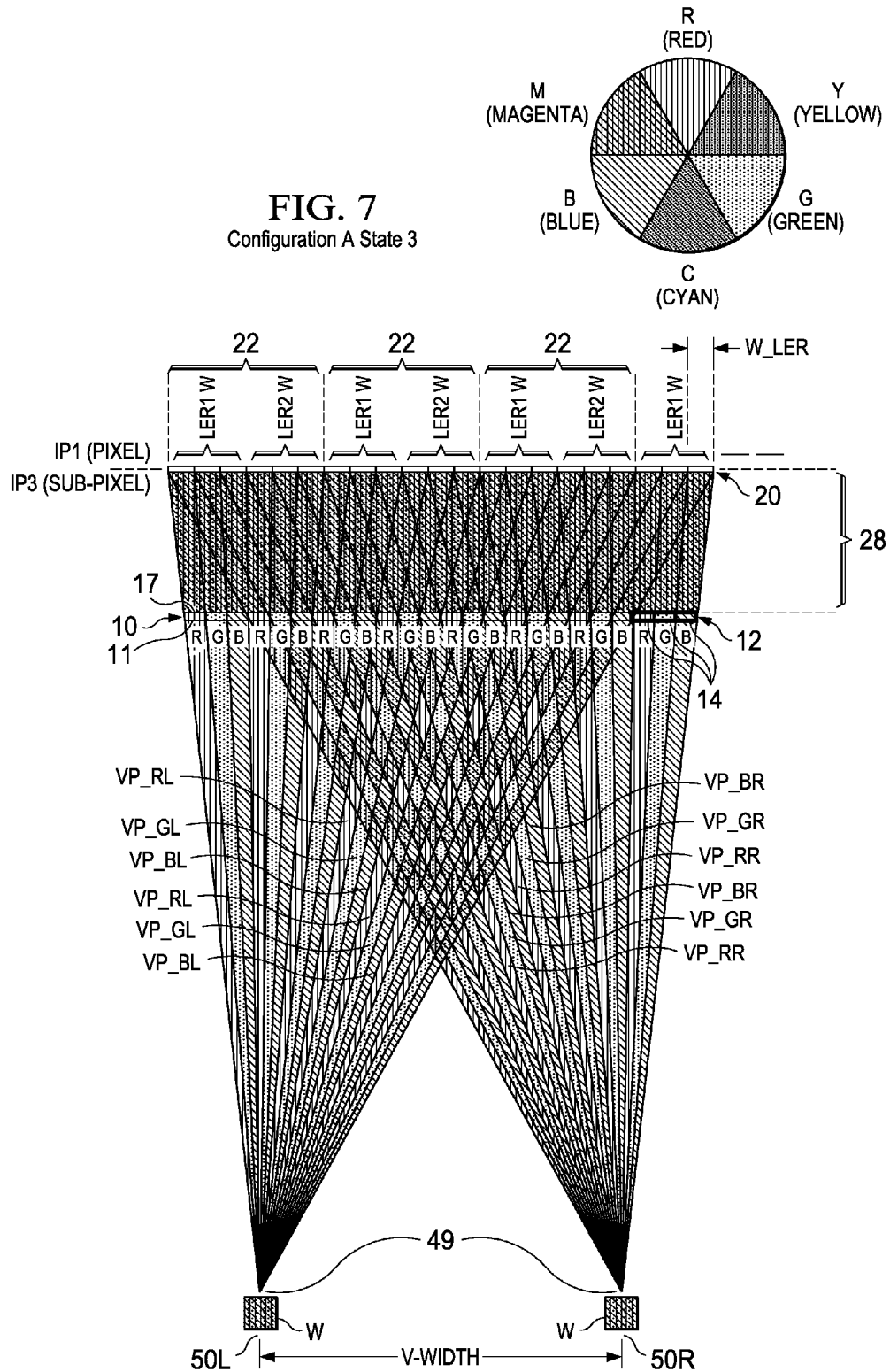
FIG. 7 is a schematic diagram depicting a top view of stereoscopic viewing system configuration A incorporating a dynamically switchable two-segment full pixel rear parallax emitter at the first rear intersection plane (IP1 relative to the overlaying pixels of the modulating display panel, or IP3 relative to the overlying sub-pixels of the modulating display panel), set to its third dynamic state.

FIGS. 5, 6, and 7 provide examples of another group of embodiments, namely viewing system configuration A with multiple operational states. Configuration A and its operational states are defined, at least in part, by the relative placement of the repeating pattern of vertically oriented light emitting regions (LERs) of the parallax emitter 20 with respect to the arrangement of the sub-pixels 14 of the light modulator 10.

As shown in FIG. 5, for example, the rear parallax emitter 10 within configuration A is positioned at one of the many locations where the viewing paths that extend through a first set of pixels, e.g. pixel 12A, and viewpoint 50L (e.g. a viewer's first eye) cross light paths extending between a second set of pixels, e.g. pixel 12B, and viewpoint 50L (e.g. the viewer's second eye). These crossings define a succession of rear intersection planes spaced behind the light modulator, which is also known as the modulating display panel 20. Each successive intersection plane is located a predetermined, substantially uniform distance behind display panel 20, opposite viewer 49. At least one embodiment locates the parallax emitter substantially at the third sub-pixel based intersection plane, which is equivalent to the first pixel based intersection plane, as described in the earlier discussion of viewing path intersections.

The arrangement of sub-pixels 14 on light modulator 10 of configuration A will be described first. In at least one embodiment, pixels on panel 10 are tri-color and sub-pixels 14 are positioned in the following order starting on the left side of the diagrams in FIGS. 5, 6, and 7. The first sub-pixel 14 is generally red (R). Every third sub-pixel 14 thereafter is also red (R), and so, for example, the $4^{th}$, $7^{th}$, and $10^{th}$ sub-pixels are red (R). Thus, a first sub-pixel group comprises red sub-pixels 14 (R) and is configured to transmit the frequencies in a spectral range generally defined as red (R). The second sub-pixel 14 is generally green (G). Every third sub-pixel 14 thereafter is also generally green. Thus, a second sub-pixel group comprises green sub-pixels 14 (G) and is configured to transmit light frequencies (or equivalently wavelengths) in a spectral range generally defined as green (G). The third sub-pixel 14 is generally blue (B). Every third sub-pixel 14 thereafter is also blue (B). Therefore, a third sub-pixel group comprises blue sub-pixels 14 (B) and is configured to transmit frequencies in a spectral range generally defined as blue (B). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

On rear parallax emitter 10, a repeating pattern 22 comprises two vertically oriented light-emitting regions (LER1, LER2), numbered from left to right in FIGS. 5, 6, and 7. Because the referenced figures represent a non-vertical, planar section of display 1, the vertical dimension of the LERs is not apparent in the figures. In configuration A, each LER preferably has a width (W_LER) that generally spans at most the width of three sub-pixel viewing path intersections on the selected intersection plane. Therefore the width of each LER is selected to illuminate an entire three-color pixel from the vantage of a viewpoint 50L, 50R.

Continuing to refer to FIGS. 5, 6, and 7, in at least one implementation the rear parallax emitter includes a repeating pattern of vertically oriented LERs configured to emit repeating time multiplexed spectral ranges of light through the pixels of the light modulator 10 to the viewer's viewpoints 50L, 50R. The color state of the LERs at each instant in time represents a single optical state. Thus, two optical states are time multiplexed together in some embodiments.

Thus, the embodiments of configuration A have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R.

In one or more optical states of configuration A, one or more of the viewing paths VP_GL, VP_BL, VP_GR, VP_BR are interrupted viewing paths VP_D. One or more interrupted viewing path VP_D results from an LER that is configured to emit substantially no light of any visible wavelength. Interrupted viewing paths contribute little or nothing to the light observed at the corresponding viewpoint A first optical state for configuration A is schematically presented in FIG. 5. Rear parallax emitter 20 comprises a plurality of vertically oriented light-emitting regions (LERs) arranged in a repeating pattern 22. In at least one embodiment, pattern 22 has two light emitting regions (LER1, LER2), numbered from left to right. First regions LER1 are configured to emit light substantially comprising a green (G) spectral range. Second regions LER2 are configured to emit light substantially comprising a magenta (M) spectral range.

In the first optical state for configuration A the repeating pattern 22 of two vertically oriented light emitting regions includes first regions LER1 configured to illuminate entire first and second pixels located generally to the left and to the right of LER1, respectively. However, LER1 is further configured to transmit (or emit) light through only one sub-pixel of each pixel. Specifically, LER1 is configured to emit substantially no light through the first (red) set of sub-pixels 14 to the left viewpoint 50L and to emit substantially no light through the first (red) set of sub-pixels 14 to the right viewpoint 50R. LER1 is configured to emit light through the second (green) set of sub-pixels 14 (G) to the left viewpoint 50L and to emit light through the second (green) set of sub-pixels 14 (G) to the right viewpoint 50R. Additionally, LER1 is configured to emit substantially no light through the third (blue) set of sub-pixels 14 (B) to the left viewpoint 50L and to emit substantially no light through third (blue) set of sub-pixels 14 (B) to the right viewpoint 50R.

This explanation uses an example of various arrangements for sub-pixels within a pixel. This explanation uses an RGB. In other embodiments, the sub-pixels may be in a different arrangement, such as for example, BGR instead of RGB. The sub-pixels may also be arranged differently on the various horizontal rows of pixels, of which FIG. 5 and the other figures in this disclosure show only one horizontal row. The same variation in sub-pixel arrangement might be applied to any embodiment that is in keeping with the teachings of this disclosure.

Continuing to describe the first optical state, shown in FIG. 5, repeating pattern 22 of also includes second regions LER2 configured to illuminate entire first and second pixels located generally to the left and to the right of LER2, respectively. However, LER2 is further configured to transmit (or emit) light through only two sub-pixels of each pixel. Specifically, LER2 is configured to emit light through the first (red) set of sub-pixels 14 to the left viewpoint 50L and to emit light through the first (red) set of sub-pixels 14 to the right viewpoint 50R. LER2 is configured to emit substantially no light through the second (green) set of sub-pixels 14 (G) to the left viewpoint 50L and to emit substantially no light through the second (green) set of sub-pixels 14 (G) to the right viewpoint 50R. Additionally, LER2 is configured to emit light through the third (blue) set of sub-pixels 14 (B) to the left viewpoint 50L and to emit light through third (blue) set of sub-pixels 14 (B) to the right viewpoint 50R.

A second optical state for configuration A is schematically presented in FIG. 6. Rear parallax emitter 20 comprises a plurality of vertically oriented light-emitting regions (LERs) arranged in a repeating pattern 22. In at least one embodiment, pattern 22 has two light emitting regions (LER1, LER2), numbered from left to right. First regions LER1 are configured to emit light substantially comprising a magenta (M) spectral range. Second regions LER2 are configured to emit light substantially comprising a green (G)spectral range.

In the first optical state for configuration A the repeating pattern 22 of two vertically oriented light emitting regions includes first regions LER1 configured to illuminate entire first and second pixels located generally to the left and to the right of LER1, respectively. However, LER1 is further configured to transmit (or emit) light through only two sub-pixels of each pixel. Specifically, LER1 is configured to emit light through the first (red) set of sub-pixels 14 to the left viewpoint 50L and to emit light through the first (red) set of sub-pixels 14 to the right viewpoint 50R. LER1 is configured to emit substantially no light through the second (green) set of sub-pixels 14 (G) to the left viewpoint 50L and to emit substantially no light through the second (green) set of sub-pixels 14 (G) to the right viewpoint 50R. Additionally, LER1 is configured to emit light through the third (blue) set of sub-pixels 14 (B) to the left viewpoint 50L and to emit light through third (blue) set of sub-pixels 14 (B) to the right viewpoint 50R.

Continuing to describe the second optical state, shown in FIG. 6, repeating pattern 22 of also includes second regions LER2 configured to illuminate entire first and second pixels located generally to the left and to the right of LER2, respectively. However, LER2 is further configured to transmit (or emit) light through only one sub-pixel of each pixel. Specifically, LER2 is configured to emit substantially no light through the first (red) set of sub-pixels 14 to the left viewpoint 50L and to emit substantially no light through the first (red) set of sub-pixels 14 to the right viewpoint 50R. LER2 is configured to emit light through the second (green) set of sub-pixels 14 (G) to the left viewpoint 50L and to emit light through the second (green) set of sub-pixels 14 (G) to the right viewpoint 50R. Additionally, LER2 is configured to emit substantially no light through the third (blue) set of sub-pixels 14 (B) to the left viewpoint 50L and to emit substantially no light through third (blue) set of sub-pixels 14 (B) to the right viewpoint 50R.

FIG. 7 presents a third optical state for configuration A, which may produce a two-dimensional image on light modulator 10. Both sets of LERs (LER1, LER2) on the parallax emitter 20 are configured to transmit "all sets of spectral ranges," also called "all light" (W). Each of the three sub-pixels 14 within a given pixel 12 has a unique transmission color (R), (G), or (B). In the third state, each sub-pixel 14 is illuminated by parallax emitter 20 with light that may pass through and continue traveling along a corresponding view path to a viewpoint 50L, 50R. Consequently, the third state has no interrupted viewing paths VP_D. Light travels through all sub-pixels and along all viewing paths for viewpoints 50L, 50R.

In a first set of alternative embodiments, the repeating pattern 22 of two vertically oriented LERs is located at the first pixel based intersection plane and may be permanently shifted horizontally by one third the width (W_LER) of one single LER. An example of an embodiment wherein the pattern 22 of LERs may be shifted is seen in FIG. 1. In FIG. 1, the effective width of leftmost LER is shorter than the other LERs. This difference in width was explained previously.

In yet another, second alternative embodiment, the repeating pattern of two vertically oriented LERs is located at the first pixel based intersection plane and may be permanently shifted horizontally by two thirds the width (W_LER) of one single LER. An example of an embodiment wherein the pattern 22 of LERs may be shifted is seen in FIG. 1. The shifting of the LERs by any suitable amount (e.g., by one third or two thirds) may pertain to one or more states of configuration A and may apply to other embodiments throughout this disclosure Building on what was explained earlier regarding the embodiments of configuration E, the two sets of the light emitting regions LER1, LER2 may be cycled through two or more of their three respective dynamically switchable optical states. One or more of the LERs may, instead, remain in one optical state. The optical states of the LERs correspond to the optical states of configuration A. Specific now to each LER1, the first optical state may emit a green spectral range; a second optical state may emit a magenta spectral range; and a third optical state may substantially emit all light (W), which in some examples may be white light. Specific now to each LER2, the first optical state may emit a magenta spectral range; a second optical state may emit a green spectral range; and a third optical state may substantially emit all light (W).

Configuration B

Figure 9:
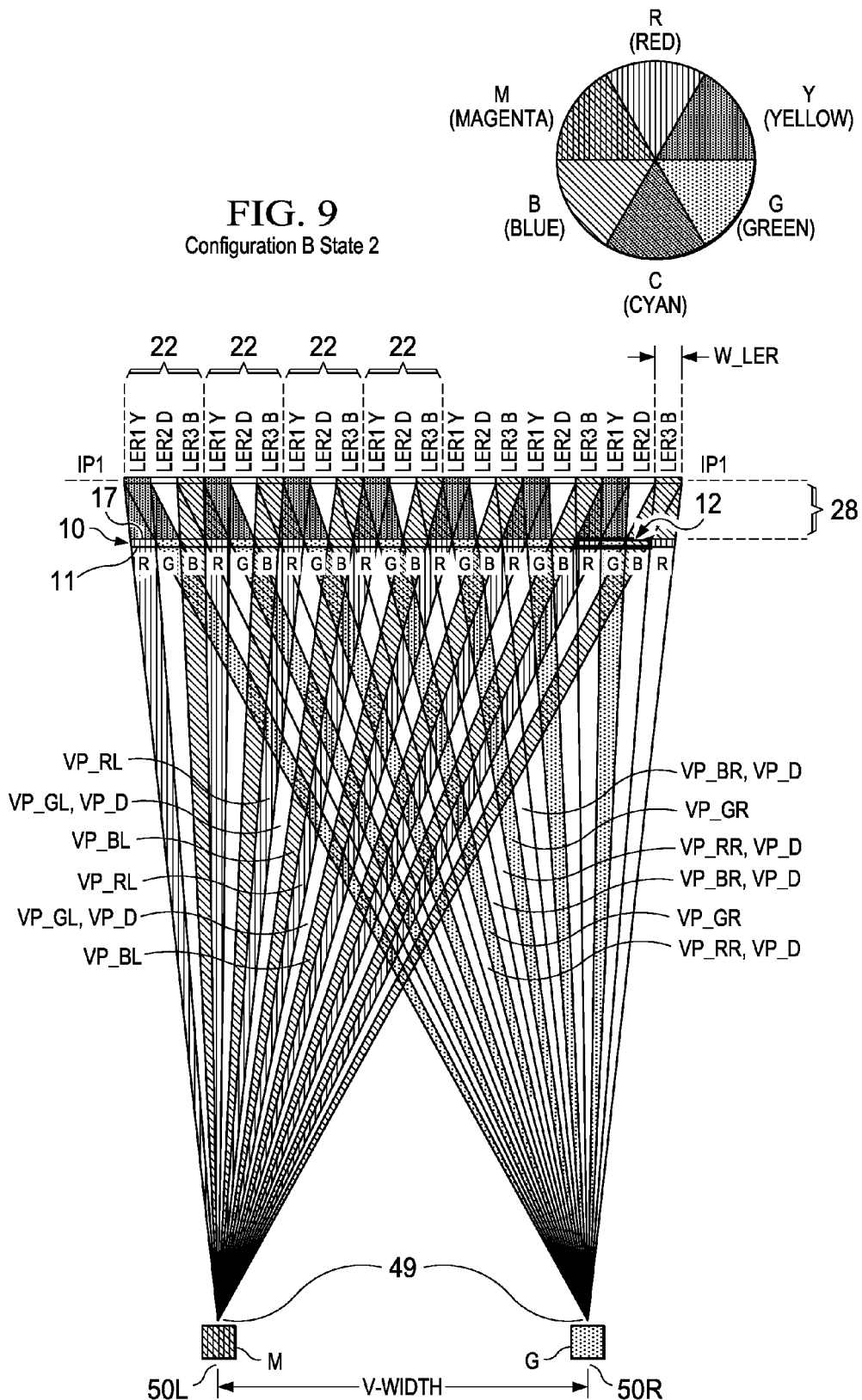
FIG. 9 is a schematic diagram depicting a top view of stereoscopic viewing system configuration B incorporating a dynamically switchable three-segment sub-pixel rear parallax emitter at the first rear intersection plane (IP1 relative to the overlying sub-pixels of the modulating display panel), set to its second dynamic state.
Figure 10:
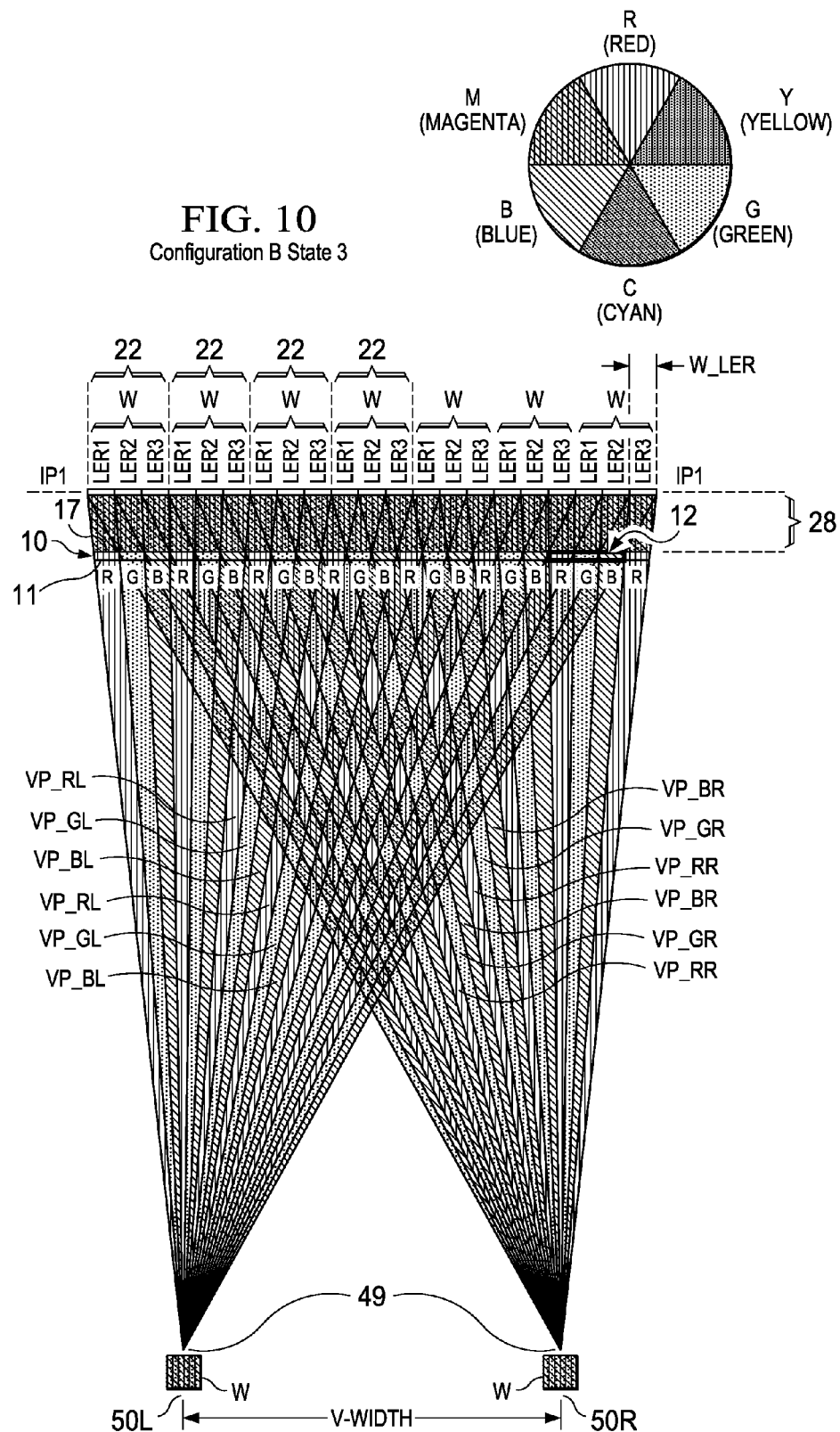
FIG. 10 is a schematic diagram depicting a top view of stereoscopic viewing system configuration B incorporating a dynamically switchable three-segment sub-pixel rear parallax emitter at the first rear intersection plane (IP1 relative to the overlying sub-pixels of the modulating display panel), set to its third dynamic state.

FIGS. 8, 9, and 10 provide examples of another group of embodiments, namely viewing system configuration B with multiple operational states. Configuration B and its operational states are defined, at least in part, by the relative placement of the repeating pattern of vertically oriented regions (LERs) of the parallax emitter 20 with respect to the arrangement of the sub-pixels 14 of the light modulator 10. At least one embodiment locates the parallax emitter substantially at the first sub-pixel based intersection plane defined in the earlier discussion of viewing path intersections.

The arrangement of sub-pixels 14 on light modulator 10 of configuration B will be described first. In at least one embodiment, pixels on panel 10 are tri-color and sub-pixels 14 are positioned in the following order starting on the left side of the diagrams in FIGS. 8, 9, and 10. The first sub-pixel 14 is generally red (R). Every third sub-pixel 14 thereafter is also red (R), and so, for example, the $4^{th}$, $7^{th}$, and $10^{th}$ sub-pixels are red (R). Thus, a first sub-pixel group comprises red sub-pixels 14 (R) and is configured to transmit the frequencies in a spectral range generally defined as red (R). The second sub-pixel 14 is generally green (G). Every third sub-pixel 14 thereafter is also generally green. Thus, a second sub-pixel group comprises green sub-pixels 14 (G) and is configured to transmit light frequencies (or equivalently wavelengths) in a spectral range generally defined as green (G). The third sub-pixel 14 is generally blue (B). Every third sub-pixel 14 thereafter is also blue (B). Therefore, a third sub-pixel group comprises blue sub-pixels 14 (B) and is configured to transmit frequencies in a spectral range generally defined as blue (B). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Referring still to FIGS. 8, 9, and 10, in configuration B, a repeating pattern 22 of light emitting regions (LERs) of parallax emitter 20 is located at just one of the successive intersection planes, situated on the side of the light modulator 10 opposite viewer 49. The intersection planes (IPs) have been defined based the intersections of specific viewing paths extending from viewpoints 50L, 50R and through sub-pixels 14, which were explained in an earlier section of this disclosure. At least one embodiment locates the parallax emitter 20 substantially at the first sub-pixel based intersection plane, IP1, as illustrated in FIGS. 8, 9, and 10.

The repeating pattern 22 comprises three vertically oriented light-emitting regions (LER1, LER2, LER3), numbered from left to right in FIGS. 8, 9, and 10. Because the reference figures represent non-vertical, planar section of display 1, the vertical dimension of the LERs is not apparent in the figures. In configuration B, each LER has a width (W_LER) that generally matches the width of the viewing path intersections on the selected intersection plane. Therefore the width of each LER is selected to illuminate approximately one sub-pixel from the vantage of a viewpoint 50L, 50R. As noted above, the spectral ranges of color emitted by each LER may be varied for various optical states of configuration B and will therefore be subsequently specified when the optical states of operation are explained.

In the discussion for this and for other embodiments, references to LER emission colors and sub-pixel transmission colors are made for clarity only and should not be interpreted as a limiting embodiment. The order of the color assignments of LERs and sub-pixels may be changed so long as the new arrangement maintains a similar relationship between the emission colors of the LERs and the color transmissions of the nearby sub-pixels on the light modulator 10. For example, the color patterns for the LERs and the sub-pixels of any given embodiment could be shifted left or right (for example, first becomes second, second becomes third, and so on) by the same spacing and still result in a valid embodiment.

In at least one implementation the rear parallax emitter includes a repeating pattern of vertically oriented LERs configured to emit repeating time multiplexed spectral ranges of light through the pixels of the light modulator 10 to the viewer's viewpoints 50L, 50R, each multiplexed spectral range representing one single optical state.

The embodiments of configuration B have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

In one or more optical states of configuration B, one or more of the viewing paths VP_GL, VP_BL, VP_GR, VP_BR are interrupted viewing paths VP_D. One or more interrupted viewing path VP_D results from an LER that is configured to emit substantially no light of any visible wavelength. Interrupted viewing paths contribute little or nothing to the light observed at the corresponding viewpoint.

In a first optical state for configuration B is schematically presented in FIG. 8. Starting from the left side, the three light emitting regions (LER1, LER2, LER3) in repeating pattern 22 are numbered from left to right. The first regions LER1 are configured to emit substantially no light; the light emitted by the second LER2 is substantially comprised of a cyan (C) spectral range; the light emitted by the third regions LER3 is substantially comprised of a red (R) spectral range.

In the first optical state for configuration B, pattern 22 includes first regions LER1 configured to emit substantially no light through the first (red) set of sub-pixels 14 (R) to the left viewpoint 50L and to emit substantially no light through the second (green) set of sub-pixels 14 (G)) to the right viewpoint 50; second regions LER2 configured to emit light through the second (green) set of sub-pixels 14 (G) to the left viewpoint 50L and to emit light through the third (blue) set of sub-pixels 14 (B) to the right viewpoint 50R; and third regions LER3 configured to emit substantially no light through the third (blue) set of sub-pixels 14 (B) to the left viewpoint 50L and to emit light through the first (red) set of sub-pixels 14 (R) to the right viewpoint 50R.

A second optical state for configuration B is schematically presented in FIG. 9. Starting from the left side, the three light emitting regions (LER1, LER2, LER3) in repeating pattern 22 are numbered from left to right. First regions LER1 are configured to emit light substantially comprising a yellow (Y) spectral range. The second regions LER2 are configured to emit substantially no light. Third regions LER3 are configured to emit light substantially comprising a blue (B) spectral range.

In the second optical state for configuration B, pattern 22 includes first regions LER1 configured to emit light through the first (red) set of sub-pixels 14 (R) to the left viewpoint 50L and to emit light through the second (green) set of sub-pixels 14 (G)) to the right viewpoint 50; second regions LER2 configured to emit substantially no light through the second (green) set of sub-pixels 14 (G) to the left viewpoint 50L and to emit substantially no light through the third (blue) set of sub-pixels 14 (B) to the right viewpoint 50R; and third regions LER3 configured to emit light through the third (blue) set of sub-pixels 14 (B) to the left viewpoint 50L and to emit substantially no light through the first (red) set of sub-pixels 14 (R) to the right viewpoint 50R.

FIG. 10 presents a third optical state for configuration B, which may produce a two-dimensional image on light modulator 10. Starting from the left side of FIG. 10, the parallax emitter 20 comprises a repeating pattern 22 of three vertically oriented light-emitting regions (LER1, LER2, LER3), numbered from left to right. All LERs are configured to transmit all light (W). Therefore, each sub-pixel 14 of each color (R), (G), (B) is illuminated by parallax emitter 20 with light that may pass through each sub-pixel 14 and continue traveling along each view path to the viewpoints 50L, 50R. Consequently, the third state has no interrupted viewing paths VP_D. However, to create an image in this and in at least one other embodiment, image controller 5 has the capability to shut-off a particular sub-pixel 14 or to shut-off multiple sub-pixels 14 so that the viewing path(s) extending through the sub-pixel(s) would temporarily not transmit light. Furthermore, the cycling on and off of sub-pixels 14 may create an image that changes with time.

Shown in FIG. 10, the third optical state for configuration B, pattern 22 includes first regions LER1 configured to emit light through the first (red) set of sub-pixels 14 (R) to the left viewpoint 50L and to emit light through the second (green) set of sub-pixels 14 (G)) to the right viewpoint 50; second regions LER2 configured to emit light through the second (green) set of sub-pixels 14 (G) to the left viewpoint 50L and to emit light through the third (blue) set of sub-pixels 14 (B) to the right viewpoint 50R; and third regions LER3 configured to emit light through the third (blue) set of sub-pixels 14 (B) to the left viewpoint 50L and to emit light through the first (red) set of sub-pixels 14 (R)to the right viewpoint 50R.

Building on what was explained earlier regarding the embodiments of configuration B, the first, second, and third sets of light emitting regions LER1, LER2, LER3 may be cycled through two or more of their three respective dynamically switchable optical states. One or more of the LERs may, instead, remain in one optical state. Specific now to each LER1, the first optical state may substantially emit no light; a second optical state may emit a yellow spectral range; a third optical state may substantially emit "all light" (W). As previously defined, the term "all light" is a broad term that describes an emission of light of wavelengths or ranges of wavelengths from the LERs that sufficiently illuminates all the pixels or sub-pixels in a path intersecting with a specific region's viewing paths such that the color of the pixels (or sub-pixels) may be perceived by viewer 49. Specific now to each LER2, the first optical state may emit a cyan spectral range; a second optical state may substantially emit no light; a third optical state may substantially emit all light. Specific now to each LER3, the first optical state may emit a red spectral range; a second optical state may emit a blue spectral range; a third optical state may substantially emit all light. Further, the cyan and red sets of spectral ranges may substantially exclude each other, and the yellow and blue sets of spectral ranges also may substantially exclude each other.

Configuration C

Figure 11:
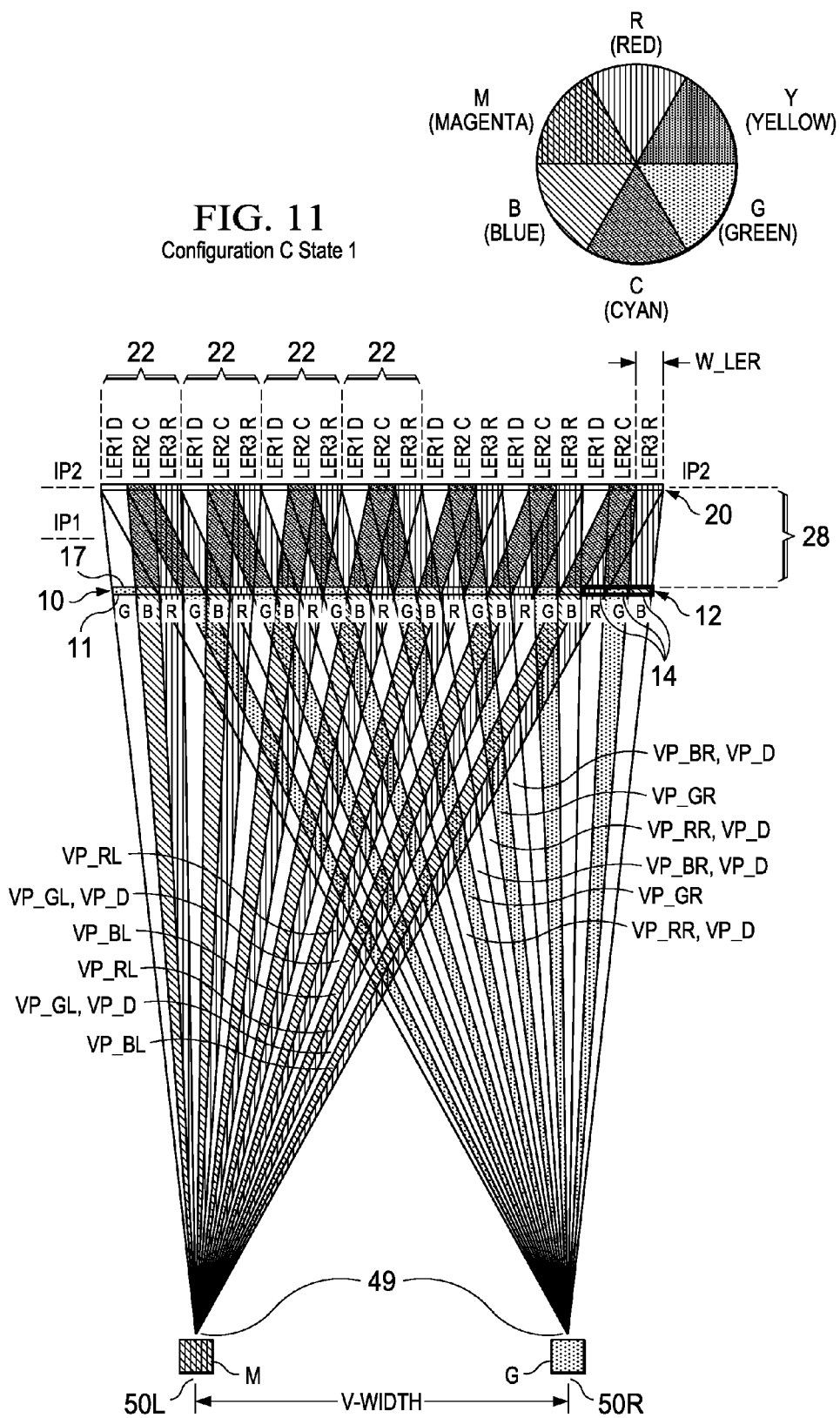
FIG. 11 is a schematic diagram depicting a top view of stereoscopic viewing system configuration C incorporating a dynamically switchable three-segment sub-pixel rear parallax emitter at the second rear intersection plane (IP2 relative to the overlaying overlying sub-pixels of the modulating display panel), set to its first dynamic state.
Figure 12:
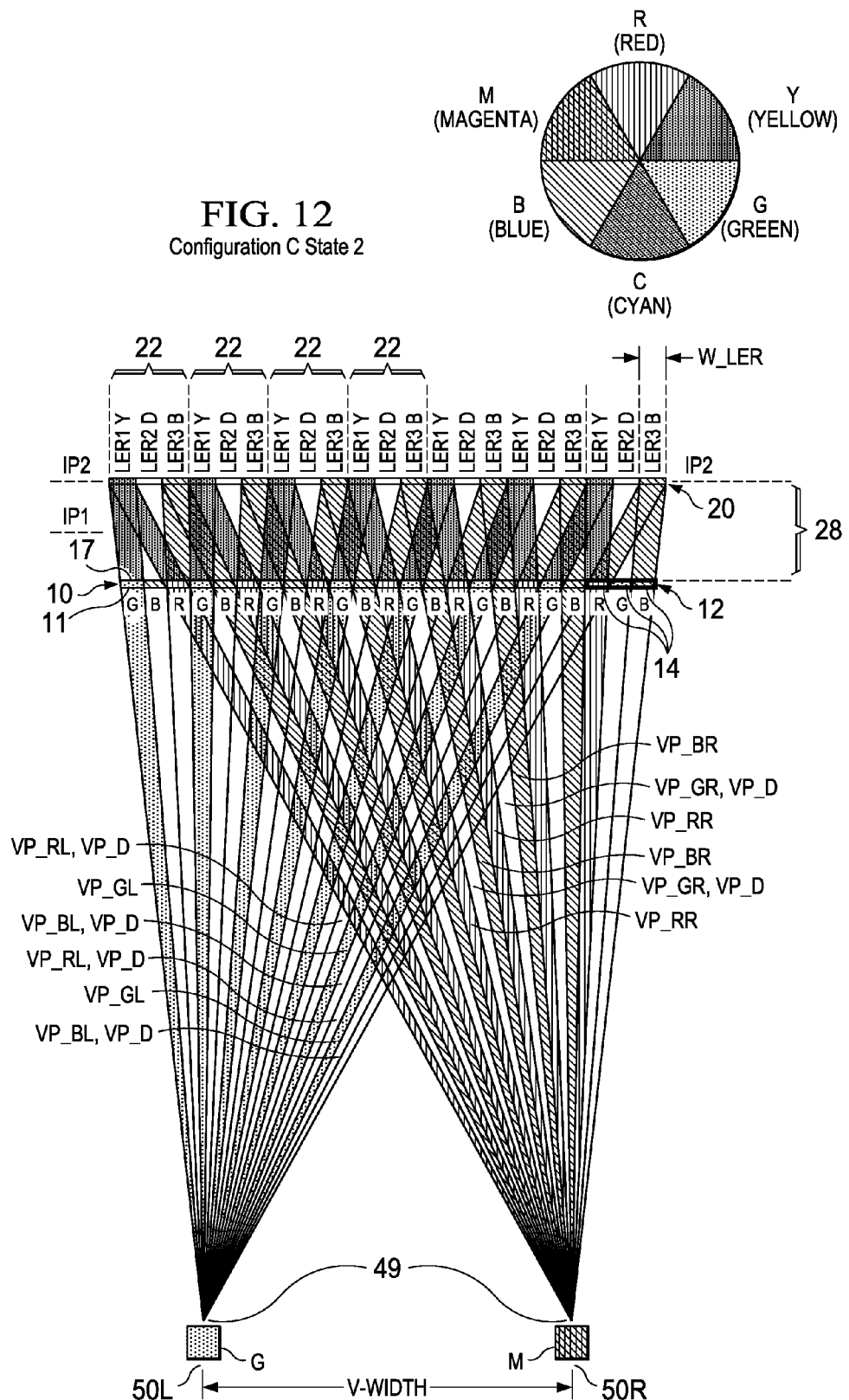
FIG. 12 is a schematic diagram depicting a top view of stereoscopic viewing system configuration C incorporating a dynamically switchable three-segment sub-pixel rear parallax emitter at the second rear intersection plane (IP2 relative to the overlaying overlying sub-pixels of the modulating display panel), set to its second dynamic state.

FIGS. 11, 12, and 13 provide examples of another group of embodiments, namely viewing system configuration C with multiple operational states. Configuration C and its operational states are defined, at least in part, by the relative placement of the repeating pattern of vertically oriented regions (LERs) of the parallax emitter 20 with respect to the arrangement of the sub-pixels 14 of the light modulator 10. As will be explained in more detail, at least one embodiment locates the parallax emitter substantially at the second sub-pixel based intersection plane.

The arrangement of sub-pixels 14 on light modulator 10 of configuration C will be first described. In at least one embodiment, pixels on panel 10 are tri-color, and sub-pixels 14 are positioned in the following order starting on the left side of the diagrams in FIGS. 11, 12, and 13. The first sub-pixel 14 is generally green (G). Every third sub-pixel 14 thereafter is also generally green, and so, for example, the 4$^{th}$, 7$^{th}$, and 10$^{th}$ sub-pixels are green (G). Thus, a first sub-pixel group comprises green sub-pixels 14 (G) and is configured to transmit light frequencies (or equivalently wavelengths) in a spectral range generally defined as green (G). The second sub-pixel 14 is generally blue. Every third sub-pixel 14 thereafter is also blue (B). Therefore, a second sub-pixel group comprises blue sub-pixels 14 (B) and is configured to transmit frequencies in a spectral range generally defined as blue (B). The third sub-pixel 14 is generally red (R). Every third sub-pixel 14 thereafter is also red (R). Thus, a third sub-pixel group comprises red sub-pixels 14 (R) and is configured to transmit the frequencies in a spectral range generally defined as red (R). The green, red, and blue (G), (R), (B) sub-pixels 14 are controllable to transmit incident light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Light may travel either direction along a viewing path, e.g. viewing path VP_GL. Notably, light generated by LERs on parallax emitter 20 may travel through sub-pixels 14 of light modulator 10 to viewpoints 50L, 50R.

In at least one embodiment, at least one viewing path VP_RL, VP_GL, VP_BL extends between left viewpoint 50L and a light emitting region (LER) on parallax emitter 20. In the example shown FIGS. 11, 12, and 13, a viewing path VP_GL extends between left viewpoint 50L and one of the green (G) sub-pixels 14 and continues to an LER on the parallax emitter 20. A similar viewing path VP_GL is defined between left viewpoint 50L and each of the green (G) sub-pixels 14. If the color emitted by the aligned LER is compatible with the green (G) transmission color of the sub-pixel 14 on a particular viewing path VP_GL, then light may be transmitted from the LER, through the sub-pixel 14, and to left viewpoint 50L. Examples of LER emission colors compatible with green sub-pixels 14 (G) are green, cyan, and yellow, assuming the cyan and yellow each define a spectrum of light containing green rather than a narrow spectrum or a single wavelength as might be generated by a laser. If the emission color of the LER is incompatible with the green (G) transmission color of the sub-pixel 14 along a given viewing path VP_GL, little or no light will be transmitted from the LER, through the green (G) sub-pixel 14, and to left viewpoint 50L on that particular viewing path VP_GL. Examples of colors incompatible with green sub-pixels are blue, red, and magenta because those colors substantially contain no green. Viewing paths that are not configured to transmit light from an LER to a viewpoint 50L, 50R in a particular embodiment due to an intentional incompatibility appear dark to the corresponding viewpoint 50L or 50R and are considered interrupted viewing paths VP_D.

Continuing to reference FIGS. 11, 12, and 13, in the same way, a viewing path VP_RL extends between left viewpoint 50L and each red sub-pixel 14(R) of light modulator 10 and continues by extending between the particular red (R) sub-pixel 14 and an LER on the parallax emitter 20. A viewing paths VP_BL extends between left viewpoint 50L and each blue sub-pixel 14 (B) and continues by extending between the particular blue (B) sub-pixel 14 and an LER on the parallax emitter 20. Again, viewing paths that are not configured to transmit light to a viewpoint 50L, 50R in a particular embodiment appear dark to the corresponding viewpoint 50L or 50R and are considered interrupted viewing paths VP_D.

In at least one embodiment, at least one viewing path VP_RR, VP_GR, VP_BR extends between right viewpoint 50R and a light emitting region (LER) on parallax emitter 20. In the example shown FIGS. 11, 12, and 13, a viewing path VP_GR extends between right viewpoint 50R and each green (G) sub-pixel 14 and continues by extending between the particular green (14) sub-pixel 14 and an LER on the parallax emitter 20. A viewing path VP_RR extends between right viewpoint 50R and each red (R) sub-pixel 14 of light modulator 10 and continues by extending between the particular red (R) sub-pixel 14 and an LER on the parallax emitter 20. A viewing path VP_BR extends between right viewpoint 50R and each blue (B) sub-pixel 14 of light modulator 10 and continues by extending between the particular blue (B) sub-pixel 14 and an LER on the parallax emitter 20. Viewing paths that are not configured to transmit light from an LER to a viewpoint 50L, 50R in a particular embodiment due to an intentional incompatibility appear dark to the corresponding viewpoint 50L or 50R and are considered interrupted viewing paths VP_D.

The nature of configuration C and the placement of the parallax emitter 20 will now be described. Continuing with FIGS. 11, 12, and 13, the intersection of viewing paths VP_RL, VP_GL, VP_BL from left viewpoint 50L with at least some of the viewing paths VP_RR, VP_GR, VP_BR from right viewpoint 50R BR will be evaluated in the region 28 between the LERs and the light modulator 10. Some of the referenced viewing paths are interrupted viewing paths VP_D. Interrupted viewing paths contribute little or nothing to the light observed at the corresponding viewpoint due to an intentional incompatibility between the emission color of the aligned LER and the transmission color of the aligned sub-pixel. Even so, the interrupted viewing paths VP_D are included in this discussion of intersecting viewing paths and should not be overlooked.

In region 28, one or more viewing paths VP_GL defined from left viewpoint 50L and extending through a green sub-pixel 14 (G) crosses, i.e. intersects, the viewing paths VP_BR, VP_RR defined from right viewpoint 50R and extending through the nearest blue sub-pixel 14 (B) and red sub-pixel 14 (R), respectively, located on the right side of the green sub-pixel 14 (G). In the same manner, one or more viewing path VP_GR defined from right viewpoint 50R and extending through a green sub-pixel 14 (G) intersects the viewing paths VP_RL, VP_BL defined from left viewpoint 50L and extending through the nearest red (R) sub-pixel 14 and blue (B) sub-pixel 14, respectively, located on the left side of the green (G) sub-pixel 14. Similar statements could be made if the discussion were introduced by starting with a viewing path passing through a red (R) sub-pixel 14 or if the discussion were introduced by starting with a viewing path passing through a blue (B) sub-pixel 14.

The viewing path intersections that have been described define a succession of sub-pixel based intersection planes spaced from the light modulator 10, each successive intersection plane (IP) being located a predetermined, substantially uniform distance from the rear side 17 of light modulator 10 and opposite viewer 49. That is to say, the described intersection planes are located in region 28. One of these planes is the first sub-pixel based intersection plane, IP1. Another is the second sub-pixel based intersection plane, IP2. Others intersection planes exist farther behind light modulator 10.

In configuration C, a repeating pattern 22 of light emitting regions (LERs) of parallax emitter 20 is located at just one of the successive intersection planes, situated on the side of the light modulator 10 opposite viewer 49. At least one embodiment locates the parallax emitter substantially at the second sub-pixel based intersection plane, IP2, as illustrated in 11, 12, and 13. The repeating pattern 22 comprises three vertically oriented light-emitting regions (LER1 to LER3). Because the reference figures represent non-vertical, planar section of display 1, the vertical dimension of the LERs is not apparent in the figures. Each LER has a width (W_LER) that generally matches the width of the viewing path intersections on the selected intersection plane. Therefore the width of each LER is selected to illuminate approximately one sub-pixel from the vantage of a viewpoint 50L, 50R. As noted above, the spectral ranges of color emitted by each LER may be varied for various optical states of configuration C and will therefore be subsequently specified when the optical states of operation are explained.

More generally, the geometric arrangement of light modulator 10 in Configuration C, may be defined without specific reference to the spectral color ranges (R), (G), (B) of the three groups of sub-pixels 14. Instead, the three sub-pixel groups may be designated as first, second, and third without specifying which color range is the first, second, or third color as exemplified in FIG. 1. In these embodiments, members of the first 16.1, second 16.2, and third 16.3 sets of sub-pixels are controllable to transmit light received from the side of the light modulator 10 opposite the viewer 49. Configuration C will now be described in this more general manner.

In the region 28 between the parallax emitter 20 and the light modulator 10, one or more viewing paths VP_1L, which is defined from left viewpoint 50L and extends through a member of first set of sub-pixels 16.1, crosses, i.e. intersects, two other nearby viewing paths that extend from an LER to right viewpoint 50R. At one of these intersections, the viewing path VP_1L crosses a viewing path VP_2R extending through a nearby, rightward member of a second set of sub-pixels 16.2. The same viewing path VP_1L also intersects, a viewing path VP_3R extending through a nearby, rightward member of a third set of sub-pixels 16.3. Similar statements could be made if the discussion were introduced with a viewing path passing through a member of second set of sub-pixels 16.2 or if the discussion were introduced with a viewing path passing through member of third set of sub-pixels 16.3.

In a similar manner, starting from the other viewpoint 50R, one or more viewing paths VP_1R, which extend through a member of the first set of sub-pixels 16.1 intersects two other nearby viewing paths that each extend from an LER to left viewpoint 50L. At one of these intersections, the viewing path VP_1R crosses a viewing path VP_2L extending through the nearby, leftward member of a second set of sub-pixels 16.2. The same viewing path VP_1R also intersects, a viewing path VP_3L extending through a nearby, leftward member of a third set of sub-pixels 16.3. Similar statements could be made if the discussion were introduced with a viewing path passing through a member of second set of sub-pixels 16.2 or if the discussion were introduced with a viewing path passing through member of third set of sub-pixels 16.3.

Some of the viewing paths VP_1L, VP_2L, VP_3L, VP_1R, VP_2R, VP_3R are interrupted viewing paths VP_D and contribute little or nothing to the light observed at a viewpoint 50L, 50R due to an intentional incompatibility between the emission color of the aligned LER and the transmission color of the aligned sub-pixel. The interrupted viewing paths VP_D were included in the previous discussion of intersecting viewing paths.

The viewing path intersections that have been described define a succession of sub-pixel based intersection planes spaced from the light modulator 10, each successive intersection plane (IP) being located a predetermined, substantially uniform distance from the rear side 17 of light modulator 10 and opposite viewer 49. That is to say, the described intersection planes are located in region 28. One of these planes is the first sub-pixel based intersection plane, IP1. Another is the second sub-pixel based intersection plane, IP2.

As mentioned, at least one embodiment locates the parallax emitter 20 substantially at the second sub-pixel based intersection plane IP2, which has been defined by the intersections of specific viewing paths extending between light emitting regions (LERs) and viewpoints 50L, 50R. In the subsequent discussion, references to LER emission colors and sub-pixel transmission colors are made for clarity only and should not be interpreted as a limiting embodiment. The order of the color assignments may be changed so long as the new arrangement maintains a similar the relationship between the emission colors of the LERs and the color transmissions of the nearby sub-pixels on the light modulator 10.

In at least one implementation the rear parallax emitter includes a repeating pattern of vertically oriented LERs configured to emit repeating time multiplexed spectral ranges of light through the pixels of the modulating display panel to the viewer's viewpoints 50L, 50R, each multiplexed spectral range representing one single optical state.

As represented in FIGS. 11, 12, and 13, the embodiments of configuration C have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

A first optical state for configuration C is schematically presented in FIG. 11. Parallax emitter 20 comprises a plurality of vertically oriented light-emitting regions (LERs) arranged in a repeating pattern 22. Starting from the left side of FIG. 17, repeating pattern 22 includes three regions (LER1, LER2, LER3) numbered from left to right. The first regions LER1 is configured to emit substantially no light; the light emitted by the second LER2 is substantially comprised of a cyan (C) spectral range; the light emitted by the third regions LER3 is substantially comprised of a red (R) spectral range.

In the first optical state for configuration C, pattern 22 includes first regions LER1 configured to emit substantially no light through the first (green) set of sub-pixels 14 (G) to the left viewpoint 50L and to emit substantially no light through the third (red) set of sub-pixels 14 (R) to the right viewpoint 50; second regions LER2 configured to emit light through the second (blue) set of sub-pixels 14 (B) to the left viewpoint 50L and to emit light through the first (green) set of sub-pixels 14 (G) to the right viewpoint 50R; and third regions LER3 configured to emit light through the third (red) set of sub-pixels 14 (R) to the left viewpoint 50L and to emit substantially no light through the second (blue) set of sub-pixels 14 (B) to the right viewpoint 50R;

A second optical state for configuration C is schematically presented in FIG. 12. Parallax emitter 20 comprises a plurality of vertically oriented light-emitting regions (LERs) arranged in a repeating pattern 22. Starting from the left side of FIG. 17, repeating pattern 22 includes three regions (LER1, LER2, LER3) numbered from left to right. The light emitted by regions LER1 is substantially comprised of a yellow (Y) spectral range. The second LER2 is configured to emit substantially no light. The light emitted by the third regions LER3 is substantially comprised of a blue (B) spectral range.

In the second optical state for configuration C, pattern 22 includes first regions LER1 configured to emit light through the first (green) set of sub-pixels 14 (G) to the left viewpoint 50L and to emit light through the third (red) set of sub-pixels 14 (R) to the right viewpoint 50; second regions LER2 configured to emit substantially no light through the second (blue) set of sub-pixels 14 (B) to the left viewpoint 50L and to emit substantially no light through the first (green) set of sub-pixels 14 (G) to the right viewpoint 50R; and third regions LER3 configured to emit substantially no light through the third (red) set of sub-pixels 14 (R) to the left viewpoint 50L and to emit light through the second (blue) set of sub-pixels 14 (B) to the right viewpoint 50R;

FIG. 13 presents a third optical state for configuration C, which may produce a two-dimensional image on light modulator 10. Starting from the left side of FIG. 13, the parallax emitter 20 comprises a repeating pattern 22 of three vertically oriented light-emitting regions (LER1, LER2, LER3), numbered from left to right. All LERs are configured to transmit all light (W). Therefore, each sub-pixel 14 of each color (R), (G), (B) is illuminated by parallax emitter 20 with light that may pass through the sub-pixel 14 and continue traveling along each view path to the viewpoints 50L, 50R. Consequently, the third state has no designated interrupted viewing paths VP_D. However, to create an image, image controller 5 has the capability to shut-off a particular sub-pixel 14 or to shut-off multiple sub-pixels 14 so that the viewing path(s) extending through the sub-pixel(s) would temporarily not transmit light. Furthermore, the cycling on and off of sub-pixels 14 may create an image that changes with time.

In FIG. 13, pattern 22 includes first LER1 configured to emit light through the first (green) set of sub-pixels 14 (G) to the left viewpoint 50L and to emit light through the third (red) set of sub-pixels 14 (R) to the right viewpoint 50R; second LER configured to emit light through the second (blue) set of sub-pixels 14 (B) to the left viewpoint 50L and to emit light through the first (green) set of sub-pixels 14 (G) to the right viewpoint 50R; and third LER3 configured to emit light through the third (red) set of sub-pixels 14 (R) to the left viewpoint 50L and to emit light through the second (blue) set of sub-pixels 14 (B) to the right viewpoint 50R.

Building on what was explained earlier regarding the embodiments of configuration C, the first, second, and third sets of the light emitting regions LER1, LER2, LER3 may be cycled through two or more of three dynamically switchable optical states. One or more of the LERs may, instead, remain in one optical state. Specific now to each LER1, the first optical state may substantially emit no light; a second optical state may emit a yellow spectral range; a third optical state may substantially emit all light (W). Specific now to each LER2, the first optical state may emit a cyan spectral range; a second optical state may substantially emit no light; a third optical state may substantially emit all light (W). Specific now to each LER3, the first optical state may emit a red spectral range; a second optical state may emit a blue spectral range; a third optical state may substantially emit all light (W). Further, the first and red spectral range substantially excludes each other, and the third and blue spectral range also substantially excludes each other.

Configuration D

Figure 14:
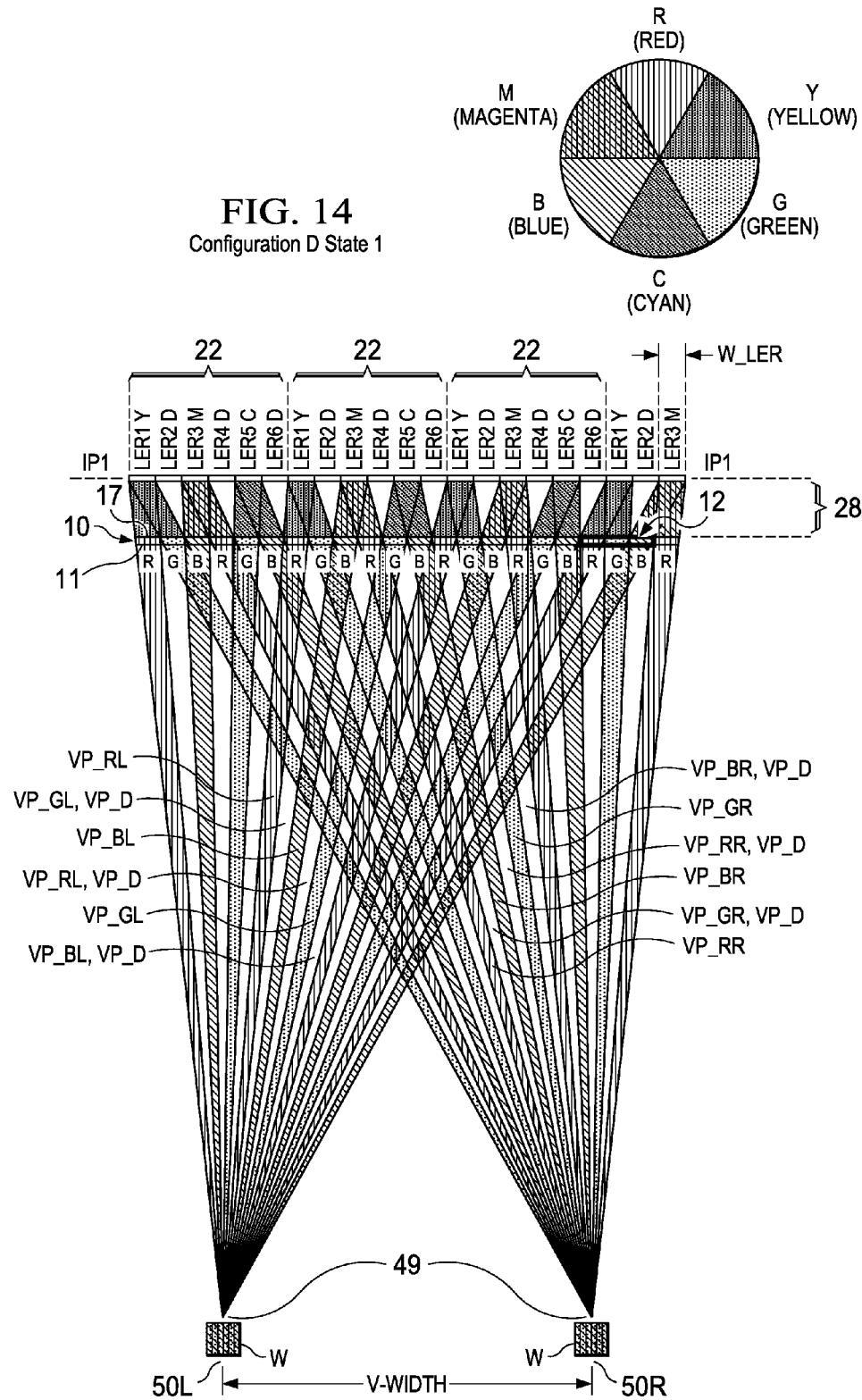
FIG. 14 is a schematic diagram depicting a top view of stereoscopic viewing system configuration D incorporating a dynamically switchable six-segment sub-pixel rear parallax emitter at the first rear intersection plane (IP1 relative to the overlying sub-pixels of the modulating display panel), set to its first dynamic state.
Figure 15:
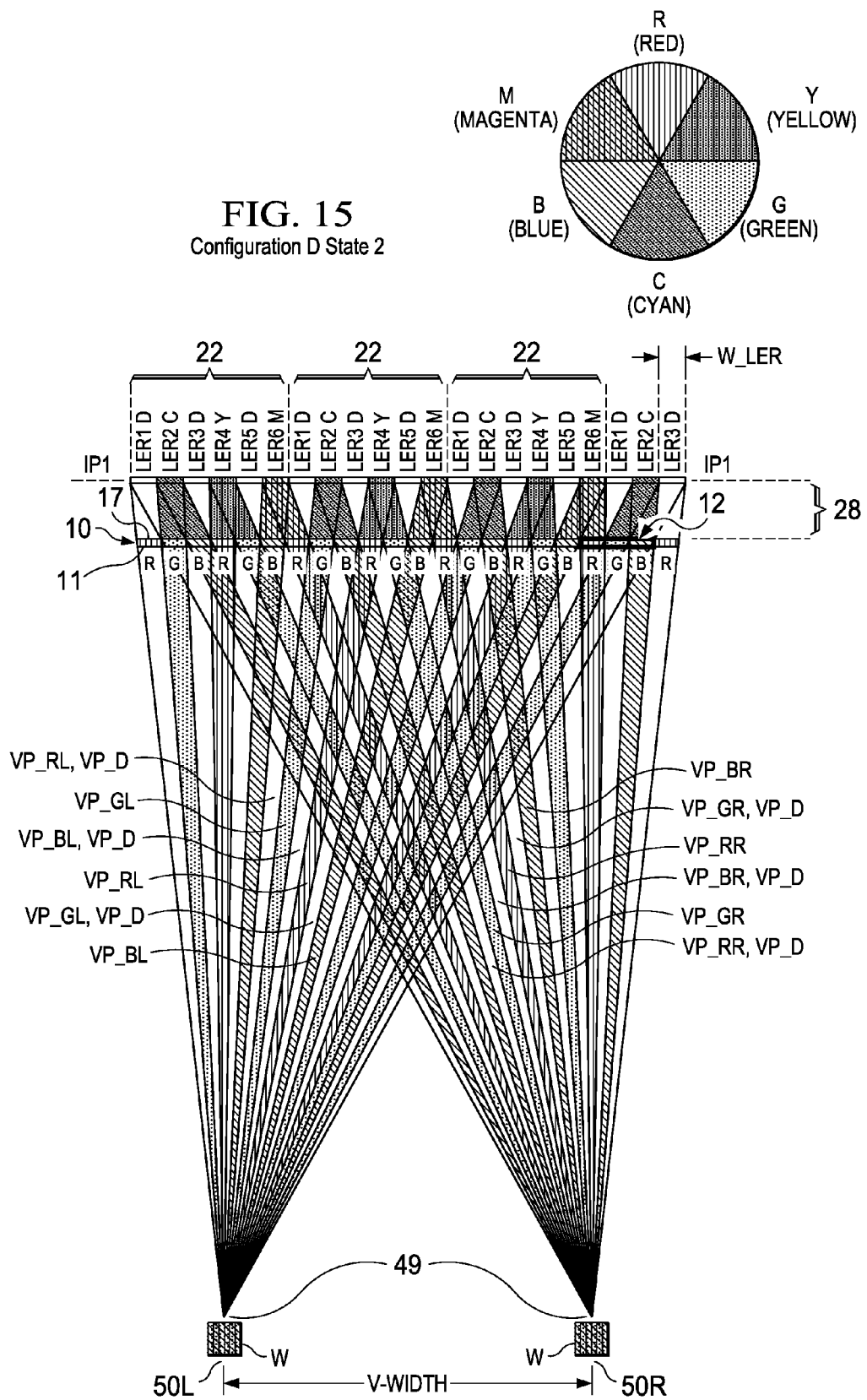
FIG. 15 is a schematic diagram depicting a top view of stereoscopic viewing system configuration D incorporating a dynamically switchable six-segment sub-pixel rear parallax emitter at the first rear intersection plane (IP1 relative to the overlying sub-pixels of the modulating display panel), set to its second dynamic state.
Figure 16:
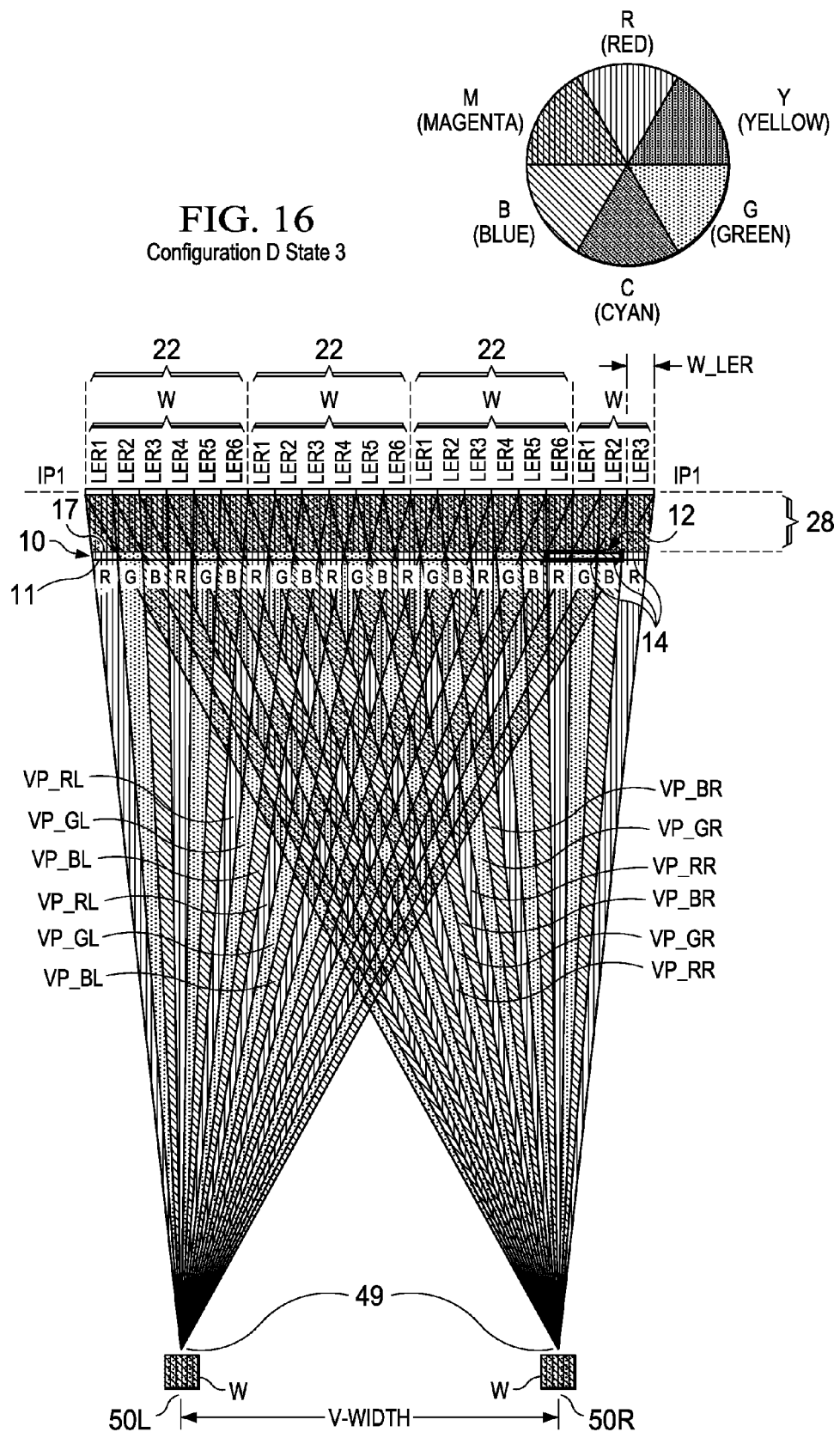
FIG. 16 is a schematic diagram depicting a top view of stereoscopic viewing system configuration D incorporating a dynamically switchable six-segment sub-pixel rear parallax emitter at the first rear intersection plane (IP1 relative to the overlying sub-pixels of the modulating display panel), set to its third dynamic state.

FIGS. 14, 15, and 16 provide examples of another group of embodiments, namely viewing system configuration D with multiple operational states. Configuration D and its operational states are defined, at least in part, by the relative placement of the repeating pattern of vertically oriented regions (LERs) of the parallax emitter 20 with respect to the arrangement of the sub-pixels 14 of the light modulator 10. At least one embodiment locates the parallax emitter substantially at the first sub-pixel based intersection plane defined in the earlier discussion of viewing path intersections.

The arrangement of sub-pixels 14 on light modulator 10 of configuration D will be described first. In at least one embodiment, pixels on panel 10 are tri-color and sub-pixels 14 are positioned in the following order starting on the left side of the diagrams in FIGS. 14, 15, and 16. The first sub-pixel 14 is generally red (R). Every third sub-pixel 14 thereafter is also red (R), and so, for example, the $4^{th}$, $7^{th}$, and $10^{th}$ sub-pixels are red (R). Thus, a first sub-pixel group comprises red sub-pixels 14 (R) and is configured to transmit the frequencies in a spectral range generally defined as red (R). The second sub-pixel 14 is generally green (G). Every third sub-pixel 14 thereafter is also generally green. Thus, a second sub-pixel group comprises green sub-pixels 14 (G) and is configured to transmit light frequencies (or equivalently wavelengths) in a spectral range generally defined as green (G). The third sub-pixel 14 is generally blue (B). Every third sub-pixel 14 thereafter is also blue (B). Therefore, a third sub-pixel group comprises blue sub-pixels 14 (B) and is configured to transmit frequencies in a spectral range generally defined as blue (B). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Referring still to FIGS. 14, 15, and 16, in configuration D, a repeating pattern 22 of light emitting regions (LERs) of parallax emitter 20 is located at just one of the successive intersection planes, situated on the side of the light modulator 10 opposite viewer 49. The intersection planes (IPs) have been defined based the intersections of specific viewing paths extending from viewpoints 50L, 50R and through sub-pixels 14, which were explained in the earlier section of this disclosure. At least one embodiment locates the parallax emitter 20 substantially at the first sub-pixel based intersection plane, IP1, as illustrated FIGS. 14, 15, and 16.

The repeating pattern 22 comprises six vertically oriented light-emitting regions (LER1 to LER6), numbered from left to right in FIGS. 14, 15, and 16. Because the reference figures represent a non-vertical, planar section of display 1, the vertical dimension of the LERs is not apparent in the figures. In configuration D, each LER has a width (W_LER) that generally matches the width of the viewing path intersections on the selected intersection plane. Therefore the width of each LER is selected to illuminate approximately one sub-pixel from the vantage of a viewpoint 50L, 50R.

In at least one implementation the rear parallax emitter includes a repeating pattern of vertically oriented LERs configured to emit repeating time multiplexed spectral ranges of light through the pixels of the light modulator 10 to the viewer's viewpoints 50L, 50R, each multiplexed spectral range representing one single optical state.

The embodiments of configuration D have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

In one or more optical states of configuration D, one or more of the viewing paths VP_GL, VP_BL, VP_GR, VP_BR are interrupted viewing paths VP_D. One or more interrupted viewing path VP_D results from an LER that is configured to emit substantially no light of any visible wavelength. Interrupted viewing paths contribute little or nothing to the light observed at the corresponding viewpoint.

A first optical state for configuration D is schematically presented in FIG. 14. Starting from the left side, the six light emitting regions (LER1 to LER6) in repeating pattern 22 are numbered from left to right. First regions LER1 are configured to emit light substantially comprising a yellow (Y) spectral range. The second, fourth, and sixth regions LER2, LER4, LER6 are configured to emit substantially no light. Third regions LER3 are configured to emit light substantially comprising a magenta (M) spectral range. Fifth regions LER5 are configured to emit light substantially comprising a cyan (C) spectral range.

In the first optical state for configuration D, pattern 22 includes first regions LER1 configured to emit light through the first (red) set of sub-pixels 14 (R) to the left viewpoint 50L and to emit light through the second (green) set of sub-pixels 14 (G)) to the right viewpoint 50; second regions LER2 configured to emit substantially no light through the second (green) set of sub-pixels 14 (G) to the left viewpoint 50L and to emit substantially no light through the third (blue) set of sub-pixels 14 (B) to the right viewpoint 50R; third regions LER3 configured to emit light through the third (blue) set of sub-pixels 14 (B) to the left viewpoint 50L and to emit light through the first (red) set of sub-pixels 14 (R) to the right viewpoint 50R; fourth regions LER4 configured to emit substantially no light through the first (red) set of sub-pixels 14 (R) to the left viewpoint 50L and to emit substantially no light through the second (green) set of sub-pixels 14 (G) to the right viewpoint 50R; fifth regions LER5 configured to emit light through the second (green) set of sub-pixels 14 (G) to the left viewpoint 50L and to emit light through the third (blue) set of sub-pixels 14 (B) to the right viewpoint 50R; and sixth regions LER6 configured to emit substantially no light through the third (blue) set of sub-pixels 14 (B) to the left viewpoint 50L and to emit substantially no light through the first (red) set of sub-pixels 14 (R) to the right viewpoint 50R.

A second optical state for configuration D is schematically presented in FIG. 15. Starting from the left side, the six light emitting regions (LER1 to LER6) in repeating pattern 22 are numbered from left to right. First, third, and fifth regions LER1, LER3, LER5 are configured to emit substantially no light. Second regions LER3 are configured to emit light substantially comprising a cyan (C) spectral range. Fourth regions LER4 are configured to emit light substantially comprising a yellow (Y) spectral range. Sixth regions LER6 are configured to emit light substantially comprising a magenta (M) spectral range.

In the second optical state for configuration D, the repeating pattern 22 of six vertically oriented regions includes first regions LER1 configured to substantially emit no light through the first (red) set of sub-pixels 14 (R) to the left viewpoint 50L and to substantially emit no light through the second (green) set of sub-pixels 14 (G) to the right viewpoint 50R; second regions LER2 configured to emit light through the second (green) set of sub-pixels 14 (G) to the left viewpoint 50L and to emit light through the third (blue) set of sub-pixels 14 (B) to the right viewpoint 50R; third regions LER3 configured to substantially emit no light through the third (blue) set of sub-pixels 14 (B) to the left viewpoint 50L and to substantially emit no light through the first (red) set of sub-pixels 14 (R) to the right viewpoint 50R; fourth regions LER4 configured to emit light through the first (red) set of sub-pixels 14 (R) to the left viewpoint 50L and to emit light through the second (green) set of sub-pixels 14 (G) to the right viewpoint 50R; fifth regions LER5 configured to substantially emit no light through the second (green) set of sub-pixels 14 (G) to the left viewpoint 50L and to substantially emit no light through the third (blue) set of sub-pixels 14 (B) to the right viewpoint 50R; and sixth regions LER6 configured to emit light through the third (blue) set of sub-pixels 14 (B) to the left viewpoint 50L and to emit light through the first (red) set of sub-pixels 14 (R) to the right viewpoint 50R.

FIG. 16 presents a third optical state for configuration D, which may produce a two-dimensional image on light modulator 10. Starting from the left side of FIG. 16, the parallax emitter 20 comprises a repeating pattern 22 of three vertically oriented light-emitting regions (LER1, LER2, LER3), numbered from left to right. All LERs are configured to transmit all light (W). As explained earlier, each of the three sub-pixels 14 within a given pixel 12 has a unique transmission color (R), (G), or (B). In third state, each sub-pixel 14 is illuminated by parallax emitter 20 with light that may pass through each sub-pixel 14 and continue traveling along a corresponding view path to a viewpoint 50L, 50R. Consequently, the third state has no interrupted viewing paths VP_D.

As shown in FIG. 16, in the third optical state for configuration D, pattern 22 of three vertically oriented regions includes first regions LER1 configured to emit light through the first (red) set of sub-pixels 14 (R) to the left viewpoint 50L and to emit light through the second (green) set of sub-pixels 14 (G) to the right viewpoint 50R; second regions LER2 configured to emit light through the second (green) set of sub-pixels 14 (G) to the left viewpoint 50L and to emit light through the third (blue) set of sub-pixels 14 (B) to the right viewpoint 50R; third regions LER3 configured to emit light through the third (blue) set of sub-pixels 14 (B) to the left viewpoint 50L and to emit light through the first (red) set of sub-pixels 14 (R) to the right viewpoint 50R; fourth regions configured to emit light through the first (red) set of sub-pixels 14 to the left viewpoint 50L and to emit light through the second (green) set of sub-pixels 14 to the right viewpoint 50R; fifth regions configured to emit light through the second (green) set of sub-pixels 14 to the left viewpoint 50L and to emit light through the third (blue) set of sub-pixels 14 to the right viewpoint 50R; and sixth regions configured to emit light through the third (blue) set of sub-pixels 14 to the left viewpoint 50L and to emit light through the first (red) set of sub-pixels 14 to the second viewpoint Building on what was explained earlier regarding the embodiments of configuration D, the first, second, third, fourth, fifth, and sixth sets of the light emitting regions LER1 to LER6 may be cycled through two or more of their three respective dynamically switchable optical states. One or more of the LERs may, instead, remain in one optical state. Specific now to each LER1, the first optical state may emit a cyan spectral range; a second optical state may substantially emit no light; a third optical state may substantially emit all light. Specific now to each LER2, the first optical state may substantially emit no light; a second optical state may emit a magenta spectral range; a third optical state may substantially emit all light. Specific now to each LER3, the first optical state may emit a yellow spectral range; a second optical state may substantially emit no light; a third optical state may substantially emit all light. Specific now to each LER4 Specific now to each LER4, the first optical state may substantially emit no light; a second optical state may emit a cyan spectral range; a third optical state may substantially emit all light. Specific now to each LER5, the first optical state may emit a magenta spectral range; a second optical state may substantially emit no light; a third optical state may substantially emit all light. Specific now to each LER6, the first optical state may substantially emit no light; a second optical state may emit a yellow spectral range; a third optical state may substantially emit all light.

Configuration E

Figure 17:
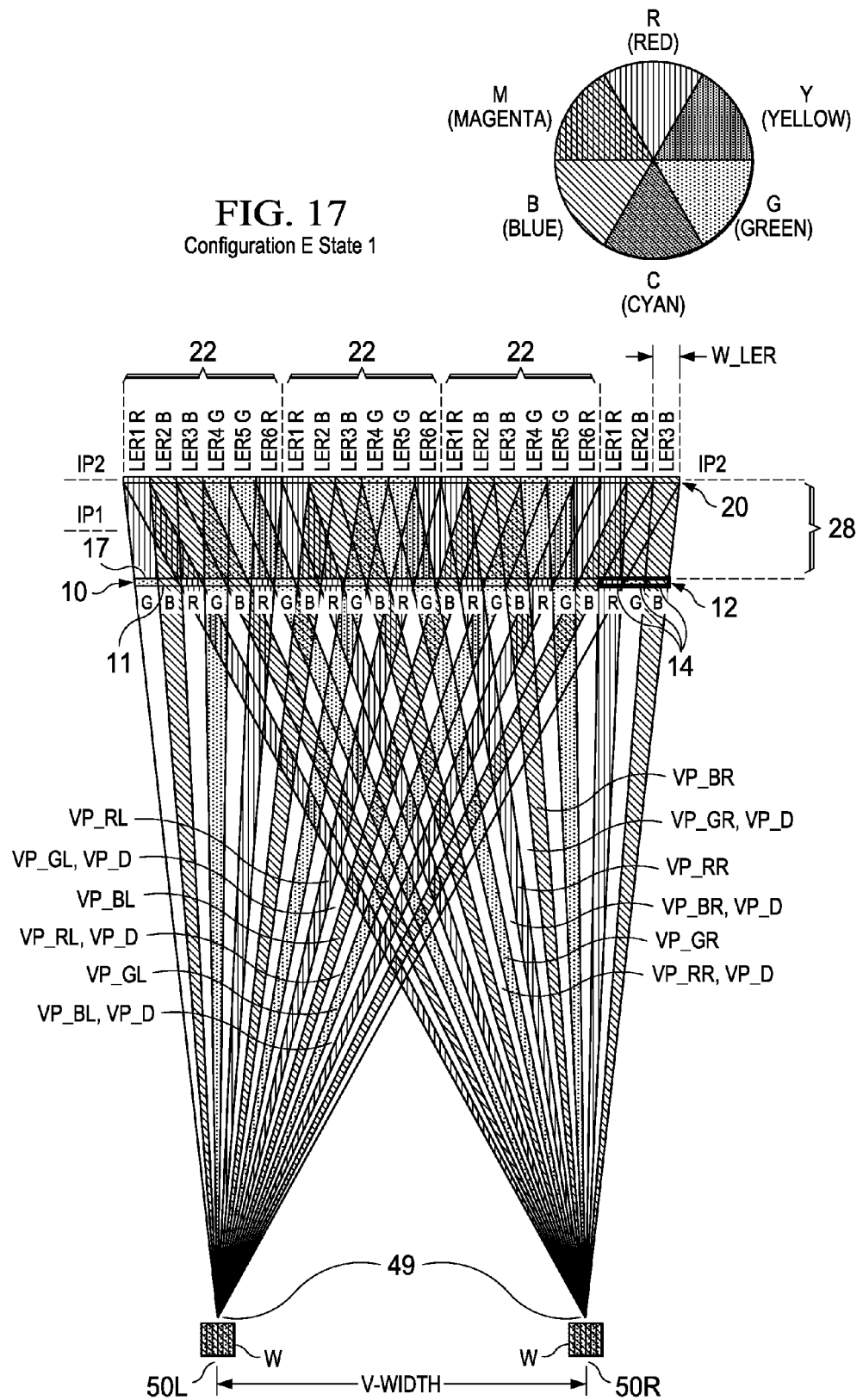
FIG. 17 is a schematic diagram depicting a top view of stereoscopic viewing system configuration E incorporating a dynamically switchable six-segment sub-pixel rear parallax emitter at the second rear intersection plane (IP2 relative to the overlying sub-pixels of the modulating display panel), set to its first dynamic state.
Figure 18:
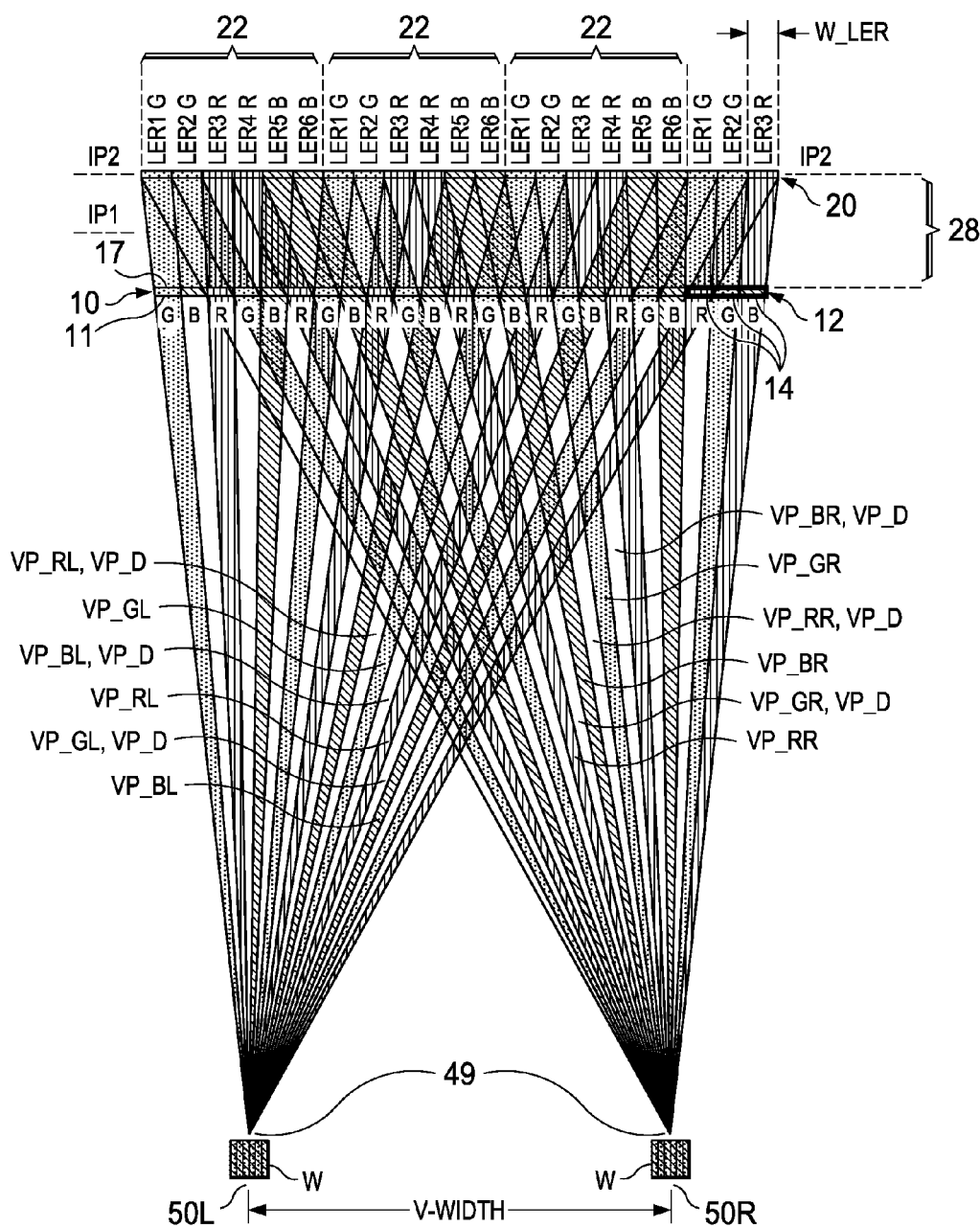
FIG. 18 is a schematic diagram depicting a top view of stereoscopic viewing system configuration E incorporating a dynamically switchable six-segment sub-pixel rear parallax emitter at the second rear intersection plane (IP2 relative to the overlying sub-pixels of the modulating display panel), set to its second dynamic state.
Figure 19:
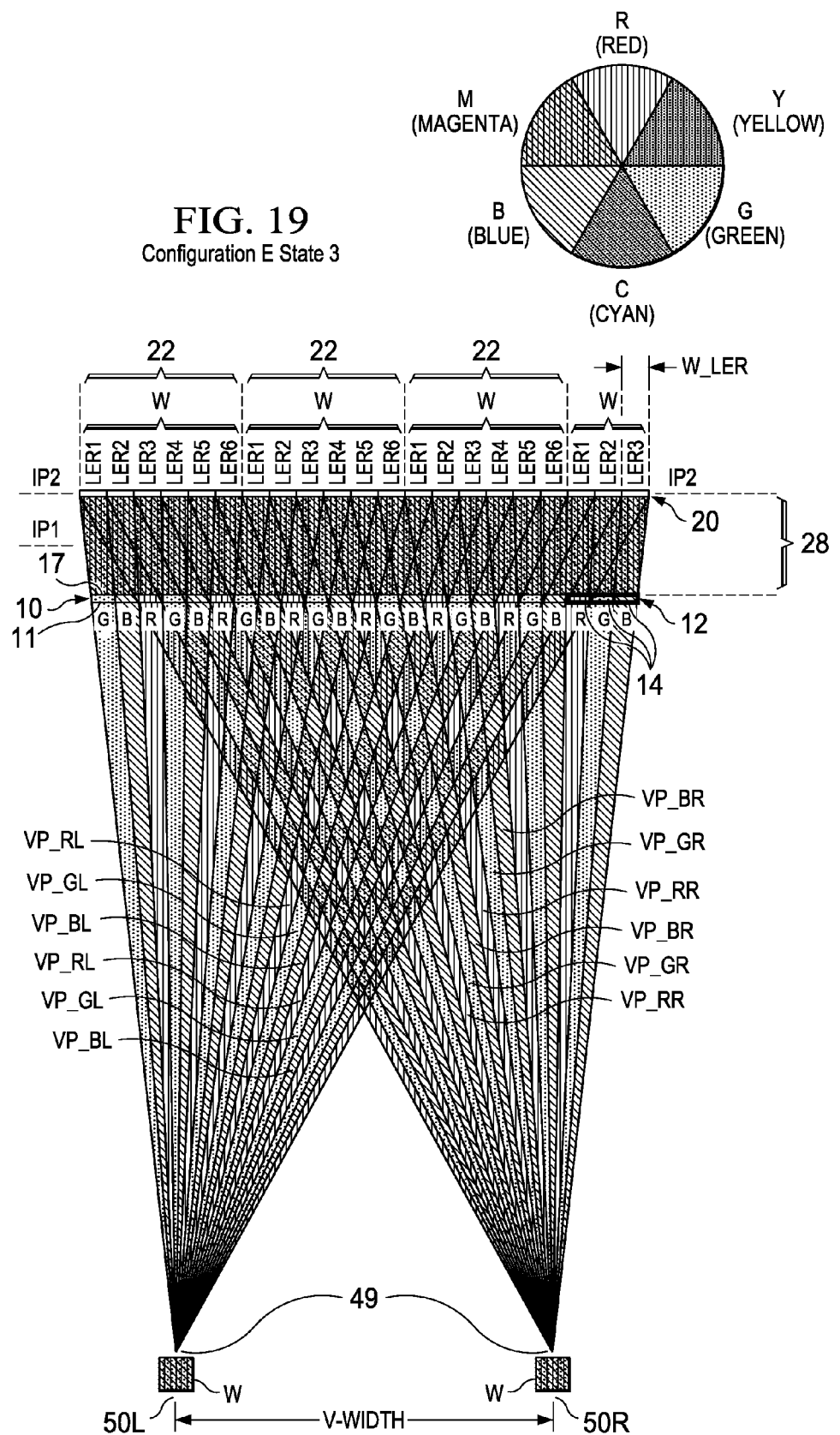
FIG. 19 is a schematic diagram depicting a top view of stereoscopic viewing system configuration E incorporating a dynamically switchable six-segment sub-pixel rear parallax emitter at the second rear intersection plane (IP2 relative to the overlying sub-pixels of the modulating display panel), set to its third dynamic state.

FIGS. 17, 18, and 19 provide examples of another group of embodiments, namely viewing system configuration E with multiple operational states. Configuration E and its optical states are defined, at least in part, by the relative placement of the repeating pattern of vertically oriented regions (LERs) of the parallax emitter 20 with respect to the arrangement of the sub-pixels 14 of the light modulator 10. As will be explained in more detail, at least one embodiment locates the parallax emitter 20 substantially at the second sub-pixel based intersection plane (IP2).

The arrangement of sub-pixels 14 on light modulator 10 of configuration E will be first described. In at least one embodiment, pixels on panel 10 are tri-color, and sub-pixels 14 are positioned in the following order starting on the left side of the diagrams in FIGS. 17, 18, and 19. The first sub-pixel 14 is generally green (G). Every third sub-pixel 14 thereafter is also generally green, and so, for example, the $4^{th}$, $7^{th}$, and $10^{th}$ sub-pixels are green (G). Thus, a first sub-pixel group comprises green sub-pixels 14 (G) and is configured to transmit light frequencies (or equivalently wavelengths) in a spectral range generally defined as green (G). The second sub-pixel 14 is generally blue. Every third sub-pixel 14 thereafter is also blue (B). Therefore, a second sub-pixel group comprises blue sub-pixels 14 (B) and is configured to transmit frequencies in a spectral range generally defined as blue (B). The third sub-pixel 14 is generally red (R). Every third sub-pixel 14 thereafter is also red (R). Thus, a third sub-pixel group comprises red sub-pixels 14 (R) and is configured to transmit frequencies in a spectral range generally defined as red (R). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Discussion of Viewing Paths for Configuration E

Light may travel either direction along a viewing path, e.g. viewing path VP_GL. Notably, light generated by LERs on parallax emitter 20 may travel through sub-pixels 14 of light modulator 10 to viewpoints 50L, 50R.

In at least one embodiment, at least one viewing path VP_RL, VP_GL, VP_BL extends between left viewpoint 50L and a light emitting region (LER) on parallax emitter 20. In the example shown FIGS. 17, 18, and 19, a viewing path VP_GL extends between left viewpoint 50L and one of the green (G) sub-pixels 14 and continues by extending between the green (G) sub-pixel 14 and an LER on the parallax emitter 20. In the example embodiment, a similar viewing path VP_GL is defined between left viewpoint 50L and each of the green (G) sub-pixels 14. If the color emitted by the aligned LER is compatible with the green (G) transmission color of the sub-pixel 14 on a particular viewing path VP_GL, then light may be transmitted from the LER, through the sub-pixel 14, and to left viewpoint 50L. Examples of LER emission colors compatible with green sub-pixels 14 (G) are green, cyan, and yellow, assuming the cyan and yellow each define a spectrum of light containing green rather than a narrow spectrum or a single wavelength as might be generated by a laser. If the emission color of the LER is incompatible with the green (G) transmission color of the sub-pixel 14 along a given viewing path VP_GL, little or no light will be transmitted from the LER, through the green (G) sub-pixel 14, and to left viewpoint 50L on that particular viewing path VP_GL. Examples of colors incompatible with green sub-pixels are blue, red, and magenta because those colors substantially contain no green. Viewing paths that are not configured to transmit light from an LER to a viewpoint 50L, 50R in a particular embodiment due to an intentional incompatibility appear dark to the corresponding viewpoint 50L or 50R and are considered interrupted viewing paths VP_D.

Continuing to reference FIGS. 17, 18, and 19, in the same way, a viewing path VP_RL extends between left viewpoint 50L and each red sub-pixel 14(R) of light modulator 10 and continues by extending between the particular red (R) sub-pixel 14 and an LER on the parallax emitter 20. A viewing paths VP_BL extends between left viewpoint 50L and each blue sub-pixel 14 (B) and continues by extending between the particular blue (B) sub-pixel 14 and an LER on the parallax emitter 20. Again, viewing paths that are not configured to transmit light through the corresponding sub-pixel and to a viewpoint 50L, 50R in a particular embodiment appear dark to the corresponding viewpoint 50L or 50R and are considered interrupted viewing paths VP_D.

In at least one embodiment, at least one viewing path VP_RR, VP_GR, VP_BR extends between right viewpoint 50R and a light emitting region (LER) on parallax emitter 20. In the example shown FIGS. 17, 18, and 19, a viewing path VP_GR extends between right viewpoint 50R and each green (G) sub-pixel 14 and continues by extending between the particular green (14) sub-pixel 14 and an LER on the parallax emitter 20. A viewing path VP_RR extends between right viewpoint 50R and each red (R) sub-pixel 14 of light modulator 10 and continues by extending between the particular red (R) sub-pixel 14 and an LER on the parallax emitter 20. A viewing path VP_BR extends between right viewpoint 50R and each blue (B) sub-pixel 14 of light modulator 10 and continues by extending between the particular blue (B) sub-pixel 14 and an LER on the parallax emitter 20. Viewing paths that are not configured to transmit light from an LER to a viewpoint 50L, 50R in a particular embodiment due to an intentional incompatibility appear dark to the corresponding viewpoint 50L or 50R and are considered interrupted viewing paths VP_D.

Configuration E Arrangement

With viewing paths defined for viewpoints 50L, 50R, the nature of configuration E and the placement of the parallax emitter 20 may now be described. Continuing with FIGS. 17, 18, and 19, the intersection of viewing paths will be evaluated in the region 28 between the LERs and the light modulator 10. As explained, some of the viewing paths VP_RL, VP_GL, VP_BL from left viewpoint 50L and some of the viewing paths VP_RR, VP_GR, VP_BR from right viewpoint 50R are interrupted viewing paths VP_D. Interrupted viewing paths contribute little or nothing to the light observed at the corresponding viewpoint due to an intentional incompatibility between the emission color of the aligned LER and the transmission color of the aligned sub-pixel. Even so, the interrupted viewing paths VP_D are included in this discussion of intersecting viewing paths. The interrupted viewing paths VP_D should not be overlooked.

In region 28, one or more viewing paths VP_GL defined from left viewpoint 50L and extending through a green sub-pixel 14 (G) crosses, i.e. intersects, the viewing paths VP_BR, VP_RR defined from right viewpoint 50R and extending through the nearest blue sub-pixel 14 (B) and red sub-pixel 14 (R), respectively, located on the right side of the green sub-pixel 14 (G). In the same manner, one or more viewing path VP_GR defined from right viewpoint 50R and extending through a green sub-pixel 14 (G) intersects the viewing paths VP_RL, VP_BL defined from left viewpoint 50L and extending through the nearest red (R) sub-pixel 14 and blue (B) sub-pixel 14, respectively, located on the left side of the green (G) sub-pixel 14. Similar statements could be made if the discussion were introduced by starting with a viewing path passing through a red (R) sub-pixel 14 or if the discussion were introduced by starting with a viewing path passing through a blue (B) sub-pixel 14.

The viewing path intersections that have been described define a succession of sub-pixel based intersection planes spaced from the light modulator 10, each successive intersection plane (IP) being located a predetermined, substantially uniform distance from the rear side 17 of light modulator 10 and opposite viewer 49. That is to say, the described intersection planes are located in region 28. One of these planes is the first sub-pixel based intersection plane, IP1. Another is the second sub-pixel based intersection plane, IP2. Others intersection planes exist farther behind light modulator 10.

In configuration E, a repeating pattern 22 of light emitting regions (LERs) of parallax emitter 20 is located at just one of the successive intersection planes, situated on the side of the light modulator 10 opposite viewer 49. At least one embodiment locates the parallax emitter substantially at the second sub-pixel based intersection plane, IP2, as illustrated in FIGS. 17, 18, and 19. The repeating pattern 22 comprises six vertically oriented light-emitting regions (LER1 to LER6). Because the reference figures represent non-vertical, planar section of display 1, the vertical dimension of the LERs is not apparent in the figures. Each LER has a width (W_LER) that generally matches the width of the viewing path intersections on the selected intersection plane. Therefore the width of each LER is selected to illuminate approximately one sub-pixel from the vantage of a viewpoint 50L, 50R. As noted above, the spectral ranges of color emitted by each LER may be varied for various optical states of configuration E and will therefore be subsequently specified when the optical states of operation are explained.

More generally, the geometric arrangement of light modulator 10 in Configuration E, may be defined without specific reference to the spectral color ranges (R), (G), (B) of the three groups of sub-pixels 14. Instead, the three sub-pixel groups may be designated as first, second, and third without specifying which color range is the first, second, or third color as exemplified in FIG. 1. In these embodiments, members of the first 16.1, second 16.2, and third 16.3 sets of sub-pixels are controllable to transmit light received from the side of the light modulator 10 opposite the viewer 49. Configuration E will now be described in this more general manner.

In the region 28 between the parallax emitter 20 and the light modulator 10, one or more viewing paths VP_1L, which is defined from left viewpoint 50L and extends through a member of first set of sub-pixels 16.1, crosses, i.e. intersects, two other nearby viewing paths that extend from an LER to right viewpoint 50R. At one of these intersections, the viewing path VP_1L crosses a viewing path VP_2R extending through a nearby, rightward member of a second set of sub-pixels 16.2. The same viewing path VP_1L also intersects, a viewing path VP_3R extending through a nearby, rightward member of a third set of sub-pixels 16.3. Similar statements could be made if the discussion were introduced with a viewing path passing through a member of second set of sub-pixels 16.2 or if the discussion were introduced with a viewing path passing through member of third set of sub-pixels 16.3.

In a similar manner, starting from the other viewpoint 50R, one or more viewing paths VP_1R, which extend through a member of the first set of sub-pixels 16.1 intersects two other nearby viewing paths that each extend from an LER to left viewpoint 50L. At one of these intersections, the viewing path VP_1R crosses a viewing path VP_2L extending through the nearby, leftward member of a second set of sub-pixels 16.2. The same viewing path VP_1R also intersects, a viewing path VP_3L extending through a nearby, leftward member of a third set of sub-pixels 16.3. Similar statements could be made if the discussion were introduced with a viewing path passing through a member of second set of sub-pixels 16.2 or if the discussion were introduced with a viewing path passing through member of third set of sub-pixels 16.3.

Some of the viewing paths VP_1L, VP_2L, VP_3L, VP_1R, VP_2R, VP_3R are interrupted viewing paths VP_D and contribute little or nothing to the light observed at a viewpoint 50L, 50R due to an intentional incompatibility between the emission color of the aligned LER and the transmission color of the aligned sub-pixel. The interrupted viewing paths VP_D were included in the previous discussion of intersecting viewing paths.

The viewing path intersections that have been described define a succession of sub-pixel based intersection planes spaced from the light modulator 10, each successive intersection plane (IP) being located a predetermined, substantially uniform distance from the rear side 17 of light modulator 10 and opposite viewer 49. That is to say, the described intersection planes are located in region 28. One of these planes is the first sub-pixel based intersection plane, IP1. Another is the second sub-pixel based intersection plane, IP2.

As mentioned, at least one embodiment locates the parallax emitter 20 substantially at the second sub-pixel based intersection plane IP2, which has been defined by the intersections of specific viewing paths extending between light emitting regions (LERs) and viewpoints 50L, 50R. In the subsequent discussion, references to LER emission colors and sub-pixel transmission colors are made for clarity only and should not be interpreted as a limiting embodiment. The order of the color assignments may be changed so long as the new arrangement maintains a similar the relationship between the color emissions of the LERs and the color transmissions of the nearby sub-pixels on the light modulator 10.

In at least one implementation the rear parallax emitter includes a repeating pattern of vertically oriented LERs configured to emit repeating time multiplexed spectral ranges of light through the pixels of the modulating display panel to the viewer's viewpoints 50L, 50R, each multiplexed spectral range representing one single optical state.

As represented in FIGS. 17, 18, and 19, the embodiments of configuration E have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

A first optical state for configuration E is schematically presented in FIG. 17. Parallax emitter 20 comprises a plurality of vertically oriented light-emitting regions (LERs) arranged in a repeating pattern 22. Starting from the left side of FIG. 17, repeating pattern 22 includes six regions (LER1 to LER6) numbered from left to right. The light emitted by the first and sixth regions LER1, LER6 is substantially comprised of a red (R) spectral range; the light emitted by the second and third regions LER2, LER3 is substantially comprised of a blue (B) spectral range; the light emitted by the fourth and fifth regions LER4, LER5 is substantially comprised of a green (G) spectral range.

In the first optical state for configuration E, pattern 22 includes first regions LER1 configured to emit substantially no light through the first (green) set of sub-pixels 14 (G) to the left viewpoint 50L and to emit light through the third (red) set of sub-pixels 14 (R) to the right viewpoint 50R; second regions LER2 configured to emit light through the second (blue) set of sub-pixels 14 (B) to the left viewpoint 50L and to substantially emit no light through the first (green) set of sub-pixels 14 (G) to the right viewpoint 50R; third regions LER3 configured to substantially emit no light through the third (red) set of sub-pixels 14 (R) to the left viewpoint 50L and to emit light through the second (blue) set of sub-pixels 14 (B) to the right viewpoint 50R; fourth regions LER4 configured to emit light through the first (green) set of sub-pixels 14 (G) to the left viewpoint 50L and to substantially emit no light through the third (red) set of sub-pixels 14 (R) to the right viewpoint 50R; fifth regions LER5 configured to substantially emit no light through the second (blue) set of sub-pixels 14 (B) to the left viewpoint 50L and to emit light through the first (green) set of sub-pixels 14 (G) to the right viewpoint 50R; and sixth regions LER6 configured to emit light through the third (red) set of sub-pixels 14 (R) to the left viewpoint 50L and to substantially emit no light through the second (blue) set of sub-pixels 14 (B) to the right viewpoint 50R.

A second optical state for configuration E is schematically presented in FIG. 18. Starting on the left side of the schematic, a repeating pattern 22 of six vertically oriented light-emitting regions (LER1 to LER6). In the second state for configuration E, the spectral range of light colors emitted by at least one of the light emitting regions (LERs) differs from the first state. For example, the light emitted by the first and second regions LER1, LER2 may be substantially comprised of a green spectral range; the light emitted by the third and fourth regions LER3, LER4 may be substantially comprised of a red spectral range; the light emitted by the fifth and sixth regions LER5, LER6 may be substantially comprised of a blue spectral range.

In the second state for configuration E, pattern 22 includes first regions LER1 configured to emit light through the first (green) set of sub-pixels 14 (G) to the left viewpoint 50L and to substantially emit no light through the third (red) set of sub-pixels 14 (R) to the right viewpoint 50R; second regions LER2 configured to substantially emit no light through the second (blue) set of sub-pixels 14 (B) to the left viewpoint 50L and to emit light through the first (green) set of sub-pixels 14 (G) to the right viewpoint 50R; third regions LER3 configured to emit light through the third (red) set of sub-pixels 14 (R) to the left viewpoint 50L and to substantially emit no light through the second (blue) set of sub-pixels 14 (B) to the right viewpoint 50R; fourth regions LER4 configured to substantially emit no light through the first (green) set of sub-pixels 14 (G) to the left viewpoint 50L and to emit light through the third (red) set of sub-pixels 14 (R) to the right viewpoint 50R; fifth regions LER5 configured to emit light through the second (blue) set of sub-pixels 14 (B) to the left viewpoint 50L and to substantially emit no light through the first (green) set of sub-pixels 14 (G) to the right viewpoint 50R; and sixth regions LER6 configured to substantially emit no light through the third (red) set of sub-pixels 14 (R) to the left viewpoint 50L and to emit light through the second (blue) set of sub-pixels 14 (B) to the right viewpoint 50R.

FIG. 19 presents a third optical state for configuration E, which may produce a two-dimensional image on light modulator 10. Starting from the left side of FIG. 19, the parallax emitter 20 comprises a repeating pattern 22 of six vertically oriented light-emitting regions (LER1 to LER6), numbered from left to right. All LERs are configured to transmit all light (W). Therefore, each sub-pixel 14 of each color (R), (G), (B) is illuminated by parallax emitter 20 with light that may pass through the sub-pixel 14 and continue traveling along each view path to the viewpoints 50L, 50R. Consequently, the third state has no designated interrupted viewing paths VP_D.

However, to create an image, image controller 5 has the capability to shut-off a particular sub-pixel 14 or to shut-off multiple sub-pixels 14 so that the viewing path(s) extending through the sub-pixel(s) would temporarily not transmit light. Furthermore, the cycling on and off of sub-pixels 14 may create an image that changes with time.

In the third optical state for configuration E, pattern 22 includes first and fourth regions LER1, LER4 configured to emit light through the first (green) set of sub-pixels 14 (G) to the left viewpoint 50L and to emit light through the third (red) set of sub-pixels 14 (R) to the right viewpoint 50R; second and fifth regions LER2, LER5 configured to emit light through the second (blue) set of sub-pixels 14 (B) to the left viewpoint 50L and to emit light through the first (green) set of sub-pixels 14 (G) to the right viewpoint 50R; and third and sixth regions LER3, LER6 configured to emit light through the third (red) set of sub-pixels 14 (R) to the left viewpoint 50L and to emit light through the second (blue) set of sub-pixels 14 (B) to the right viewpoint 50R. From this description that the illumination of viewing paths from LER1 and LER4 are substantially equivalent. So too, the illumination of viewing paths from LER2 and LER5 are substantially equivalent, as are the illumination of viewing paths from LER3 and LER6.

Building on what was explained earlier regarding the embodiments of configuration E, the first, second, third, fourth, fifth, and sixth sets of the light emitting regions LER1 to LER6 may be cycled through two or more of their three respective dynamically switchable optical states. One or more of the LERs may, instead, remain in one optical state. The optical states of the LERs correspond to the optical states of configuration E. Specific now to each LER1, the first optical state may emit a green spectral range; a second optical state may emit a red spectral range; a third optical state may substantially emit all light (W), which in some examples may be white light. Specific now to each LER2, the first optical state may emit a green spectral range; a second optical state may emit a blue spectral range; a third optical state may substantially emit all light (W). Specific now to each LER3, the first optical state may emit a red spectral range; a second optical state may emit a blue spectral range; a third optical state may substantially emit all light (W). Specific now to each LER4, the first optical state may emit a red spectral range; a second optical state may emit a green spectral range; a third optical state may substantially emit all light (W). Specific now to the fifth set of LERs, the first optical state may emit a blue spectral range; a second optical state may emit a green spectral range; a third optical state may substantially emit all light (W). Specific now to the sixth set of LERs, the first optical state may emit a blue spectral range; a second optical state may emit a red spectral range; a third optical state may substantially emit all light (W). Further, the red, blue, and green sets of spectral ranges substantially exclude each other.

Configuration F

Figure 20:
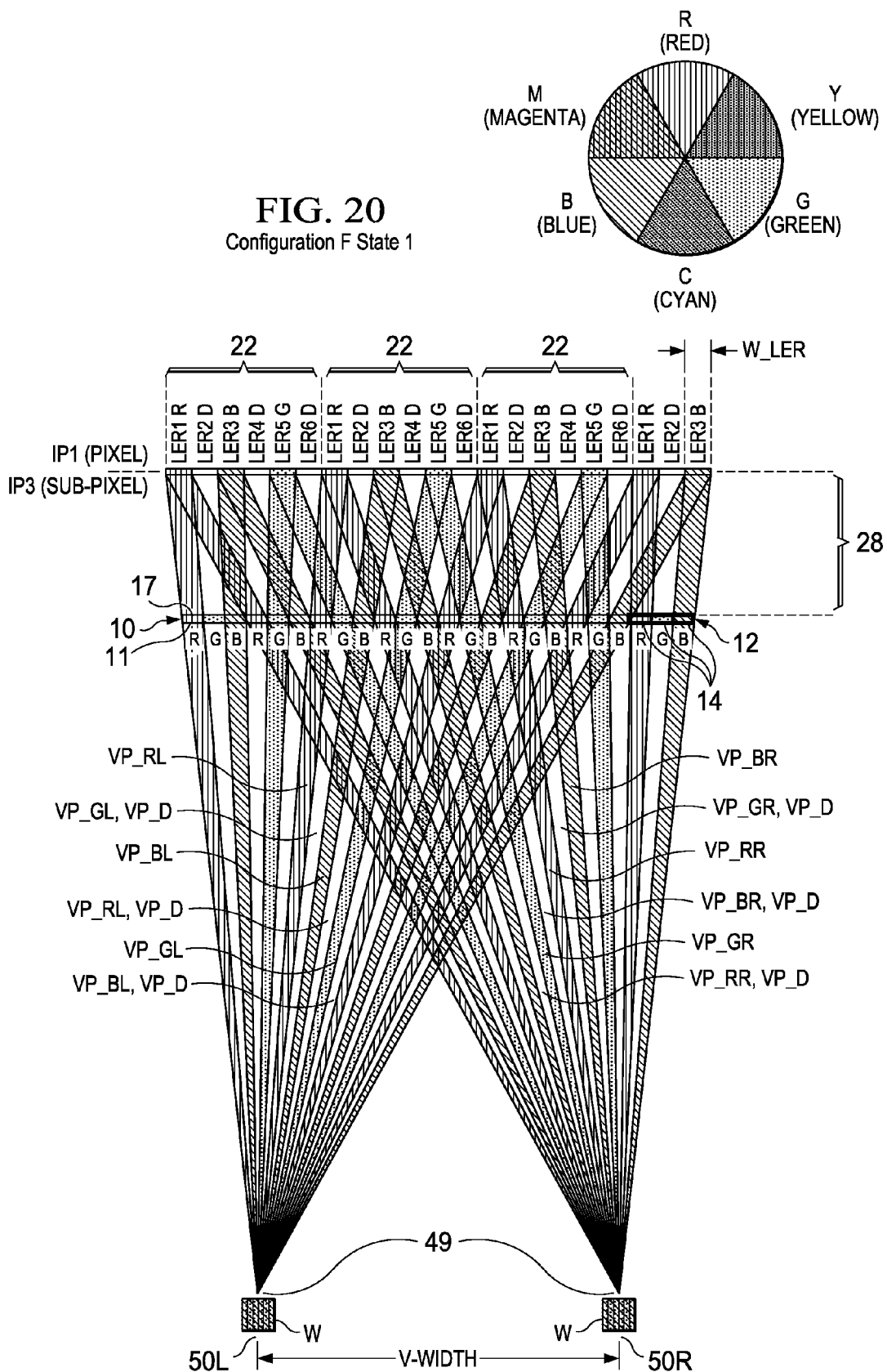
FIG. 20 is a schematic diagram depicting a top view of stereoscopic viewing system configuration F incorporating a dynamically switchable six-segment sub-pixel rear parallax emitter at the first rear intersection plane (IP1 relative to the overlaying pixels of the modulating display panel, or IP3 relative to the overlying sub-pixels of the modulating display panel), set to its first dynamic state.
Figure 21:
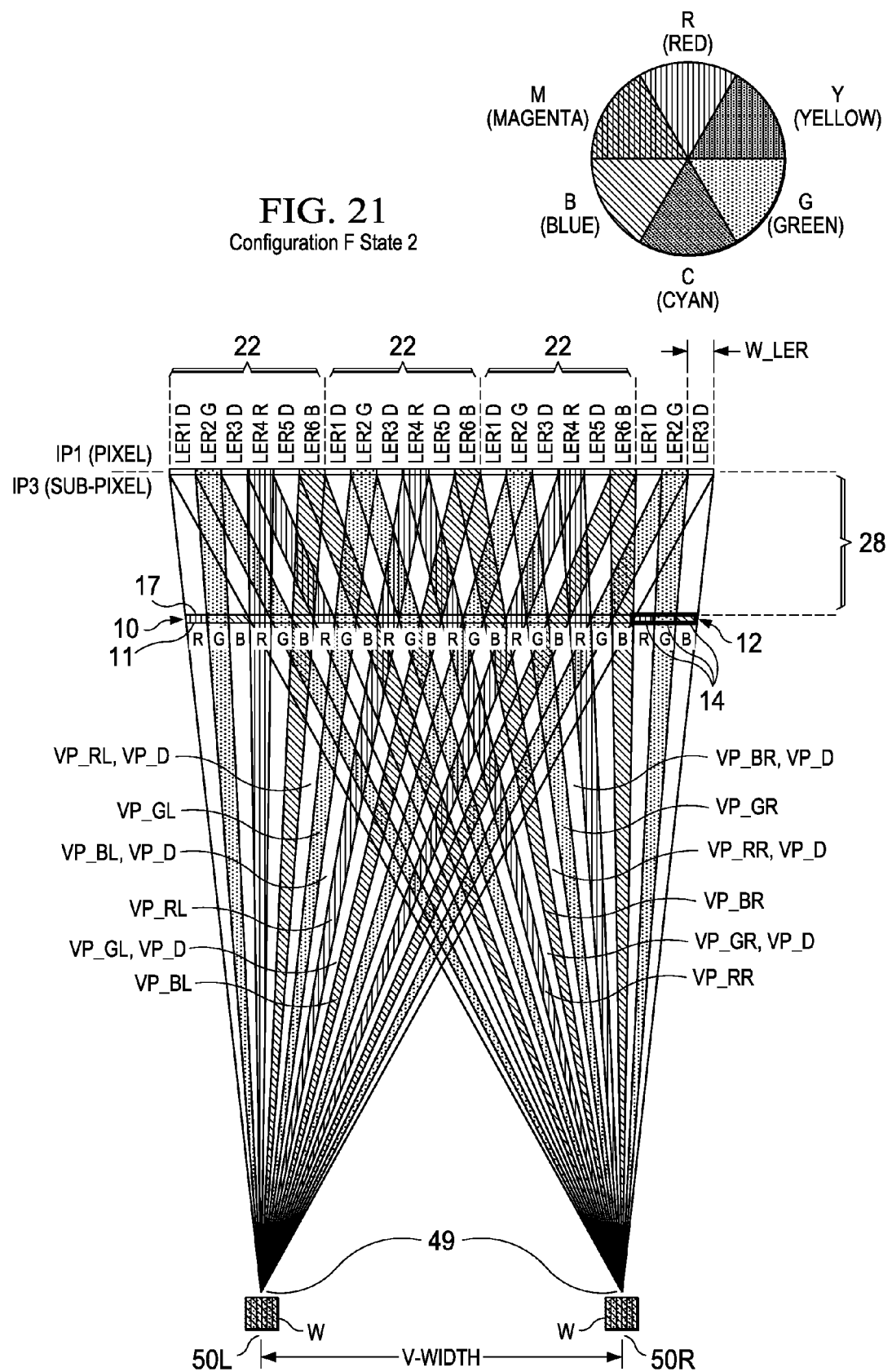
FIG. 21 is a schematic diagram depicting a top view of stereoscopic viewing system configuration F incorporating a dynamically switchable six-segment sub-pixel rear parallax emitter at the first rear intersection plane (IP1 relative to the overlaying pixels of the modulating display panel, or IP3 relative to the overlying sub-pixels of the modulating display panel), set to its second dynamic state.
Figure 22:
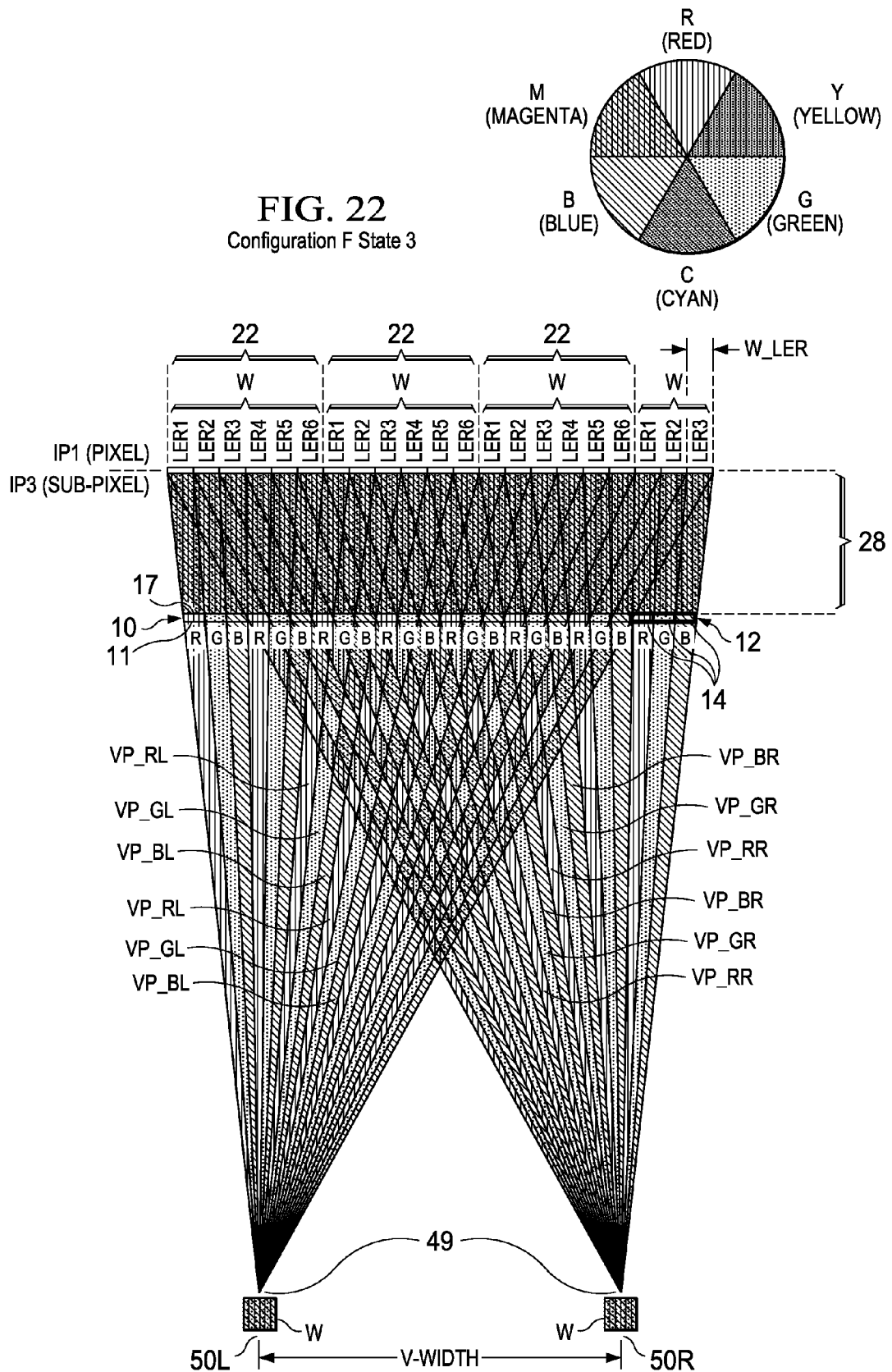
FIG. 22 is a schematic diagram depicting a top view of stereoscopic viewing system configuration F incorporating a dynamically switchable six-segment sub-pixel rear parallax emitter at the first rear intersection plane (IP1 relative to the overlaying pixels of the modulating display panel, or IP3 relative to the overlying sub-pixels of the modulating display panel), set to its third dynamic state.

FIGS. 20, 21, and 22 provide examples of another group of embodiments, namely viewing system configuration F with multiple operational states. Configuration F and its operational states are defined, at least in part, by the relative placement of the repeating pattern of vertically oriented regions (LERs) of the parallax emitter 20 with respect to the arrangement of the sub-pixels 14 of the light modulator 10. At least one embodiment locates the parallax emitter substantially at the third sub-pixel based intersection plane, which is equivalent to the first pixel based intersection plane, as stated in the earlier discussion of viewing path intersections.

The arrangement of sub-pixels 14 on light modulator 10 of configuration F will be described first. In at least one embodiment, pixels on panel 10 are tri-color and sub-pixels 14 are positioned in the following order starting on the left side of the diagrams in FIGS. 20, 21, and 22. The first sub-pixel 14 is generally red (R). Every third sub-pixel 14 thereafter is also red (R), and so, for example, the $4^{th}$, $7^{th}$, and $10^{th}$ sub-pixels are red (R). Thus, a first sub-pixel group comprises red sub-pixels 14 (R) and is configured to transmit the frequencies in a spectral range generally defined as red (R). The second sub-pixel 14 is generally green (G). Every third sub-pixel 14 thereafter is also generally green. Thus, a second sub-pixel group comprises green sub-pixels 14 (G) and is configured to transmit light frequencies (or equivalently wavelengths) in a spectral range generally defined as green (G). The third sub-pixel 14 is generally blue (B). Every third sub-pixel 14 thereafter is also blue (B). Therefore, a third sub-pixel group comprises blue sub-pixels 14 (B) and is configured to transmit frequencies in a spectral range generally defined as blue (B). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Referring still to FIGS. 20, 21, and 22, in configuration F, a repeating pattern 22 of light emitting regions (LERs) of parallax emitter 20 is located at just one of the successive intersection planes, situated on the side of the light modulator 10 opposite viewer 49. The intersection planes (IPs) have been defined based the intersections of specific viewing paths extending from viewpoints 50L, 50R and through sub-pixels 14, which were explained in an earlier section of this disclosure. At least one embodiment locates the parallax emitter substantially at the third sub-pixel based intersection plane, which is equivalent to the first pixel based intersection plane.

The repeating pattern 22 comprises six vertically oriented light-emitting regions (LER1 to LER6), numbered from left to right in FIGS. 20, 21, and 22. Because the referenced figures represent a non-vertical, planar section of display 1, the vertical dimension of the LERs is not apparent in the figures. In the disclosed configuration, each LER has a width (W_LER) that generally matches the width of the viewing path intersections on the selected intersection plane. Therefore the width of each LER is selected to illuminate approximately one sub-pixel from the vantage of a viewpoint 50L, 50R.

Continuing to refer to FIGS. 20, 21, and 22, in at least one implementation the rear parallax emitter includes a repeating pattern of vertically oriented LERs configured to emit repeating time multiplexed spectral ranges of light through the pixels of the light modulator 10 to the viewer's viewpoints 50L, 50R, each multiplexed spectral range representing one single optical state.

Thus, the embodiments of configuration F have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

In one or more optical states of configuration F, one or more of the viewing paths VP_GL, VP_BL, VP_GR, VP_BR are interrupted viewing paths VP_D. One or more interrupted viewing path VP_D results from an LER that is configured to emit substantially no light of any visible wavelength. Interrupted viewing paths contribute little or nothing to the light observed at the corresponding viewpoint.

A first optical state for configuration F is schematically presented in FIG. 20. Starting from the left side, the six light emitting regions (LER1 to LER6) in repeating pattern 22 are numbered from left to right. First regions LER1 are configured to emit light substantially comprising a red (R) spectral range. The second, fourth, and sixth regions LER2, LER4, LER6 are configured to emit substantially no light. Third regions LER3 are configured to emit light substantially comprising a blue (B) spectral range. Fifth regions LER5 are configured to emit light substantially comprising a green (G) spectral range.

In the first optical state for configuration F the repeating pattern 22 of six vertically oriented light emitting regions includes first regions LER1 configured to emit light through the first (red) set of sub-pixels 14 to the left viewpoint 50L and to emit light through the first (red) set of sub-pixels 14 to the right viewpoint 50R; second regions LER2 configured to substantially emit no light through the second (green) set of sub-pixels 14 (G) to the left viewpoint 50L and to substantially emit no light through the second (green) set of sub-pixels 14 (G) to the right viewpoint 50R; third regions LER3 configured to emit light through the third (blue) set of sub-pixels 14 (B) to the left viewpoint 50L and to emit light through the third (blue) set of sub-pixels 14 (B) to the right viewpoint 50R; fourth regions LER4 configured to substantially emit no light through the first (red) set of sub-pixels 14 to the left viewpoint 50L and to substantially emit no light through the first (red) set of sub-pixels 14 to the right viewpoint 50R; fifth regions LER5 configured to emit light through the second (green) set of sub-pixels 14 (G) to the left viewpoint 50L and to emit light through the second (green) set of sub-pixels 14 (G) to the right viewpoint 50R; and sixth regions LER6 configured to substantially emit no light through the third (blue) set of sub-pixels 14 (B) to the left viewpoint 50L and to substantially emit no light through the third (blue) set of sub-pixels 14 (B) to the right viewpoint 50R.

A second optical state for configuration F is schematically presented in FIG. 21. Starting from the left side, the six light emitting regions (LER1 to LER6) in repeating pattern 22 are numbered from left to right. First, third, and fifth regions LER1, LER3, LER5 are configured to emit substantially no light. Second regions LER3 are configured to emit light substantially comprising a green (G) spectral range. Fourth regions LER4 are configured to emit light substantially comprising a red (R) spectral range. Sixth regions LER6 are configured to emit light substantially comprising a blue (B) spectral range.

In the second optical state for configuration F the repeating pattern 22 of six vertically oriented light emitting regions includes first regions LER1 configured to substantially emit no light through the first (red) set of sub-pixels 14 to the left viewpoint 50L and to substantially emit no light through the first (red) set of sub-pixels 14 to the right viewpoint 50R; second regions LER2 configured to emit light through the second (green) set of sub-pixels 14 (G) to the left viewpoint 50L and to emit light through the second (green) set of sub-pixels 14 (G) to the right viewpoint 50R; third regions LER3 configured to substantially emit no light through the third (blue) set of sub-pixels 14 (B) to the left viewpoint 50L and to substantially emit no light through the third (blue) set of sub-pixels 14 (B) to the right viewpoint 50R; fourth regions LER4 configured to emit light through the first (red) set of sub-pixels 14 to the left viewpoint 50L and to emit light through the first (red) set of sub-pixels 14 to the right viewpoint 50R; fifth regions LER5 configured to substantially emit no light through the second (green) set of sub-pixels 14 (G) to the left viewpoint 50L and to substantially emit no light through the second (green) set of sub-pixels 14 (G) to the right viewpoint 50R; and sixth regions LER6 configured to emit light through the third (blue) set of sub-pixels 14 (B) to the left viewpoint 50L and to emit light through the third (blue) set of sub-pixels 14 (B) to the right viewpoint 50R.

In a third optical state of configuration F of the embodiment the repeating pattern of three vertically oriented regions FIG. 22 presents a third optical state for configuration F, which may produce a two-dimensional image on light modulator 10. Starting from the left side of FIG. 22, the parallax emitter 20 comprises a repeating pattern 22 of six vertically oriented light-emitting regions (LER1 to LER6), numbered from left to right. All LERs are configured to transmit all light (W). As explained earlier, each of the three sub-pixels 14 within a given pixel 12 has a unique transmission color (R), (G), or (B). In the third state, each sub-pixel 14 is illuminated by parallax emitter 20 with light that may pass through each sub-pixel 14 and continue traveling along a corresponding view path to a viewpoint 50L, 50R. Consequently, the third state has no interrupted viewing paths VP_D.

As shown in FIG. 22, in the third optical state for configuration F, the repeating pattern 22 of six vertically oriented regions includes first regions configured to emit light through the first (red) set of sub-pixels 14 to the left viewpoint 50L and to emit light through the first (red) set of sub-pixels 14 to the right viewpoint 50R; second regions configured to emit light through the second (green) set of sub-pixels 14 to the left viewpoint 50L and to emit light through the second (green) set of sub-pixels 14 to the right viewpoint 50R; third regions configured to emit light through the third (blue) set of sub-pixels 14 to the left viewpoint 50L and to emit light through the third (blue) set of sub-pixels 14 to the right viewpoint 50R; fourth regions configured to emit light through the first (red) set of sub-pixels 14 to the left viewpoint 50L and to emit light through the first (red) set of sub-pixels 14 to the right viewpoint 50R; fifth regions configured to emit light through the second (green) set of sub-pixels 14 to the left viewpoint 50L and to emit light through the second (green) set of sub-pixels 14 to the right viewpoint 50R; and sixth regions configured to emit light through the third (blue) set of sub-pixels 14 to the left viewpoint 50L and to emit light through the third (blue) set of sub-pixels 14 to the second viewpoint Building on what was explained earlier regarding the embodiments of configuration F, the six sets of the light emitting regions LER1 to LER6 may be cycled through two or more of their three respective dynamically switchable optical states. One or more of the LERs may, instead, remain in one optical state. The optical states of the LERs correspond to the optical states of configuration F. Specific now to each LER1, the first optical state may emit a red spectral range; a second optical state may substantially emit no light; a third optical state may substantially emit all light (W). Specific now to each LER2, the first optical state may substantially emit no light; a second optical state may emit a green spectral range; a third optical state may substantially emit all light (W). Specific now to each LER3, the first optical state may emit a blue spectral range; a second optical state may substantially emit no light; a third optical state may substantially emit all light (W). Specific now to each LER4, the first optical state may substantially emit no light; a second optical state may emit a red spectral range; a third optical state may substantially emit all light (W). Specific now to each LER5, the first optical state may emit a green spectral range; a second optical state may substantially emit no light; a third optical state may substantially emit all light (W). Specific now to each LER6, the first optical state may substantially emit no light; a second optical state may emit a blue spectral range; a third optical state may substantially emit all light (W). Further, the red, blue, and green sets of spectral ranges substantially exclude each other.

Configuration G

Figure 23:
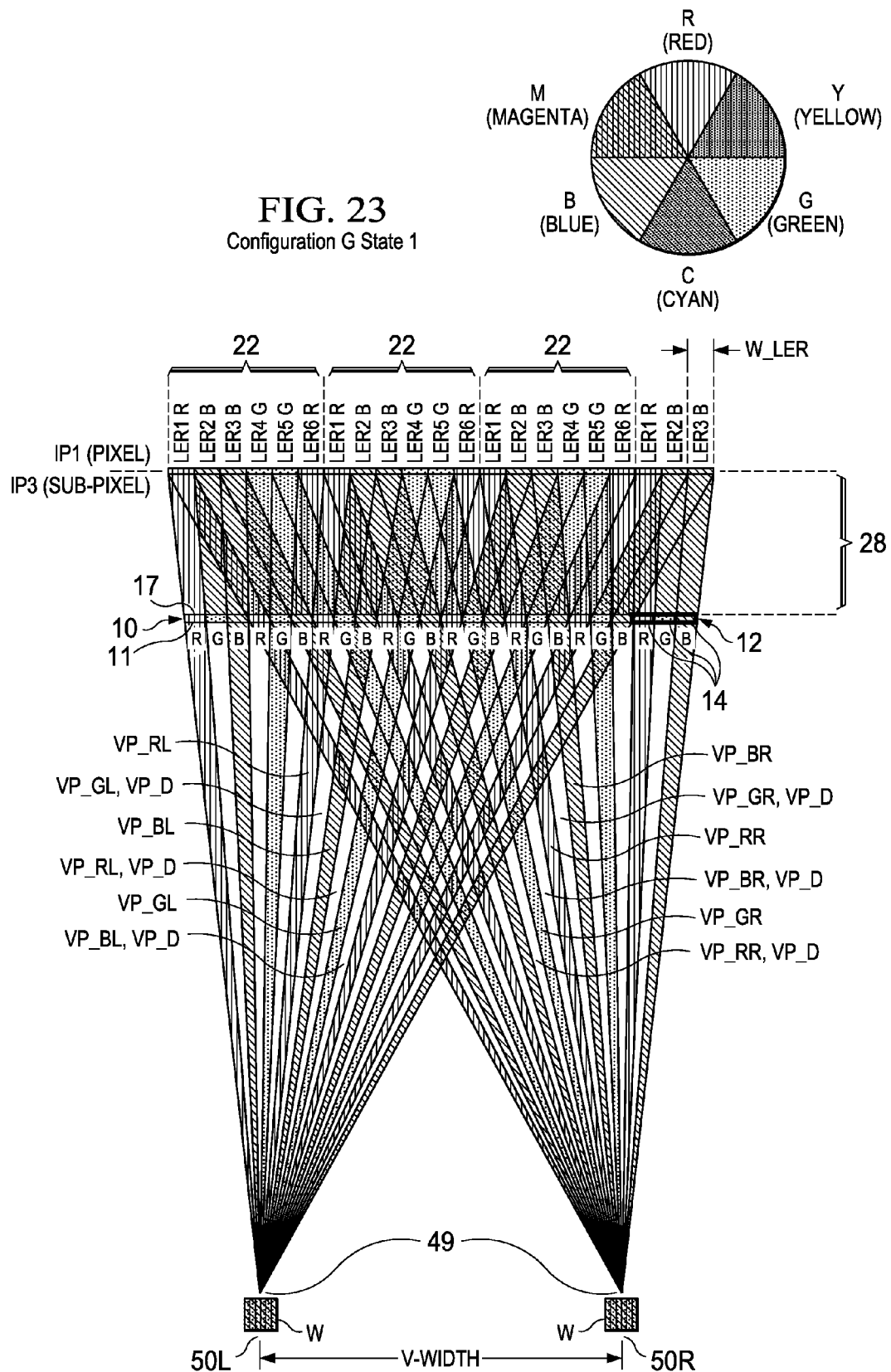
FIG. 23 is a schematic diagram depicting a top view of stereoscopic viewing system configuration G incorporating a dynamically switchable three-segment dual-sub-pixel rear parallax emitter at the first rear intersection plane (IP1 relative to the overlaying pixels of the modulating display panel, or IP3 relative to the overlying sub-pixels of the modulating display panel), set to its first dynamic state.
Figure 24:
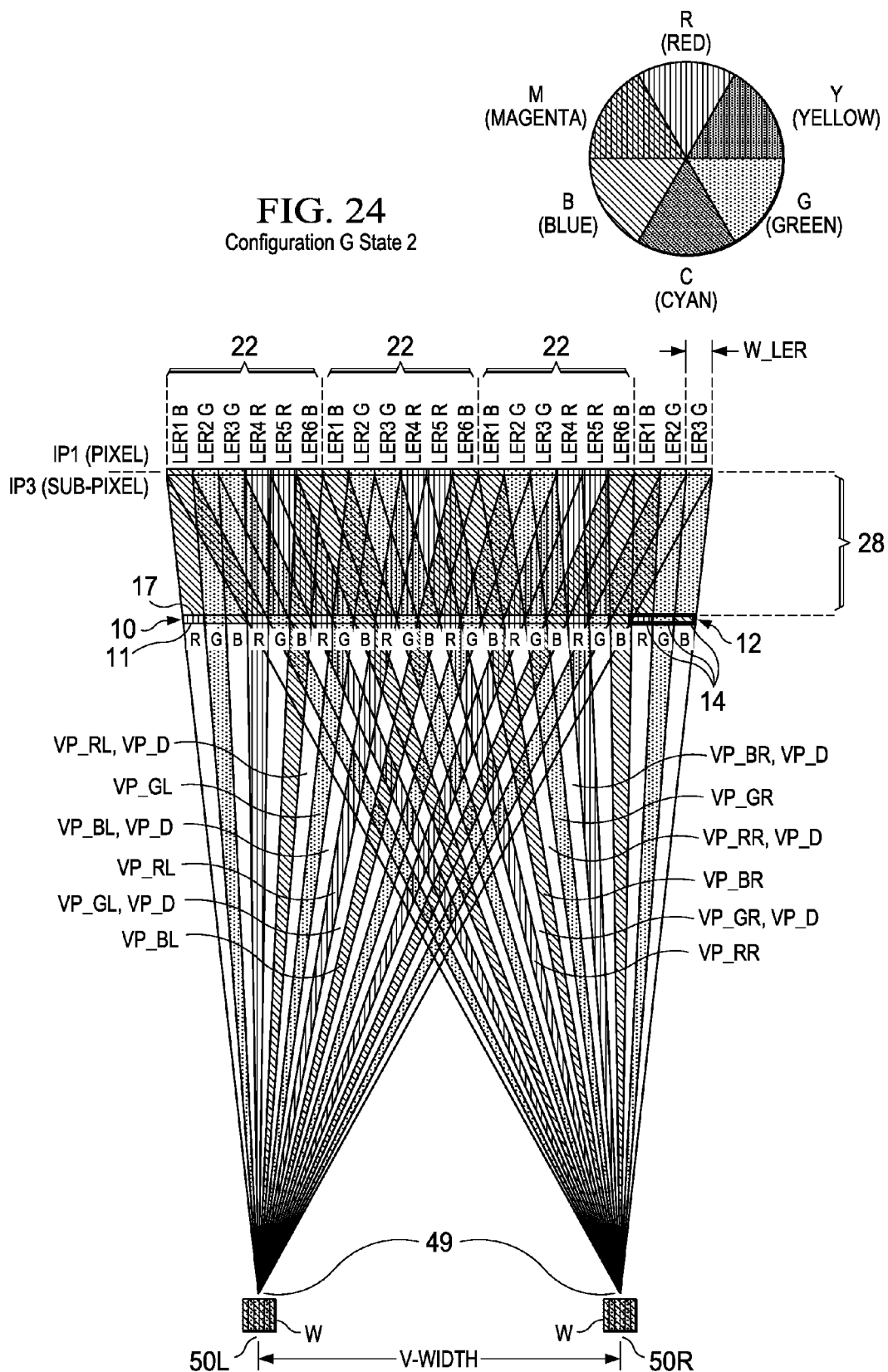
FIG. 24 is a schematic diagram depicting a top view of stereoscopic viewing system configuration G incorporating a dynamically switchable three-segment dual-sub-pixel rear parallax emitter at the first rear intersection plane (IP1 relative to the overlaying pixels of the modulating display panel, or IP3 relative to the overlying sub-pixels of the modulating display panel), set to its second dynamic state.
Figure 25:
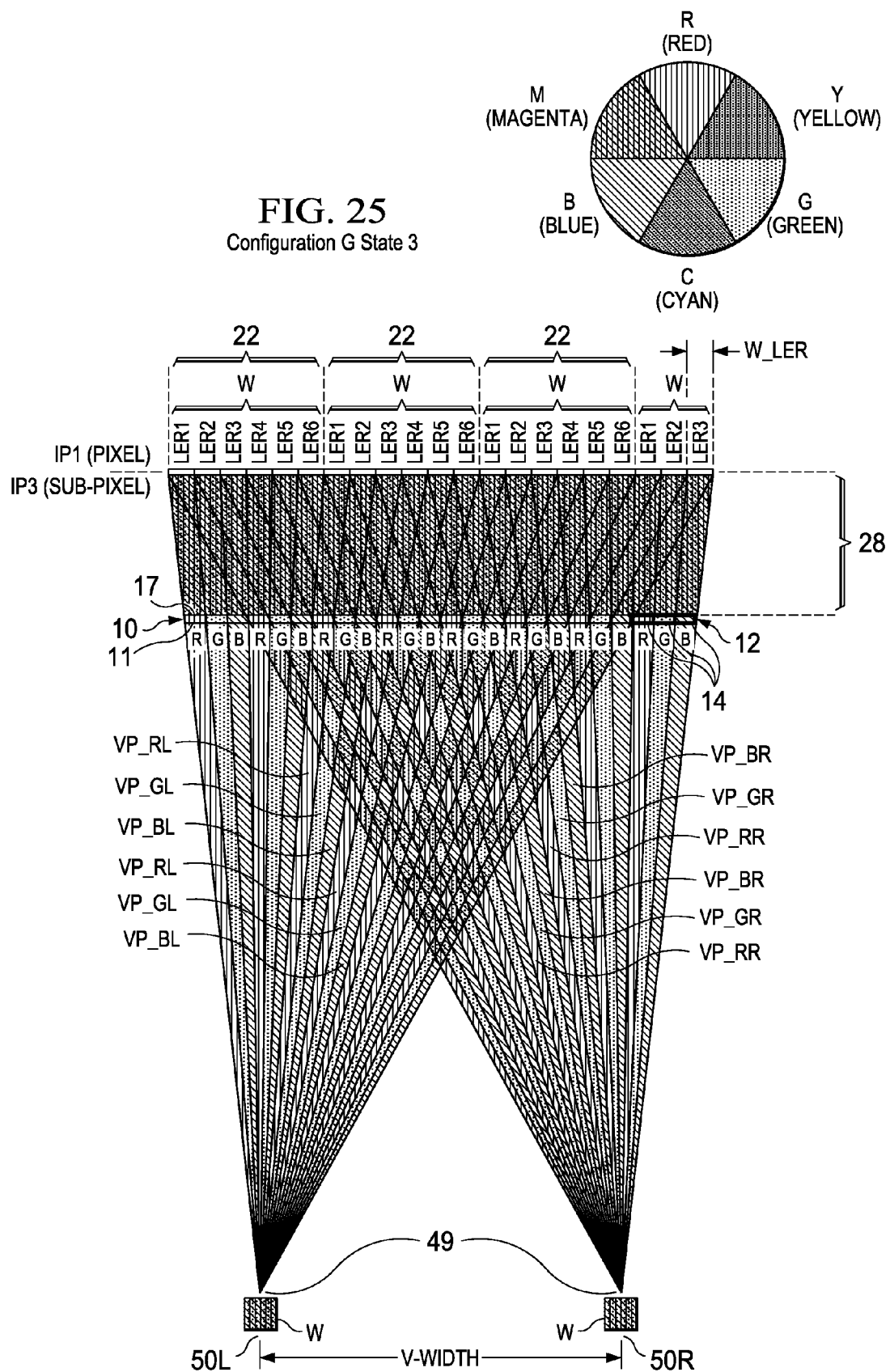
FIG. 25 is a schematic diagram depicting a top view of stereoscopic viewing system configuration G incorporating a dynamically switchable six-segment dual-sub-pixel rear parallax emitter at the first rear intersection plane (IP1 relative to the overlaying pixels of the modulating display panel, or IP3 relative to the overlying sub-pixels of the modulating display panel), set to its third dynamic state.

FIGS. 23, 24, and 25 provide examples of another group of embodiments, namely viewing system configuration G with multiple operational states. Configuration G and its operational states are defined, at least in part, by the relative placement of the repeating pattern of vertically oriented regions (LERs) of the parallax emitter 20 with respect to the arrangement of the sub-pixels 14 of the light modulator 10. At least one embodiment locates the parallax emitter substantially at the third sub-pixel based intersection plane, which is equivalent to the first pixel based intersection plane, as stated in the earlier discussion of viewing path intersections.

The arrangement of sub-pixels 14 on light modulator 10 of configuration g will be described first. In at least one embodiment, pixels on panel 10 are tri-color and sub-pixels 14 are positioned in the following order starting on the left side of the diagrams in FIGS. 23, 24, and 25. The first sub-pixel 14 is generally red (R). Every third sub-pixel 14 thereafter is also red (R), and so, for example, the $4^{th}$, $7^{th}$, and $10^{th}$ sub-pixels are red (R). Thus, a first sub-pixel group comprises red sub-pixels 14 (R) and is configured to transmit the frequencies (or equivalently wavelengths) in a spectral range generally defined as red (R). The second sub-pixel 14 is generally green (G). Every third sub-pixel 14 thereafter is also generally green. Thus, a second sub-pixel group comprises green sub-pixels 14 (G) and is configured to transmit light frequencies in a spectral range generally defined as green (G). The third sub-pixel 14 is generally blue (B). Every third sub-pixel 14 thereafter is also blue (B). Therefore, a third sub-pixel group comprises blue sub-pixels 14 (B) and is configured to transmit frequencies in a spectral range generally defined as blue (B). The green, red, and blue (G), (R), (B) sub-pixels 14 are controllable to transmit light received from the side of the light modulator 10 opposite the viewer 49.

Although arrangement of sub-pixels 14 on light modulator 10 was described in terms of an RGB, tri-color pixel, in general light modulator 10 may use other pixel configurations including pixels comprised of one or more sub-pixels having one or more colors. Another embodiment may, for example, utilize RGBY or RGBW pixels.

Referring still to FIGS. 23, 24, and 25, in configuration G, a repeating pattern 22 of light emitting regions (LERs) of parallax emitter 20 is located at just one of the successive intersection planes, situated on the side of the light modulator 10 opposite viewer 49. The intersection planes (IPs) have been defined based the intersections of specific viewing paths extending from viewpoints 50L, 50R and through sub-pixels 14, which were explained in an earlier section of this disclosure. At least one embodiment locates the parallax emitter substantially at the third sub-pixel based intersection plane, which is equivalent to the first pixel based intersection plane.

The repeating pattern 22 comprises six vertically oriented light-emitting regions (LER1 to LER6), numbered from left to right in FIGS. 23, 24, and 25. Because the referenced figures represent a non-vertical, planar section of display 1, the vertical dimension of the LERs is not apparent in the figures. In the disclosed configuration, each LER has a width (W_LER) that generally matches the width of the viewing path intersections on the selected intersection plane. Therefore the width of each LER is selected to illuminate approximately one sub-pixel from the vantage of a viewpoint 50L, 50R.

Continuing to refer to FIGS. 23, 24, and 25, in at least one implementation the rear parallax emitter includes a repeating pattern of vertically oriented LERs configured to emit repeating time multiplexed spectral ranges of light through the pixels of the light modulator 10 to the viewer's viewpoints 50L, 50R, each multiplexed spectral range representing one single optical state.

Thus, the embodiments of configuration G have at least three dynamically switchable optical states. An embodiment may remain in one optical state or may be cycled through two or more of the optical states. When an embodiment has no power, it may be in any of the optical states or may be in a transitional or a default state. Characteristic of each optical state is the spectral ranges of emission colors of the light emitting regions (LERs) and the potential activity of the viewing paths to viewpoints 50L, 50R during that optical state.

In one or more optical states of configuration G, one or more of the viewing paths VP_GL, VP_BL, VP_GR, VP_BR are interrupted viewing paths VP_D. One or more interrupted viewing path VP_D results from an LER that is configured to emit substantially no light of any visible wavelength. Interrupted viewing paths contribute little or nothing to the light observed at the corresponding viewpoint.

A first optical state for configuration G is schematically presented in FIG. 23. Parallax emitter 20 comprises a plurality of vertically oriented light-emitting regions (LERs) arranged in a repeating pattern 22. Starting from the left side of FIG. 23, repeating pattern 22 includes six regions (LER1 to LER6) numbered from left to right. The light emitted by the first and sixth regions LER1, LER6 is substantially comprised of a red (R) spectral range; the light emitted by the second and third regions LER2, LER3 is substantially comprised of a blue (B) spectral range; the light emitted by the fourth and fifth regions LER4, LER5 is substantially comprised of a green (G) spectral range.

The first optical state for configuration G includes first regions LER1 configured to emit light through the first (red) set of sub-pixels 14 (R) to the left viewpoint 50L and to emit light through the first (red) set of sub-pixels 14 (R) to the right viewpoint 50R; second regions LER2 configured to substantially emit no light through the second (green) set of sub-pixels 14 (G) to the left viewpoint 50L and to substantially emit no light through the second (green) set of sub-pixels 14 (G) to the right viewpoint 50R; third regions LER3 configured to emit light through the third (blue) set of sub-pixels 14 (B) to the left viewpoint 50L and to emit light through the third (blue) set of sub-pixels 14 (B) to the right viewpoint 50R; fourth regions LER4 configured to substantially emit no light through the first (red) set of sub-pixels 14 (R) to the left viewpoint 50L and to substantially emit no light through the first (red) set of sub-pixels 14 (R) to the right viewpoint 50R; fifth regions LER5 configured to emit light through the second (green) set of sub-pixels 14 (G) to the left viewpoint 50L and to emit light through the second (green) set of sub-pixels 14 (G) to the right viewpoint 50R; and sixth regions LER6 configured to substantially emit no light through the third (blue) set of sub-pixels 14 (B) to the left viewpoint 50L and to substantially emit no light through the third (blue) set of sub-pixels 14 (B) to the right viewpoint 50R.

A second optical state for configuration G is schematically presented in FIG. 24. Parallax emitter 20 comprises a plurality of vertically oriented light-emitting regions (LERs) arranged in a repeating pattern 22. Starting from the left side of FIG. 23, repeating pattern 22 includes six regions (LER1 to LER6) numbered from left to right. The light emitted by the first and sixth regions LER1, LER6 is substantially comprised of a blue (B) spectral range; the light emitted by the second and third regions LER2, LER3 is substantially comprised of a green (G) spectral range; the light emitted by the fourth and fifth regions LER4, LER5 is substantially comprised of a red (R) spectral range.

The second optical state for configuration G includes first regions LER1 configured to substantially emit no light through the first (red) set of sub-pixels 14 (R) to the left viewpoint 50L and to substantially emit no light through the first (red) set of sub-pixels 14 (R) to the right viewpoint 50R; second regions LER2 configured to emit light through the second (green) set of sub-pixels 14 (G) to the left viewpoint 50L and to emit light through the second (green) set of sub-pixels 14 (G) to the right viewpoint 50R; third regions LER3 configured to substantially emit no light through the third (blue) set of sub-pixels 14 (B) to the left viewpoint 50L and to substantially emit no light through the third (blue) set of sub-pixels 14 (B) to the right viewpoint 50R; fourth regions LER4 configured to emit light through the first (red) set of sub-pixels 14 (R) to the left viewpoint 50L and to emit light through the first (red) set of sub-pixels 14 (R) to the right viewpoint 50R; fifth regions LER5 configured to substantially emit no light through the second (green) set of sub-pixels 14 (G) to the left viewpoint 50L and to substantially emit no light through the second (green) set of sub-pixels 14 (G) to the right viewpoint 50R; and sixth regions LER6 configured to emit light through the third (blue) set of sub-pixels 14 (B) to the left viewpoint 50L and to emit light through the third (blue) set of sub-pixels 14 (B) to the right viewpoint 50R.

Configuration G includes a third optical state shown in FIG. 25 that is substantially identical to the third optical state for configuration F in FIG. 22.

Building on what was explained earlier regarding the embodiments of configuration G, the six sets of the light emitting regions LER1 to LER6 may be cycled through two or more of their three respective dynamically switchable optical states. One or more of the LERs may, instead, remain in one optical state. The optical states of the LERs correspond to the optical states of configuration Specific now to each LER1, the first optical state may emit a red spectral range; a second optical state may emit a blue spectral range; a third optical state may substantially emit all light (W). Specific now to each LER2, the first optical state may emit a blue spectral range; a second optical state may emit a green spectral range; a third optical state may substantially emit all light. Specific now to each LER3, the first optical state may emit a blue spectral range; a second optical state may emit a green spectral range; a third optical state may substantially emit all light (W). Specific now to each LER4, the first optical state may emit a green spectral range; a second optical state may emit a red spectral range; a third optical state may substantially emit all light (W). Specific now to each LER5, the first optical state may emit a green spectral range; a second optical state may emit a red spectral range; a third optical state may substantially emit all light. Specific now to each LER6, the first optical state may emit a red spectral range; a second optical state may emit a blue spectral range; a third optical state may substantially emit all light (W). Further, the red, blue, and green sets of spectral ranges substantially exclude each other.

In the context of all embodiments described above, it should be noted that variations are possible in which any set of LERs may also be cycled through more than three dynamically switchable optical states. It, therefore, should be clear that all the embodiments described above are exemplary only and that the scope of the present invention described herein is not limited to the specific details of such examples.

It should also be noted that although the illustrated and described particular embodiments include pixels comprised of three sub-pixels, this disclosure and the embodiments described therein are by no means limited to such a pixel configuration. Various embodiments with pixels comprised of four or more sub-pixels are contemplated and may also be implemented, as well as pixels having less than three sub-pixels (knowing that such embodiments may affect the range of viewable colors). Accordingly, alternate configurations and embodiments featuring a parallax emitter as described would be in the spirit of this invention.

While disclosed embodiments have been shown and described, modifications thereof may be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters may be varied. Accordingly, the scope of protection is not limited to the embodiments described herein, but is only limited by the claims that follow, the scope of which shall include all equivalents of the subject matter of the claims

What is claimed is:

1. A display, comprising:
   a light modulator comprising a plurality of pixels viewable at a viewing position; and
   a rear parallax emitter comprising a plurality of sets of light emitting regions (LERs) and having an area substantially coextensive with the light modulator and spaced a prescribed uniform distance from the display opposite from a viewing position;
   wherein each set of LERs is independently controllable to transmit a light color that differs from a light color transmitted by another set of LERs.

2. The display of claim 1 further comprising control logic that repeatedly cycles the color transmitted by each set of LERs through at least two different colors.

3. The display of claim 1 wherein the rear parallax emitter is located at one of multiple intersection planes behind the light modulator, the multiple successive intersection planes are located where light paths extending through a first set of pixels from a first eye position cross light paths extending through a second set of pixels from a second eye position, each successive intersection plane being located a predetermined, substantially uniform distance from the light modulator.

4. The display of claim 1 wherein the rear parallax emitter is located at one of multiple intersection planes behind the light modulator, the multiple successive intersection planes are located where light paths extending through a first set of sub-pixels from a first eye position cross light paths extending through a second set of sub-pixels from a second eye position, each successive intersection plane being located a predetermined, substantially uniform distance from the light modulator.

5. The display of claim 1 wherein each pixel comprises a plurality of sub-pixels, and light from each set of LERs passes through exactly two sub-pixels of a single set of pixels to a single eye position.

6. The display of claim 1 wherein each pixel comprises a plurality of sub-pixels, and light from each LER passes through exactly one sub-pixel of a single pixel to a single eye position.

7. The display of claim 1 wherein each pixel comprises a plurality of sub-pixels, and light from each LER does not pass through at least one sub-pixel of a single pixel to a single eye position.

8. The display of claim 1 wherein the rear parallax emitter comprises at least three sets of LERs, each set being independently controllable to transmit a light of a certain color or be turned off independent of the other sets.

9. The display of claim 7 wherein at any point in time two of the at least three sets of LERs are activated to transmit a color and at least one other set of LERs is disabled thereby transmitting no light, wherein the color of one of the activated sets of LERs is activated to transmit a different color than another of the activated sets of LERs.

10. The display of claim 1 wherein the rear parallax emitter comprises a repeating pattern of two sets of LERs.

11. The display of claim 1 wherein the rear parallax emitter comprises a repeating pattern of at least three sets of LERs.

12. The display of claim 10 wherein, during operation and at one point in time, one of the at least three sets of LERs is disabled thereby transmitting no light and the other sets of LERs transmit a different light color with respect to each other.

13. The display of claim 1 wherein at least some of the pixels are illuminated to one eye position by a different LER that illuminates such pixels to another eye position.

14. The display of claim 1 wherein all sets of LERs are controllable to transmit the same color light.

15. A display, comprising:
a light modulator comprising a plurality of pixels viewable at a viewing position; and
a rear parallax emitter comprising a plurality of sets of light emitting regions (LERs) having an area substantially coextensive with the light modulator and spaced a prescribed uniform distance from the display opposite a viewing position;
wherein the light from the rear emitter passes through the light modulator pixels to create a parallax effect; and
wherein each set of LERs is independently controllable to transmit light.

16. The display of claim 15 each set of LERs is independently controllable to transmit light of a particular color that is different than the color transmitted by another set of LERs.

17. The display of claim 16 further comprising control logic that repeatedly cycles the color transmitted by each set of LERs through at least two different colors.

18. The display of claim 15 wherein the rear parallax emitter is located at one of multiple intersection planes behind the light modulator, the multiple successive intersection planes are located where light paths extending through a first set of pixels from a first eye position cross light paths extending through a second set of pixels from a second eye position, each successive intersection plane being located a predetermined, substantially uniform distance from the light modulator.

19. The display of claim 15 wherein the rear parallax emitter is located at one of multiple intersection planes behind the light modulator, the multiple successive intersection planes are located where light paths extending through a first set of sub-pixels from a first eye position cross light paths extending through a second set of sub-pixels from a second eye position, each successive intersection plane being located a predetermined, substantially uniform distance from the light modulator.

20. The display of claim 15 wherein each pixel comprises a plurality of sub-pixels, and light from each LER does not pass through at least one sub-pixel of a single pixel to a single eye position.

21. The display of claim 15 wherein the rear parallax emitter comprises at least three sets of LERs, each set being independently controllable to transmit a light of a certain color or be turned off independent of the other sets.

22. The display of claim 21 wherein at any point in time two of the at least three sets of LERs are activated to transmit a color and at least one other set of LERs is disabled thereby transmitting no light, wherein the color of one of the activated sets of LERs is activated to transmit a different color than another of the activated sets of LERs.

23. The display of claim 15 wherein the rear parallax emitter comprises a repeating pattern of two sets of LERs.

24. The display of claim 15 wherein the rear parallax emitter comprises a repeating pattern of at least three sets of LERs.

25. The display of claim 23 wherein, during operation and at one point in time, one of the at least three sets of LERs is disabled thereby transmitting no light and the other sets of LERs transmit a different light color with respect to each other.

26. The display of claim 16 wherein at least some of the pixels are illuminated to one eye position by a different LER that illuminates such pixels to another eye position.

27. A backlight unit, comprising:
a panel including a plurality of sets of light emitting regions (LERs) and configured to be provided on a side of a light modulator opposite a viewing position;
wherein each set of LERs is controllable to transmit a light color that differs from a light color transmitted by another set of LERs.

28. The backlight unit of claim 27 wherein each set of LERs is controllable to transmit a repeating pattern of different colors.

29. The backlight unit of claim 27 further comprises at least three sets of LERs, each set being controllable to transmit a light of a certain color or be turned off independent of the other sets.

30. The backlight unit of claim 29 wherein at any point in time two of the at least three sets of LERs are configured to be activated to transmit a color and at least one other set of LERs is configured to be disabled thereby transmitting no light, wherein the color of one of the activated sets of LERs is activated to transmit a different color than another of the activated sets of LERs.

31. The backlight unit of claim 27 further comprising a repeating pattern of two sets of different color LERs.

32. The backlight unit of claim 27 further comprising a repeating pattern of at least three sets of LERs.

33. The backlight unit of claim 28 wherein one of the three sets of LERs is configurable to be disabled thereby transmitting no light and the other two sets of LERs are configurable to transmit a different light color with respect to each other.

* * * * *